(12) United States Patent
Rosner et al.

(10) Patent No.: US 8,375,293 B2
(45) Date of Patent: Feb. 12, 2013

(54) METHOD AND APPARATUS FOR DEFINING DOCUMENTS

(75) Inventors: Roger Rosner, Pittsburgh, PA (US); Richard Cave, Camas, WA (US); Chris Rudolph, Camas, WA (US); Jay Capela, Santa Cruz, CA (US); Paul Elseth, Washougal, WA (US); Sean McGuire, Shoreline, WA (US)

(73) Assignee: Apple Inc., Cupertino, CA (US)

( * ) Notice: Subject to any disclaimer, the term of this patent is extended or adjusted under 35 U.S.C. 154(b) by 1001 days.

(21) Appl. No.: 11/329,365

(22) Filed: Jan. 9, 2006

(65) Prior Publication Data

US 2006/0206807 A1    Sep. 14, 2006

Related U.S. Application Data

(63) Continuation-in-part of application No. 11/033,480, filed on Jan. 10, 2005, and a continuation-in-part of application No. 11/033,484, filed on Jan. 10, 2005.

(60) Provisional application No. 60/651,479, filed on Jan. 9, 2005.

(51) Int. Cl.
    *G06F 17/00*    (2006.01)
(52) U.S. Cl. ................... 715/234; 715/248; 715/255
(58) Field of Classification Search .............. 715/234, 715/248, 255
    See application file for complete search history.

(56) References Cited

U.S. PATENT DOCUMENTS

| | | | | |
|---|---|---|---|---|
| 4,723,209 | A * | 2/1988 | Hernandez et al. | 715/210 |
| 5,267,155 | A * | 11/1993 | Buchanan et al. | 715/210 |
| 5,337,406 | A | 8/1994 | Takakura et al. | |
| 5,416,895 | A * | 5/1995 | Anderson et al. | 715/209 |
| 5,416,900 | A * | 5/1995 | Blanchard et al. | 715/804 |
| 5,553,216 | A * | 9/1996 | Yoshioka et al. | 715/234 |
| 5,590,259 | A * | 12/1996 | Anderson et al. | 715/209 |
| 5,903,905 | A | 5/1999 | Andersen et al. | |
| RE36,704 | E | 5/2000 | Parker et al. | |
| 6,230,170 | B1 | 5/2001 | Zellweger et al. | |
| 6,362,900 | B1 | 3/2002 | Squilla et al. | |
| 6,542,163 | B2 | 4/2003 | Gorbet et al. | |
| 6,601,057 | B1 | 7/2003 | Underwood et al. | |
| 6,697,825 | B1 | 2/2004 | Underwood et al. | |
| 6,813,746 | B1 | 11/2004 | O'Shea | |
| 6,854,087 | B1 | 2/2005 | Takeo et al. | |
| 7,024,621 | B1 * | 4/2006 | Tolpin | 715/210 |
| 7,134,073 | B1 * | 11/2006 | Fiedorowicz et al. | 715/235 |
| 7,237,193 | B1 | 6/2007 | Zaky et al. | |
| 7,278,115 | B1 * | 10/2007 | Conway et al. | 715/838 |
| 7,322,007 | B2 | 1/2008 | Schowtka et al. | |

(Continued)

OTHER PUBLICATIONS

U.S. Appl. No. 11/033,480, filed Jan. 10, 2005, Roger Rosner, et al.

(Continued)

*Primary Examiner* — Stephen Hong
*Assistant Examiner* — Marshon Robinson
(74) *Attorney, Agent, or Firm* — Fletcher Yoder PC

(57) ABSTRACT

Some embodiments provide a method for storing a document. The document is created by using a set of template pages. The method, in a data storage structure, creates a first prototype section for storing information for the template pages. The method also, in the data storage structure, creates a second section for storing a set of content for the document. In some embodiments, the template pages are provided by a word-processing application. In some embodiments, the information for the template pages includes text information, image information, and thumbnail information. In some embodiments, a word-processing application utilizes the stored thumbnails in the prototypes section to generate a visual representation of a template page contents to a user to assist the user in creating a document. In some embodiments, the template pages further include stylesheet information, headers information, and footers information.

27 Claims, 49 Drawing Sheets

U.S. PATENT DOCUMENTS

| | | | | |
|---|---|---|---|---|
| 7,324,119 | B1* | 1/2008 | Puri et al. | 345/602 |
| 7,468,805 | B2 | 12/2008 | Lo et al. | |
| 7,823,057 | B1 | 10/2010 | Schultz et al. | |
| 7,827,483 | B2 | 11/2010 | Unbedacht et al. | |
| 8,078,963 | B1 | 12/2011 | Rosner et al. | |
| 2001/0032248 | A1 | 10/2001 | Krafchin | |
| 2002/0046235 | A1* | 4/2002 | Foy et al. | 709/203 |
| 2002/0059327 | A1* | 5/2002 | Starkey | 707/203 |
| 2002/0078100 | A1* | 6/2002 | Tewari | 707/523 |
| 2002/0129050 | A1 | 9/2002 | Gryskiewicz | |
| 2003/0028562 | A1* | 2/2003 | Shaughnessy et al. | 707/513 |
| 2003/0172343 | A1* | 9/2003 | Leymaster et al. | 715/500 |
| 2003/0182402 | A1 | 9/2003 | Goodman et al. | |
| 2004/0015782 | A1* | 1/2004 | Day et al. | 715/517 |
| 2004/0046788 | A1 | 3/2004 | Keane et al. | |
| 2004/0060005 | A1* | 3/2004 | Vasey | 715/513 |
| 2005/0028088 | A1* | 2/2005 | Nagayama | 715/513 |
| 2005/0166159 | A1 | 7/2005 | Mondry et al. | |
| 2005/0216886 | A1 | 9/2005 | Washburn | |
| 2005/0278625 | A1 | 12/2005 | Wessling et al. | |
| 2006/0109516 | A1 | 5/2006 | Catalan et al. | |
| 2006/0109517 | A1 | 5/2006 | Catalan | |
| 2007/0180358 | A1 | 8/2007 | McGatha et al. | |
| 2010/0107101 | A1 | 4/2010 | Shaw et al. | |
| 2012/0110439 | A1 | 5/2012 | Rosner et al. | |
| 2012/0110440 | A1 | 5/2012 | Rosner et al. | |

OTHER PUBLICATIONS

U.S. Appl. No. 11/033,484, filed Jan. 10, 2005, Roger Rosner, et al.
Non-Final Office Action for U.S. Appl. No. 11/033,484, filed Jul. 2, 2007, Roger Rosner, et al.
Millhollon, et al., Microsoft Office Word 2003 Inside Out, Nov. 5, 2003, Microsoft Press.
Stan Nicotera, Computer Terms, Sep. 18, 2000, Special Interest Video Sales Group, <http://www.sivideo.com/9pcterms.htm>.
Non-Final Office Action of U.S. Appl. No. 11/033,480, filed Apr. 7, 2008, Rosner, Roger, et al.
Final Office Action of U.S. Appl. No. 11/033,480, filed Nov. 25, 2008, Rosner, Roger, et al.
Final Office Action of U.S. Appl. No. 11/033,484, filed Apr. 28, 2008 Rosner, Roger, et al.
Non-Final Office Action of U.S. Appl. No. 11/033,484, filed Nov. 26, 2008, Rosner, Roger, et al.
Microsoft Word 2003 Month N/A, Microsoft Corporation, screenshots, pp. 1-3.
Microsoft Word 2003, Month N/A, Microsoft Corporation, screenshots, pp. 1-5.
Tom Bunzel, "Sams Teach Yourself Microsoft Office PowerPoint 2003 in 24 Hours", publisher: Sams, published: Sep. 22, 2003, pp. 1-6.
Advisory Action of U.S. Appl. No. 11/033,480, filed Feb. 10, 2009, Rosner, Roger, et al.
Non-Final Office Action of U.S. Appl. No. 11/033,480, filed Aug. 18, 2009, Rosner, Roger, et al.
Advisory Action of U.S. Appl. No. 11/033,484, filed Jul. 29, 2008, Rosner, Roger, et al.
Final Office Action of U.S. Appl. No. 11/033,484, filed Aug. 14, 2009, Rosner, Roger, et al.
"Step by Step Microsoft Front Page Version 2002," 2001, Microsoft Press, version 2002, pp. 35-39.
Updated portions of prosecution history of U.S. Appl. No. 11/033,480, filed Aug. 26, 2010, Rosner, Roger, et al.
Updated portions of prosecution history of U.S. Appl. No. 11/033,484, filed Jul. 20, 2010, Rosner, Roger, et al.
Bunzel, "Sams Teach Yourself Microsoft Office PowerPoint 2003 in 24 hours," published: Sep. 2003, pp. L1, L2.
Updated portions of prosecution history of U.S. Appl. No. 11/033,480, filed Nov. 12, 2010, Rosner, Roger, et al.
Updated portions of prosecution history of U.S. Appl. No. 11/033,484, filed Jan. 5, 2011, Rosner, Roger, et al.
Updated portions of prosecution history of U.S. Appl. No. 11/033,480, filed Mar. 25, 2011, Rosner, Roger, et al.
Updated portions of prosecution history of U.S. Appl. No. 11/033,484, filed May 13, 2011, Rosner, Roger, et al.
Updated portions of prosecution history of U.S. Appl. No. 11/033,480, filed Jun. 21, 2011, Rosner, Roger, et al.
Updated portions of prosecution history of U.S. Appl. No. 11/033,484, filed Jul. 21, 2011, Rosner, Roger, et al.
Bott, Ed, et al., "Special Edition Using Microsoft Office 2003", Sep. 15, 2003, pp. 1-17, Que Publishing, Indianapolis, USA.
Johnson, Steve, et al., "Show Me Microsoft Office 2003", Sep. 13, 2003, pp. 1-3, Que Publishing, Indianapolis, USA.
U.S. Appl. No. 13/284,848, filed Oct. 28, 2011, Rosner, Roger, et al.
U.S. Appl. No. 13/284,851, filed Oct. 28, 2011, Rosner, Roger, et al.
Updated portions of prosecution history of U.S. Appl. No. 11/033,480, filed Sep. 21, 2011, Rosner, Roger, et al.
Updated portions of prosecution history of U.S. Appl. No. 11/033,484, filed Nov. 8, 2011, Rosner, Roger, et al.
Updated portions of prosecution history of U.S. Appl. No. 11/033,480, filed Dec. 29, 2011, Rosner, Roger, et al.
Portions of prosecution history of U.S. Appl. No. 13/284,848, filed Jan. 17, 2012, Rosner, Roger, et al.
Portions of prosecution history of U.S. Appl. No. 13/284,851, filed Jan. 17, 2012, Rosner, Roger, et al.
Updated portions of prosecution history of U.S. Appl. No. 11/033,480, filed Apr. 12, 2012, Rosner, Roger, et al.

* cited by examiner

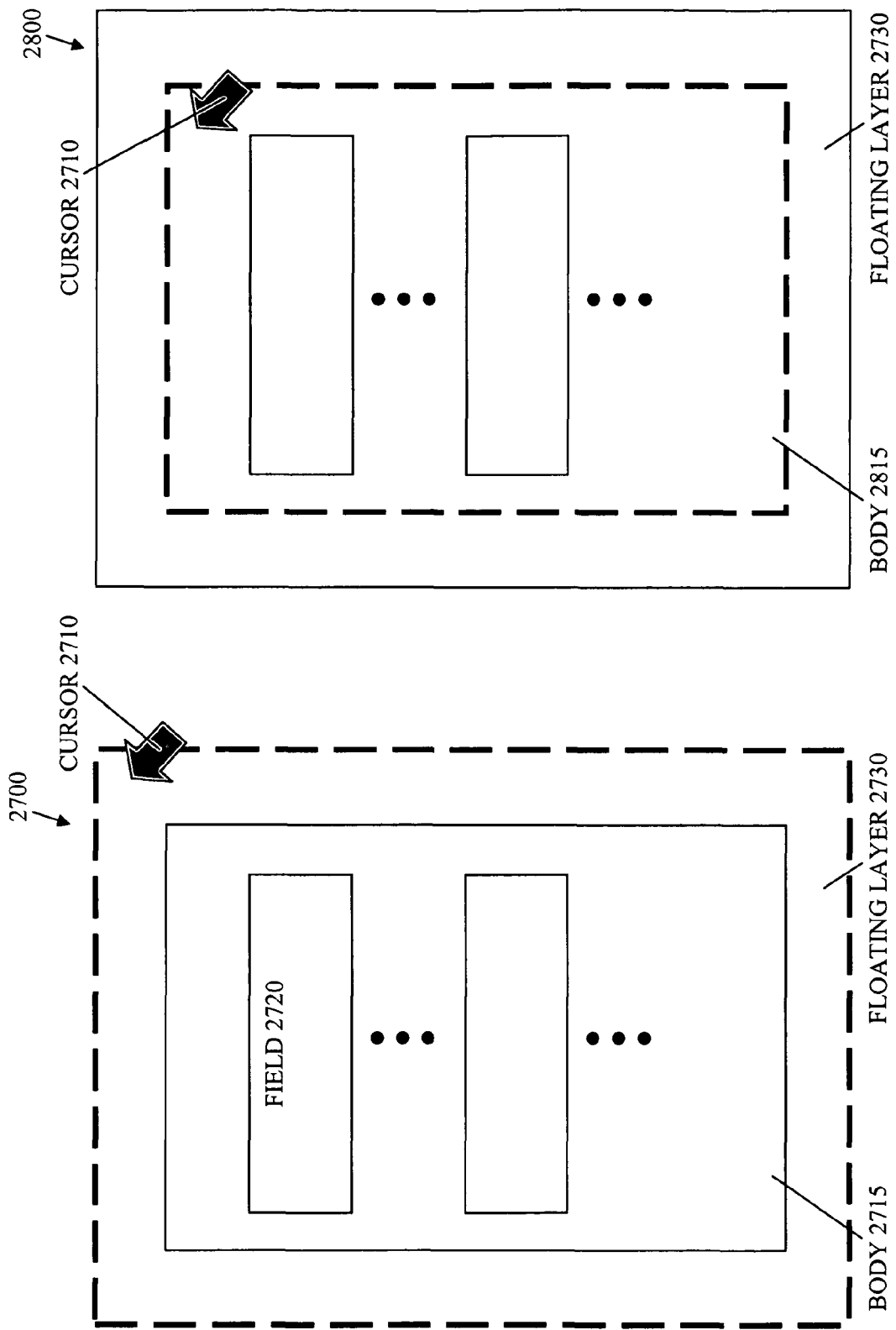

Main body text. ¶

Second paragraph with a character style and a .... → .... tab. ¶

List of items:

1. First 1.1. Sublevel-1

1.1.1. Sublevel-2

💡 Second

🖼️ Third

Figure 46

Text-in-the-second-section. New-layout-with-multiple-columns.-New-layout-with-multiple-columns.-New-layout-with-multiple-columns.-New-layout-with-multiple-col-¶

¶ umns.-New-layout-with-multiple-columns.-New-layout-with-multiple-columns.-New-layout-withmultiple-columns.-New-layout-with-multiple-columns.-

Figure 47

Some·fields·and·attachments:·July·25,·2005·2:43·PM··page·number:·5·of:·7.¶

¶

Text·in·a·book¶ mark,·and·a·hyperlink.¶

Figure 48

Footnotes[1],·too[2]¶

¶

———————
[1]·First·footnote

[2]·This·is·the·footnote·text.

Figure 49

METHOD AND APPARATUS FOR DEFINING DOCUMENTS

CLAIM OF BENEFIT TO RELATED APPLICATIONS

This application is the continuation in part of U.S. patent application Ser. No. 11/033,480, entitled "Efficient Creation of Documents," filed Jan. 10, 2005. This application is also the continuation in part to U.S. patent application Ser. No. 11/033,484, entitled "Efficient Creation of Documents," filed Jan. 10, 2005. This application also claims the benefit of U.S. Provisional Application 60/651,479, entitled "Efficient Creation of Documents," filed Jan. 9, 2005.

FIELD OF THE INVENTION

The invention relates to efficient creation of documents.

BACKGROUND OF THE INVENTION

Among the myriad of applications available today, it is still difficult to locate a streamlined, yet powerful word processing application that gives the average user the ability to easily create well-designed documents. On a daily basis, users create documents from a simple letter or invitation to a newsletter or brochure. Users typically compose and design a variety of these documents on a computer. While computers have aided the user, computers have added complication as well with difficult to use tools and unintuitive, unimaginative interfaces. Often current applications hinder users from changing the layout and look of the documents they create because of the rigid format and structure of the templates offered to the user, or the lack of usability of the interface or application itself.

Users often have needs of presenting content in a particular format such as data by using any number of tables or charts. Current applications attempt to incorporate the more specialized content or formatted data into their documents in awkward fashion. Furthermore, current applications have lagged behind the need of users to incorporate a multitude of latest generation text and graphics types, and multimedia-based content such as movies, hyperlinks, and audio. The need and ability to publish documents online has also added new advances and challenges to the average user.

As mentioned, the templates that come with existing applications may not always fit the job. Thus, a user may be required to apply design knowledge or advanced computer skill to create user specific tools such as templates that suit the user's particular needs. However, creating such customized tools may represent a daunting task to even those well versed in the use of the application. Even to those users lucky enough to overcome the obstacles, much time will be spent both on elements of design and computer expertise by many users whose primary job function or interest is neither of these.

One obvious solution to the failings of existing applications and templates is to add more rigid, confined templates that may or may not fit the purpose and design goals of the user. Another solution is to allow the user to start from a plain document or a blank template, without pre-formatting which allows a user to build a needed template. However, building from scratch defeats the purpose of having templates. Therefore, neither of these solutions really offers a complete answer to users attempting to create a variety of documents using the latest content. An improved solution would involve both a large complement of pre-designed templates as well as the ability to further expand and configure these templates for individual tasks.

Thus, there is a need in the art for an application that is better suited to current content and needs of users. There is also a need in the art for a variety of document template types from which to choose. There is a further need in the art for the ability to expand templates. Moreover, there is a need in the art to facilitate user expansion and configuration of templates. For instance, to at least partially meet the needs mentioned above, a user should have the ability to drag or place content (e.g., imported graphics, movies, sound, text boxes, charts, tables, and shapes) onto a page of a multi-page use configurable template.

SUMMARY OF THE INVENTION

Some embodiments provide a method that efficiently designs a document. The method initially provides the user with a selection of templates, each with a default configuration for content. After the user selects a template, the method provides the user with a selection of page designs to add to the selected template. When the user selects one of the page designs, the method adds the page design to a document that it presents to the user based on the selected template.

In some embodiments, the method presents to the user a default document with a set of page designs initially when the user selects the template from the selection of templates. In some embodiments, each template has an associated set of page designs that were specifically designed a priori to match the theme of the template.

Some embodiments provide methods for modifying default content of template documents that have several default text fields. When a user selects a default text field, the method of some embodiments selects the entire default text field for immediate editing by the user. In some embodiments, the method highlights a text field selected by the user. Also, in some embodiments, the method deletes the entire default content of the text field when the user provides new content for the selected field. In some embodiments, the new content can be text, image, or other type of content.

Some embodiments define a template document in terms of several default fields for holding content. Some of these embodiments highlight the different fields on a presented template document as the user drags content over the fields. In some embodiments, several layers form the template document. Instead of, or in conjunction with the highlighting of the fields, some embodiments also highlight the different layers that form the template document as the user drags content over the document. Some embodiments also move and/or change the shape of default fields when a user adds content in the vicinity of the default fields.

Some embodiments provide a method, in a data for storing a document. The document is created by using a set of template pages. The method, in a data storage structure, creates a first prototype section for storing information for the template pages. The method also, in the data storage structure, creates a second section for storing a set of content for the document.

In some embodiments, the template pages are provided by a word-processing application. In some embodiments, the information for the template pages includes text information, image information, and thumbnails information. In some embodiments, a word-processing application utilizes the stored thumbnails in the prototype section to generate a visual representation of a template page contents to a user to assist the user in creating a document. In some embodiments, the template pages further include stylesheet information, headers information, and footers information.

BRIEF DESCRIPTION OF THE DRAWINGS

The novel features of the invention are set forth in the appended claims. However, for purpose of explanation, several embodiments of the invention are set forth in the following figures.

FIG. 27 illustrates highlighting the border of a floating layer when a cursor is over the floating layer of a document.

FIG. 28 illustrates highlighting the border of a body when a cursor is over the body of a document.

FIG. 45 illustrates an example output for the main body text and a bolded character style, followed by a tab.

FIG. 46 illustrates an example output for a list of items in outline form.

FIG. 47 illustrates an example output for a page layout with multiple columns.

FIG. 48 illustrates an example output for a text object with date-time fields, page numbers, bookmarks, and hypertext links.

FIG. 49 illustrates an example output for a text object with footnotes.

DETAILED DESCRIPTION OF THE INVENTION

Figure 1:
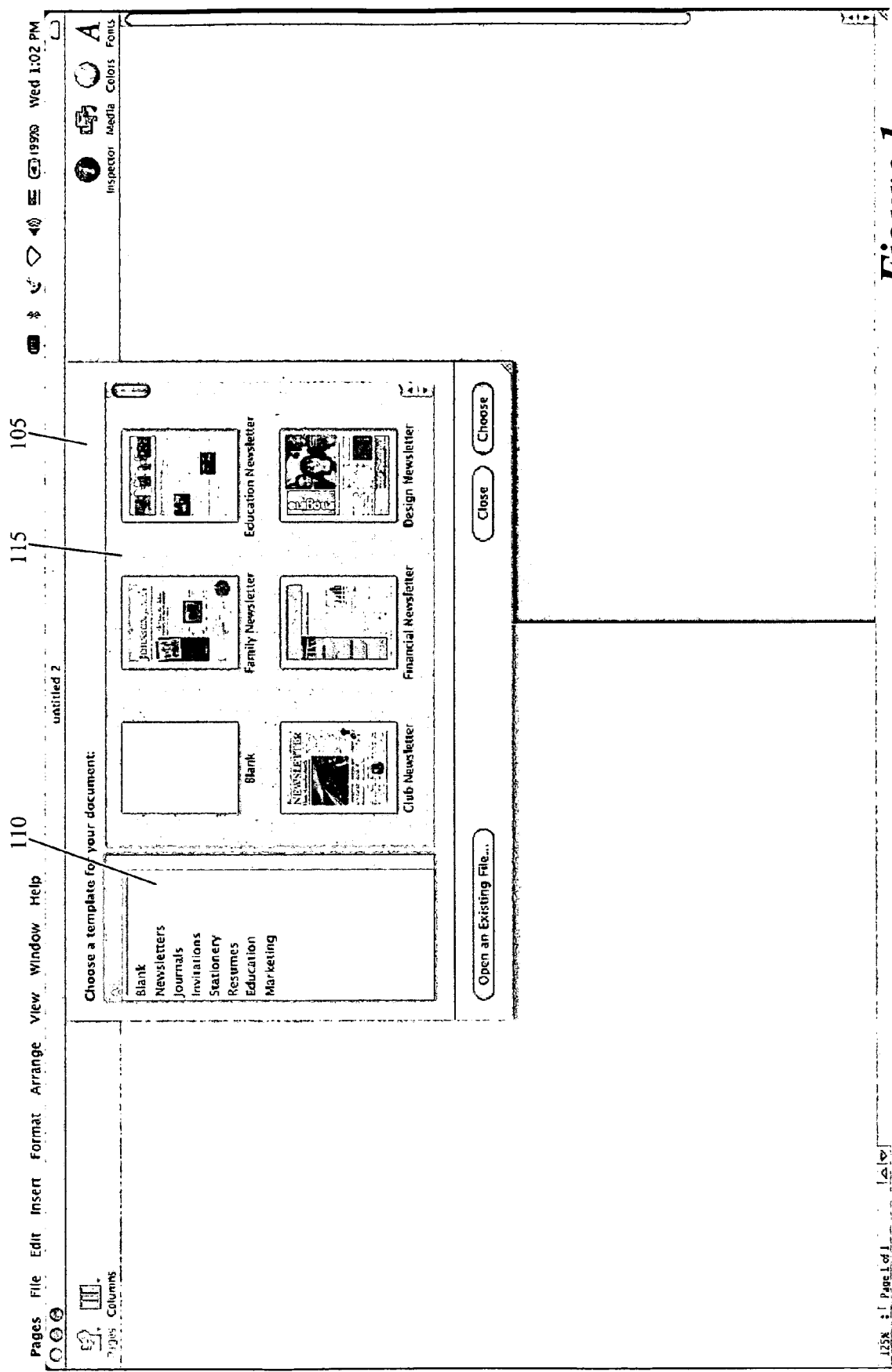
FIG. 1 illustrates several user selectable and configurable templates in a menu.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method that efficiently designs a document. The method initially provides the user with a selection of templates, each with a default configuration for content. After the user selects a template, the method provides the user with a selection of page designs to add to the selected template. When the user selects one of the page designs, the method adds the page design to a document that it presents to the user based on the selected template.

In some embodiments, the method presents to the user a default document with a set of page designs initially when the user selects the template from the selection of templates. In some embodiments, each template has an associated set of page designs that were specifically designed a priori to match the theme of the template.

Some embodiments provide methods for modifying default content of template documents that have several default text fields. When a user selects a default text field, the method of some embodiments selects the entire default text field for immediate editing by the user. In some embodiments, the method highlights a text field selected by the user. Also, in some embodiments, the method deletes the entire default content of the text field when the user provides new content for the selected field. In some embodiments, the new content can be text, image, or other type of content.

Some embodiments define a template document in terms of several default fields for holding content. Some of these embodiments highlight the different fields on a presented template document as the user drags content over the fields. In some embodiments, several layers form the template document. Instead of, or in conjunction with the highlighting of the fields, some embodiments also highlight the different layers that form the template document as the user drags content over the document. Some embodiments also move and/or change the shape of default fields when a user adds content in the vicinity of the default fields.

Some embodiments provide a method for storing a document. The document is created by using a set of template pages. The method, in a data storage structure, creates a first prototype section for storing information for the template pages. The method also, in the data storage structure, creates a second section for storing a set of content for the document.

In some embodiments, the template pages are provided by a word-processing application. In some embodiments, the information for the template pages includes text information, image information, and thumbnail information. In some embodiments, a word-processing application utilizes the stored thumbnails in the prototypes section to generate a visual representation of a template page contents to a user to assist the user in creating a document. In some embodiments, the template pages further include stylesheet information, headers information, and footers information.

Several more detailed embodiments will now be described. These embodiments are implemented by a word processing application. One of ordinary skill will realize that the invention can be implemented within other applications, such as applications for preparing presentations (e.g., Keynote®, PowerPoint®, etc.).

The description below is divided into three sections. Section I describes selecting and configuring a template document with multiple page designs to quickly create a custom document. Section II describes modifying default content provided in a template document. Section III then describes the software design of a document in some embodiments of the invention. Section IV describes a computer system with which some embodiments of the invention are implemented.

I. SELECTING AND CONFIGURING A TEMPLATE

A. Selecting a Template

The word-processing application of some embodiments allows a user to select a template document from a list of template types. The application then presents the user with one or more template pages, one or more of which have default page designs associated with the selected template. As used herein, a template document or page refers to a document or page created by using a particular template before the addition of any user content.

For the user's convenience, the word processing application groups the preconfigured templates into several template types as shown in FIG. 1. Specifically, FIG. 1 shows a template-selection menu 105 that the application presents to the user when the user starts the application or tries to open a new document through the application. As shown in this figure, the template-selection menu includes two display sections, a template-type display section 110 and a template-preview display section 115.

The template-type display section 110 lists the types of templates provided by the application. For instance, in the example illustrated in FIG. 1, this section illustrates the following selectable template types: All, Blank, Newsletters, Journals, Invitations, Stationary, Resumes, Education, and Marketing template types.

The template-preview display section 115 provides a thumbnail preview of each template that the application provides for the template type that is selected in the template-type window 110. In the example illustrated in FIG. 1, the type selected in the template-type section 110 is the "All" type, which, in some embodiments, includes all the template types. Accordingly, in this example, the template-preview display section 115 provides a thumbnail preview of all the templates provided by the application.

Figure 2:
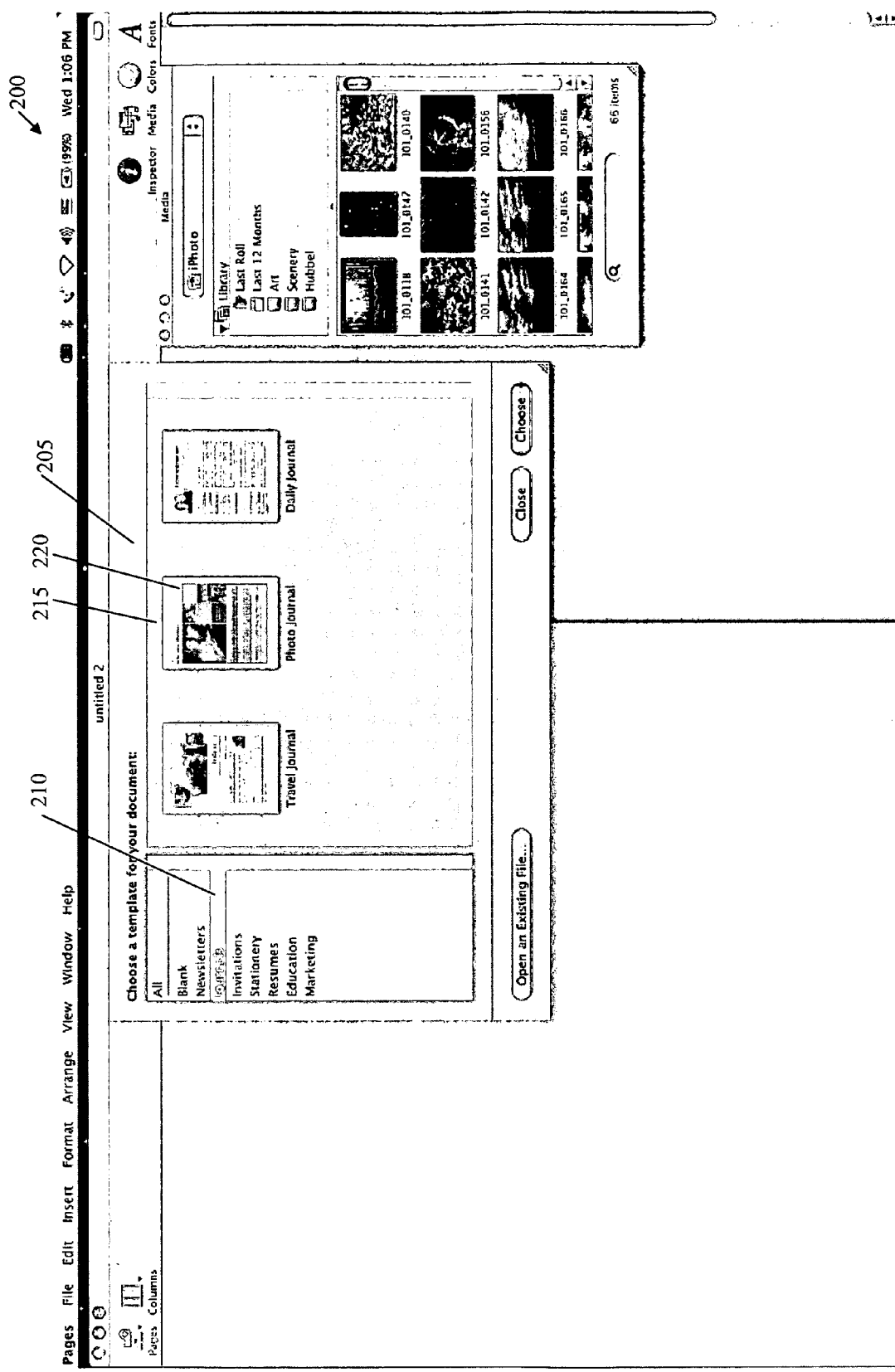
FIG. 2 illustrates a Photo Journal template among the Journal type templates.

On the other hand, FIG. 2 illustrates an example where a user has selected the Journal template type 210 in the template-type section 110. Hence, in this example, the template-preview display section 215 illustrates thumbnail previews of each journal template provided by the application. These templates include Travel, Photo, and Daily Journal templates.

Figure 3:
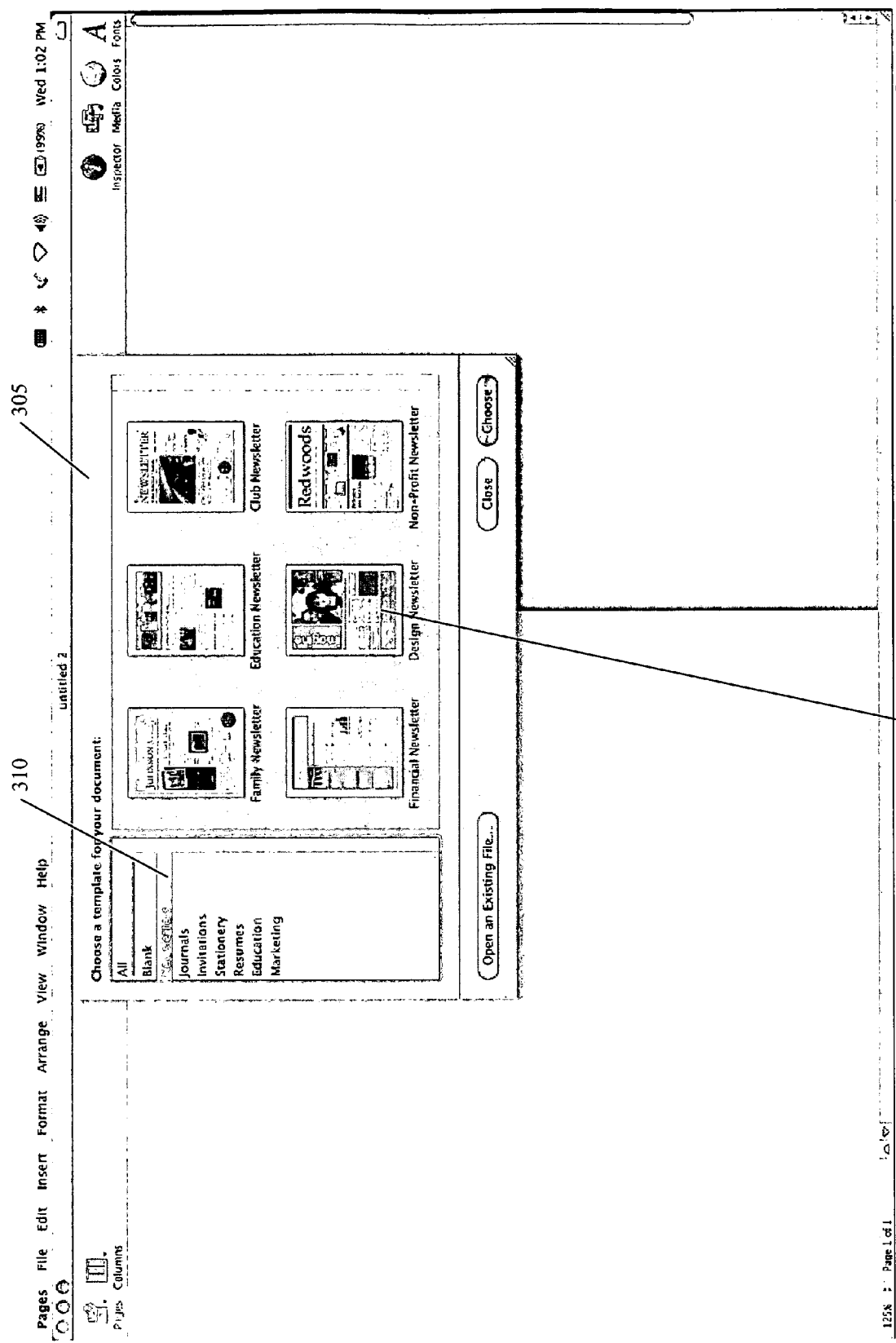
FIG. 3 illustrates an example where a user has selected the Newsletters type.

Similarly, FIG. 3 illustrates an example where a user has selected the Newsletters type 310. In this example, the template preview section 115 illustrates thumbnail previews of each newsletter template provided by the application. These templates include Family, Education, Club, Financial, Design, and Non-Profit newsletter templates. In the examples described above, each thumbnail preview in the preview section 115 is a preview illustration of a first page design for each template available in the menu 105.

B. Viewing Template Document and Adding Template Pages

Figure 4:
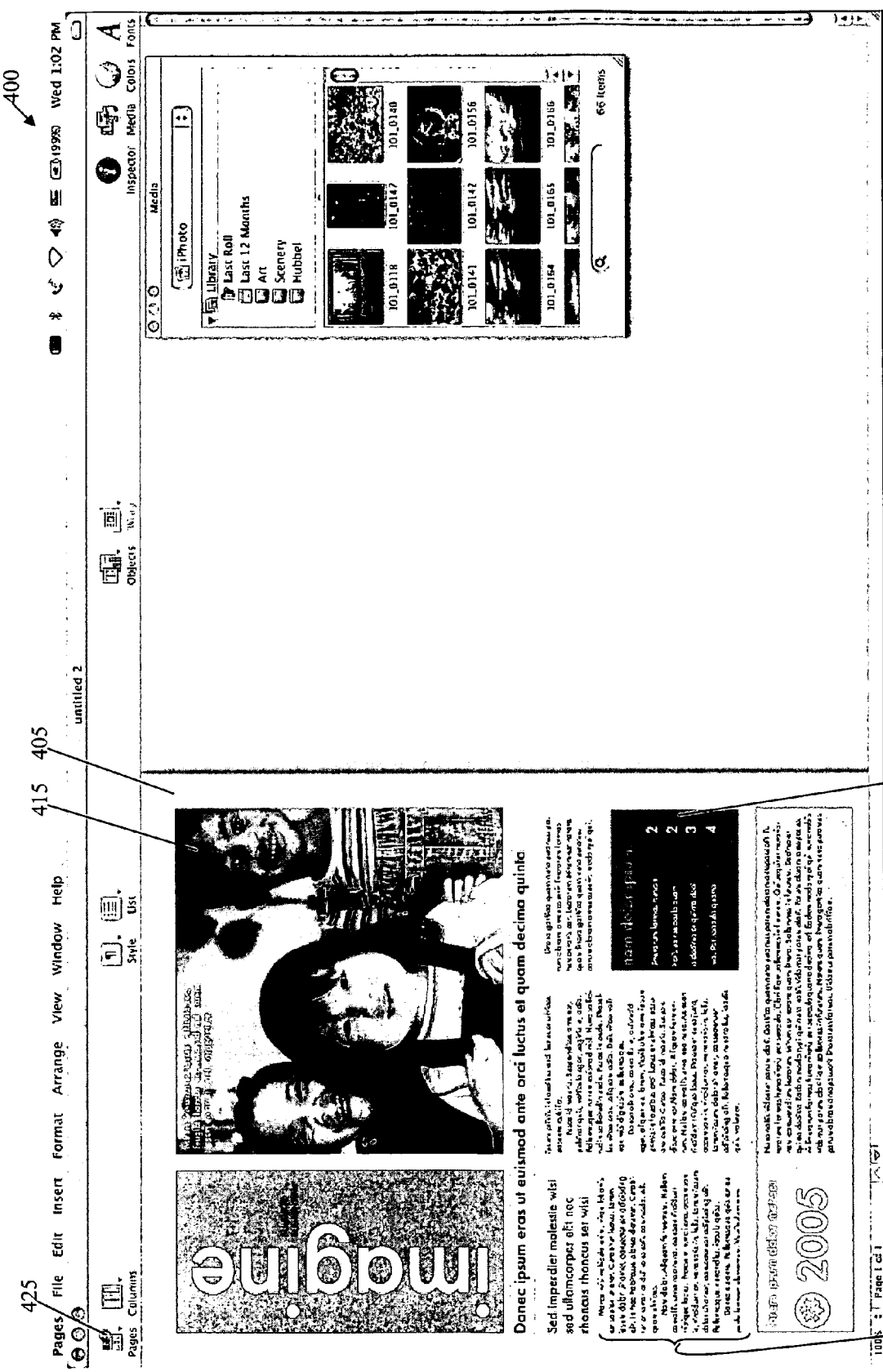
FIG. 4 illustrates a Cover page design of the Design Newsletter template.

When a user selects one template from the preview section 115, the application presents to the user a template document based on the selected template. For instance, FIG. 4 illustrates the presentation of a page 405 based on the Design Newsletter template 315 (previewed in FIG. 3). The application would display this page to the user when the user selects the Design Newsletter template 315 in the template-preview section 115. For some templates, the application presents a template document with only one page, while for other templates the application presents a template document with several pages. Each template page that the application presents to the user has a default page design that is associated with the selected template.

Figure 5:
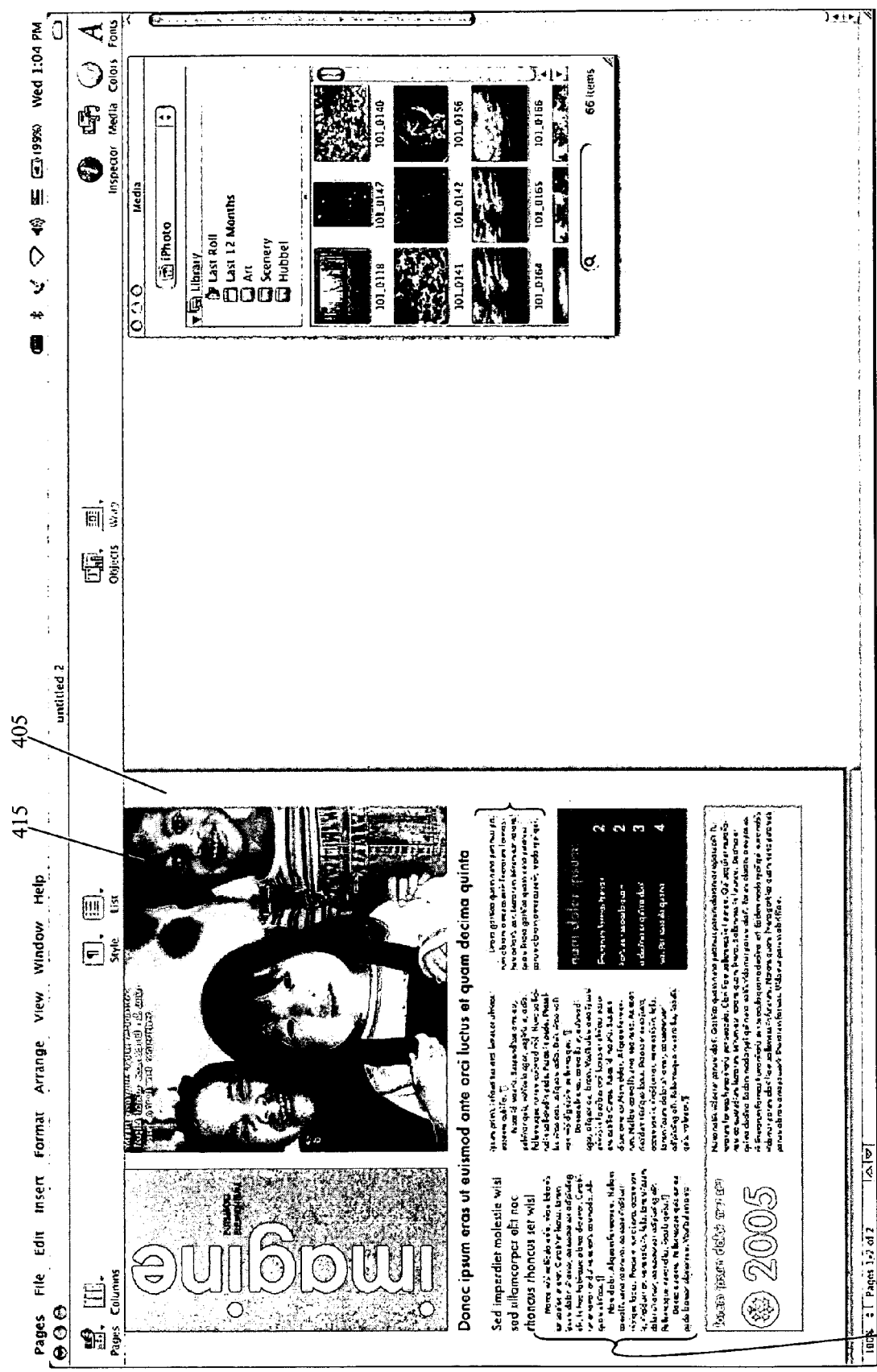
FIG. 5 illustrates the entire contents of a field in the page design selected and highlighted with just a single click of a pointing device.

Also, in some embodiments, each template page has one or more content fields that are populated by default placeholder content that can be quickly removed and/or edited by the user, as further described below in Section II. These fields typically contain default content that suggests to the user the expected appearance of the user's own content. For instance, the page 405 shown in FIG. 4 is based on the Cover page design of the Design Newsletter template. As shown in FIG. 4, a first field 410 in the center of the page 405 contains default content in the form of placeholder text. The default content generally conveys to the user the font and formatting that is used in the field 410. In addition, when highlighted, the placeholder text of the first field 410 delineates the border of the first field 410 from the surrounding template page 405 and other fields (e.g., a second field 415), as shown in FIG. 5.

Figure 6:
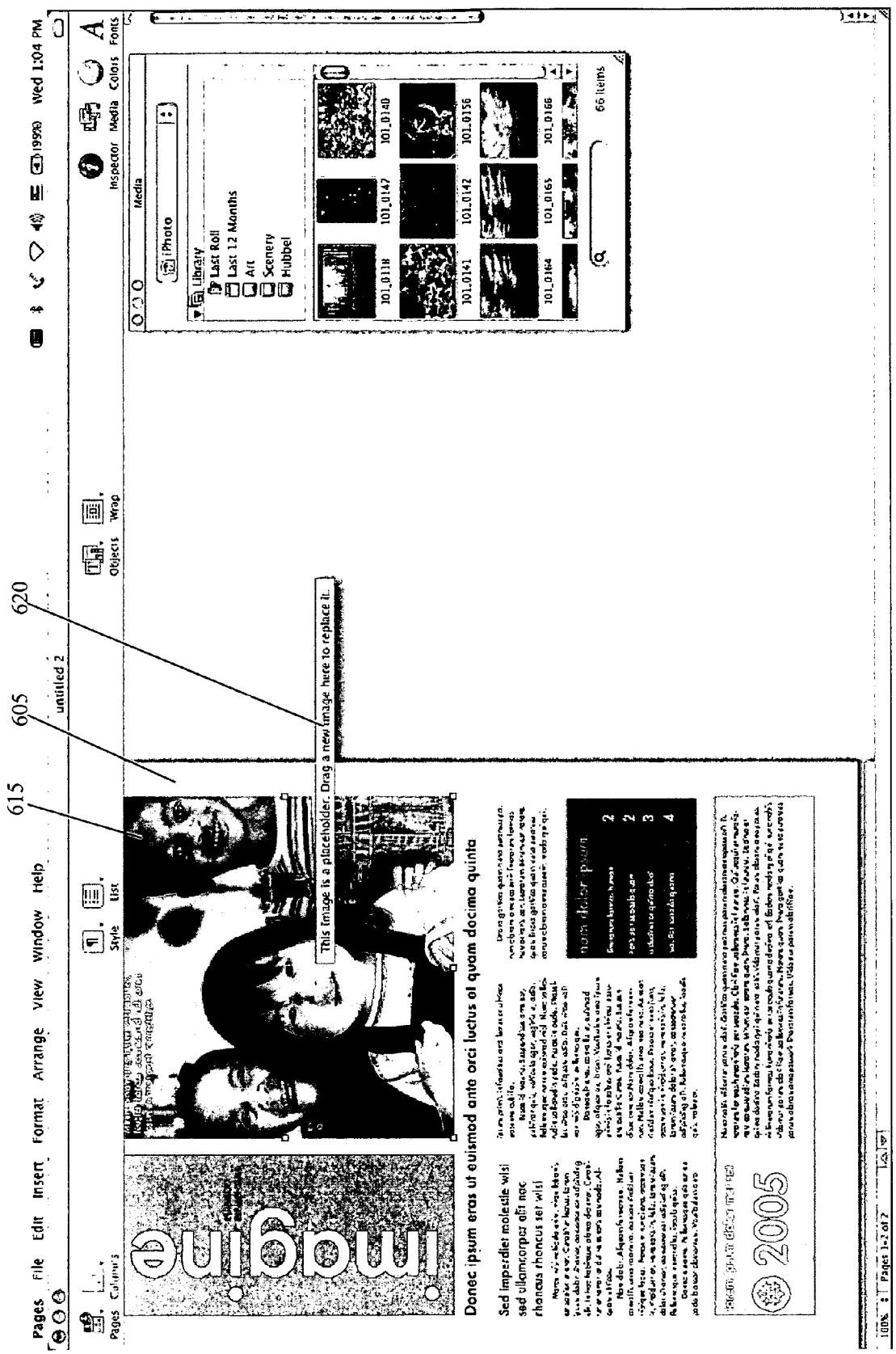
FIG. 6 illustrates a prompt to a user that the image contents of a field are merely a placeholder that is intended to be replaced by the user's own content.

In some embodiments, placeholder text is in Latin to distinguish the placeholder text from the user's own content. However, any number of languages, symbols, or other distinguishing content could be used as a placeholder in the first field 410. In addition to text, the default content of a template page might include other placeholder content, such as images, graphics, colors, sounds, video, etc. For instance, FIG. 6 shows an image occupying a field 615 in the upper right portion of the template page 605. As shown in this figure, when the cursor is placed over such a field 615, the user is prompted by a message 620 stating that the contents of the field merely represent a placeholder for the user's own content.

Figure 7:
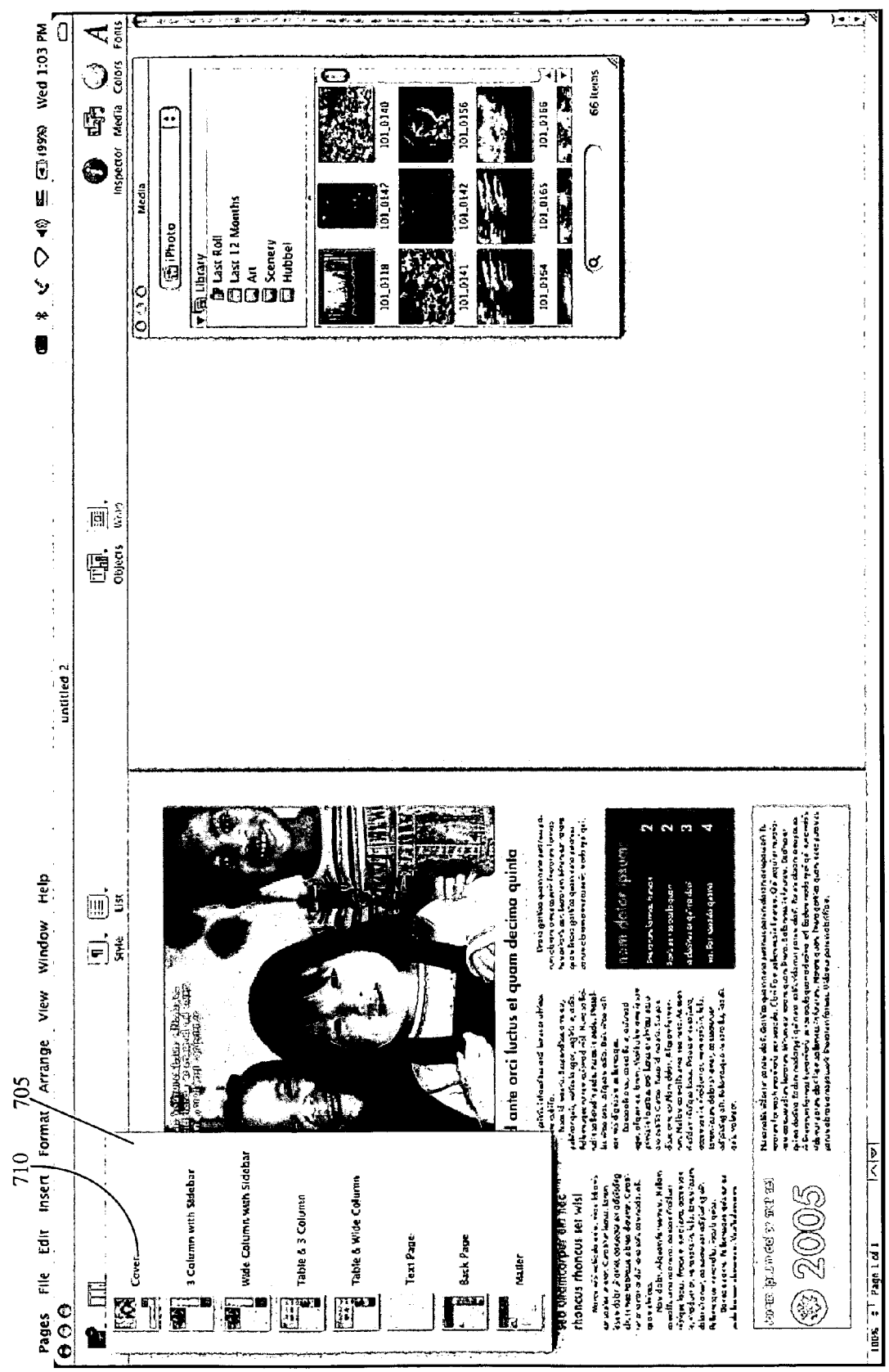
FIG. 7 illustrates a dropdown menu for selection of additional page designs in the Design Newsletter template.

Once the application presents a template document to the user, the user can get a list of other page designs that the user can use to add other template pages to the template document. This list is accessible to the user in a variety of ways. One way is through the menu options on top of the application's window. Another way is through a "Pages" icon 425 illustrated in FIG. 4. When the user selects this icon 425, a dropdown menu 705 appears to list several additional page designs that may be added to the template document currently open for editing, as shown in FIG. 7.

When the Design Newsletter template 315 is selected, the application creates a template document and specifies the first page of that document to have the first page design of the selected template 315, as shown in FIG. 4. As shown in the dropdown menu 705 in FIG. 7, the first page illustrated in FIG. 4 is the "Cover" page design 710 of the Design Newsletter template. The dropdown menu 705 also identifies the following page designs for the Design Newsletter template: 3 Column with Sidebar, Wide Column with Sidebar, Table & 3 Column, Table & Wide Column, Text Page, Back Page, and Mailer.

Figure 8:
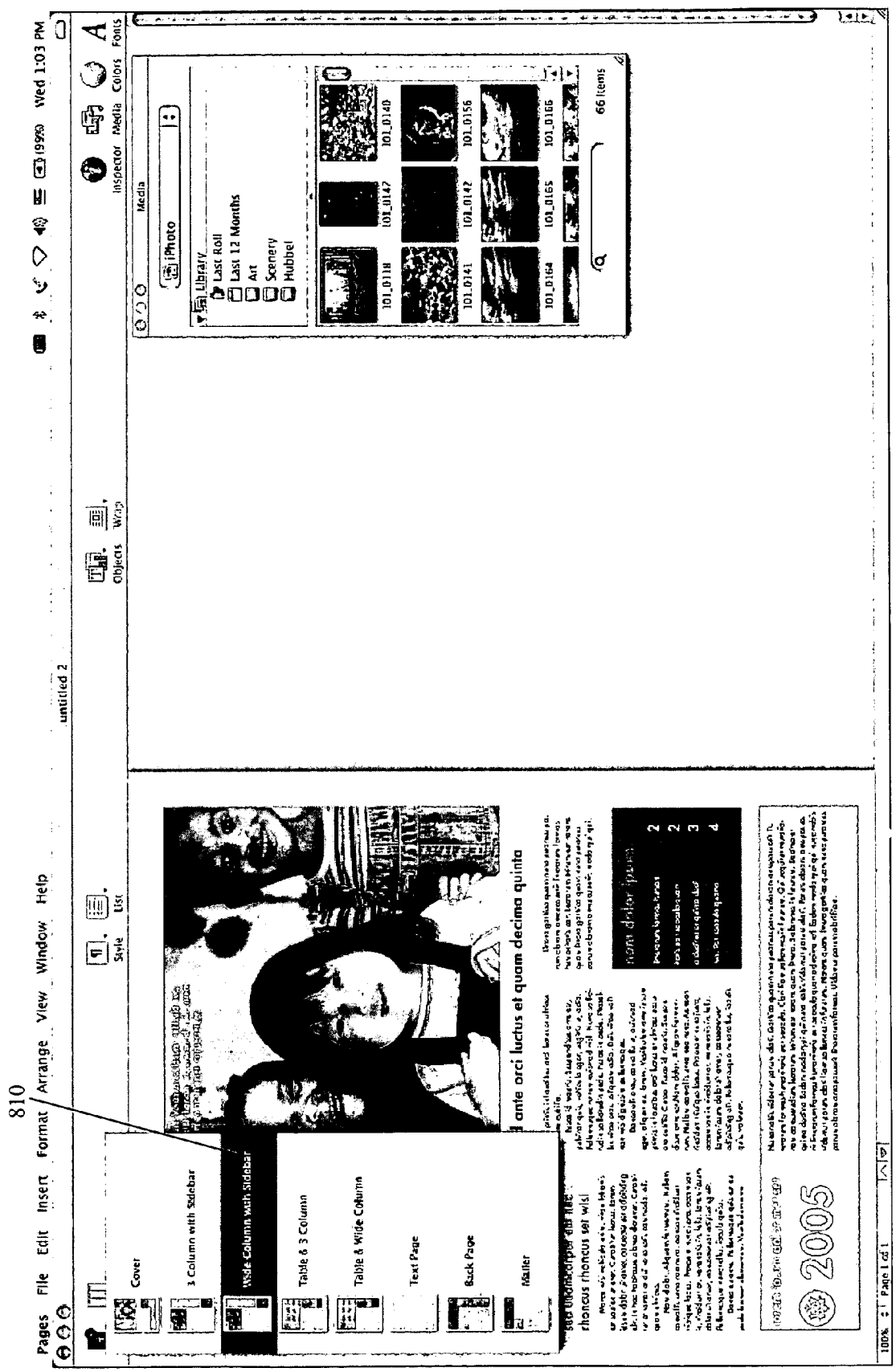
FIG. 8 illustrates selection of a Wide Column with Sidebar page design for insertion after the Cover page design in the Design Newsletter template.
Figure 9:
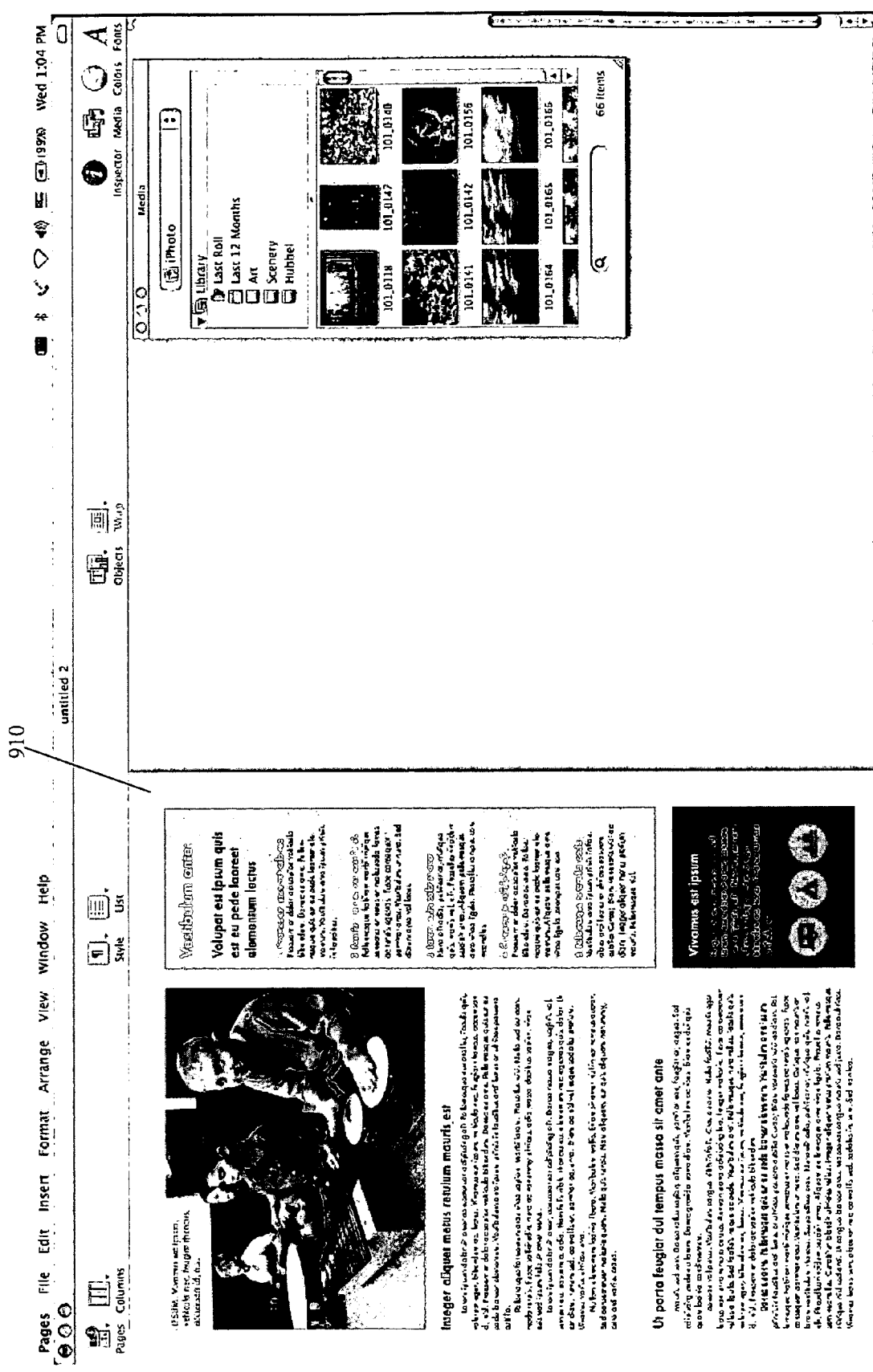
FIG. 9 illustrates the Wide Column with Sidebar page design inserted into the open document after the Cover page design.

The user may select one or more of the additional page designs from the dropdown menu 705 to custom configure the current template document created by using the Design Newsletter template. For instance, FIG. 8 shows the selection of the Wide Column with Sidebar page design 810. FIG. 9 illustrates the subsequent addition to the newsletter template document of a page 2 with the page design 810. As shown in FIG. 9, once the additional template page is inserted into the current template document, some embodiments display the most recently added page 910. Also, in some embodiments, the addition of a template page to a template document inserts the newly added template page after the template page currently in view. In this case, the page 2 is added after the default cover page of this template, which the application initially added to the document.

To further illustrate the current example, insertion of an additional template page to the current template document will be described. The result is a three-page template document. However, one of ordinary skill will recognize the many permutations of page design combinations possible for each template document.

Figure 10:
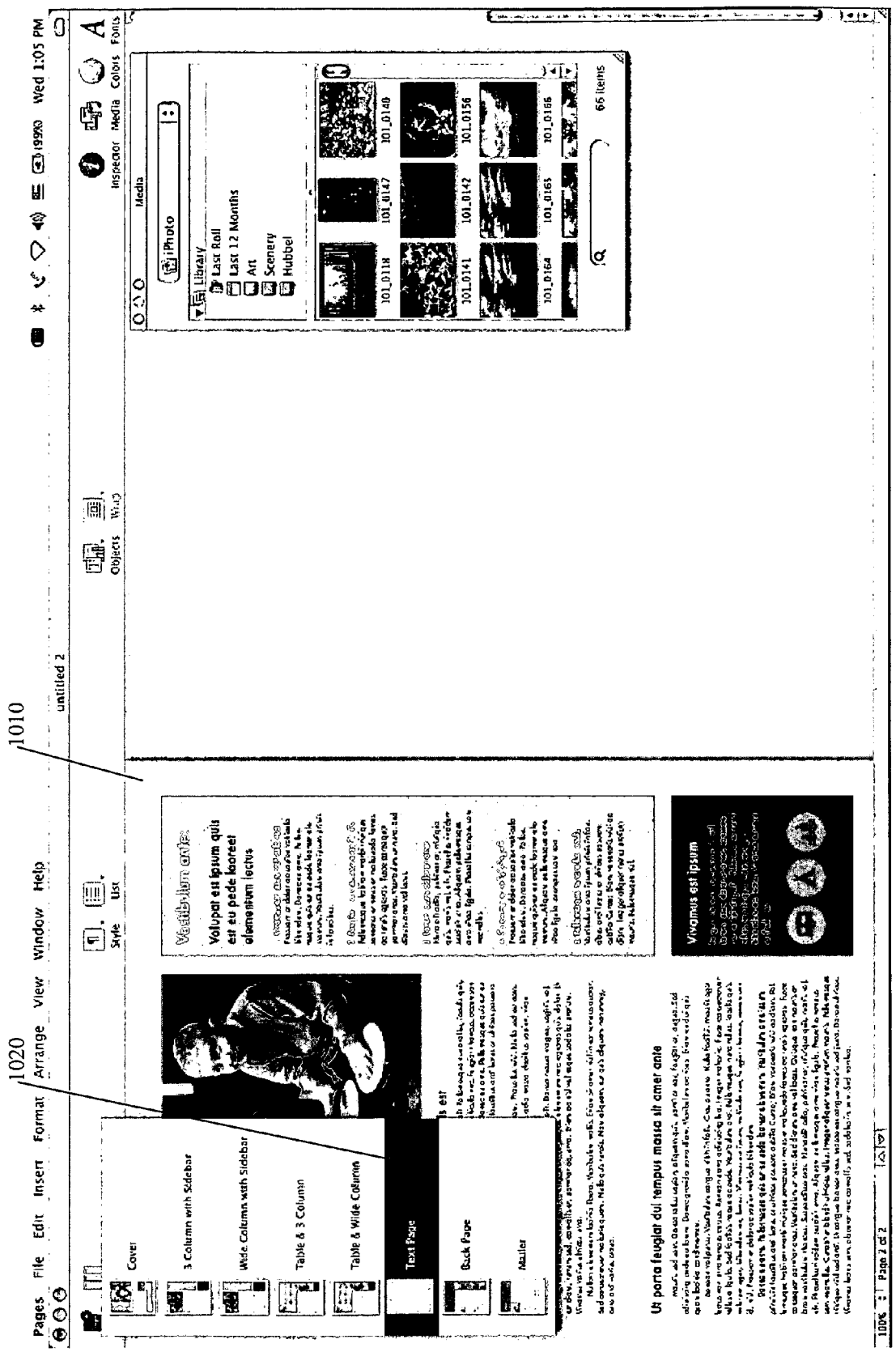
FIG. 10 illustrates selection of a Text Page for insertion into the open document.
Figure 11:
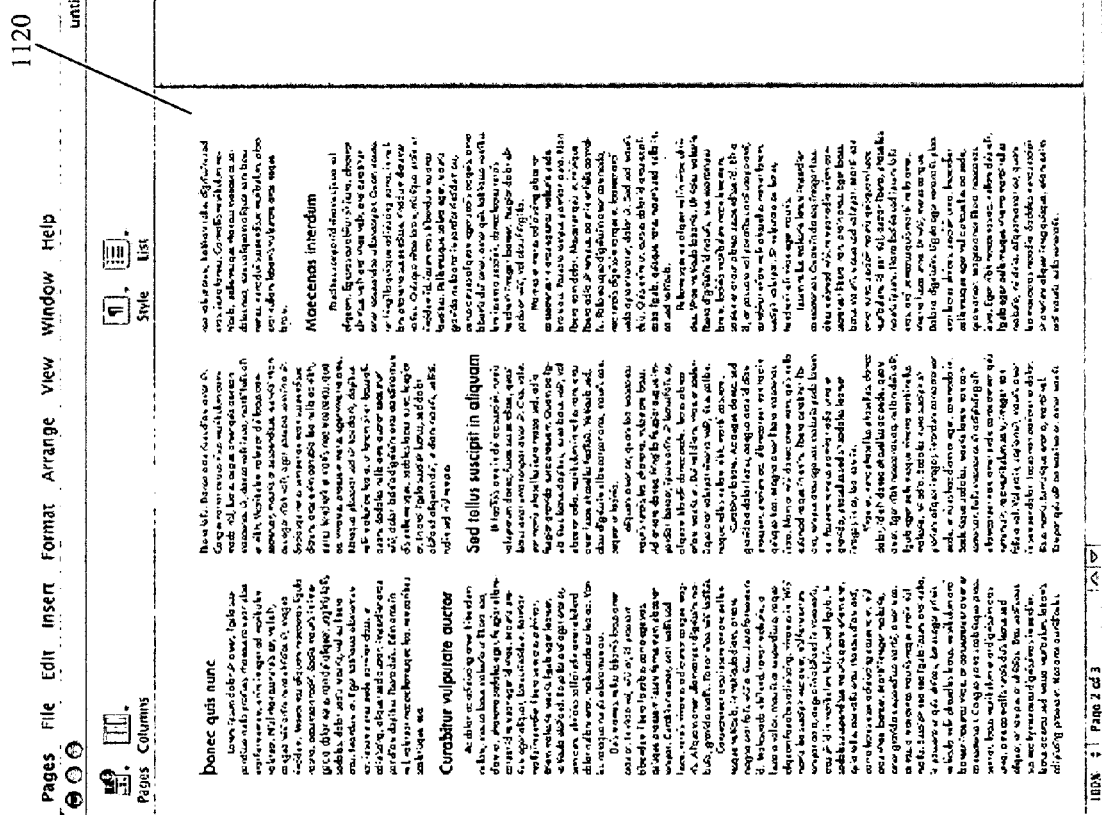
FIG. 11 illustrates the Text Page inserted into the open document.
Figure 12:
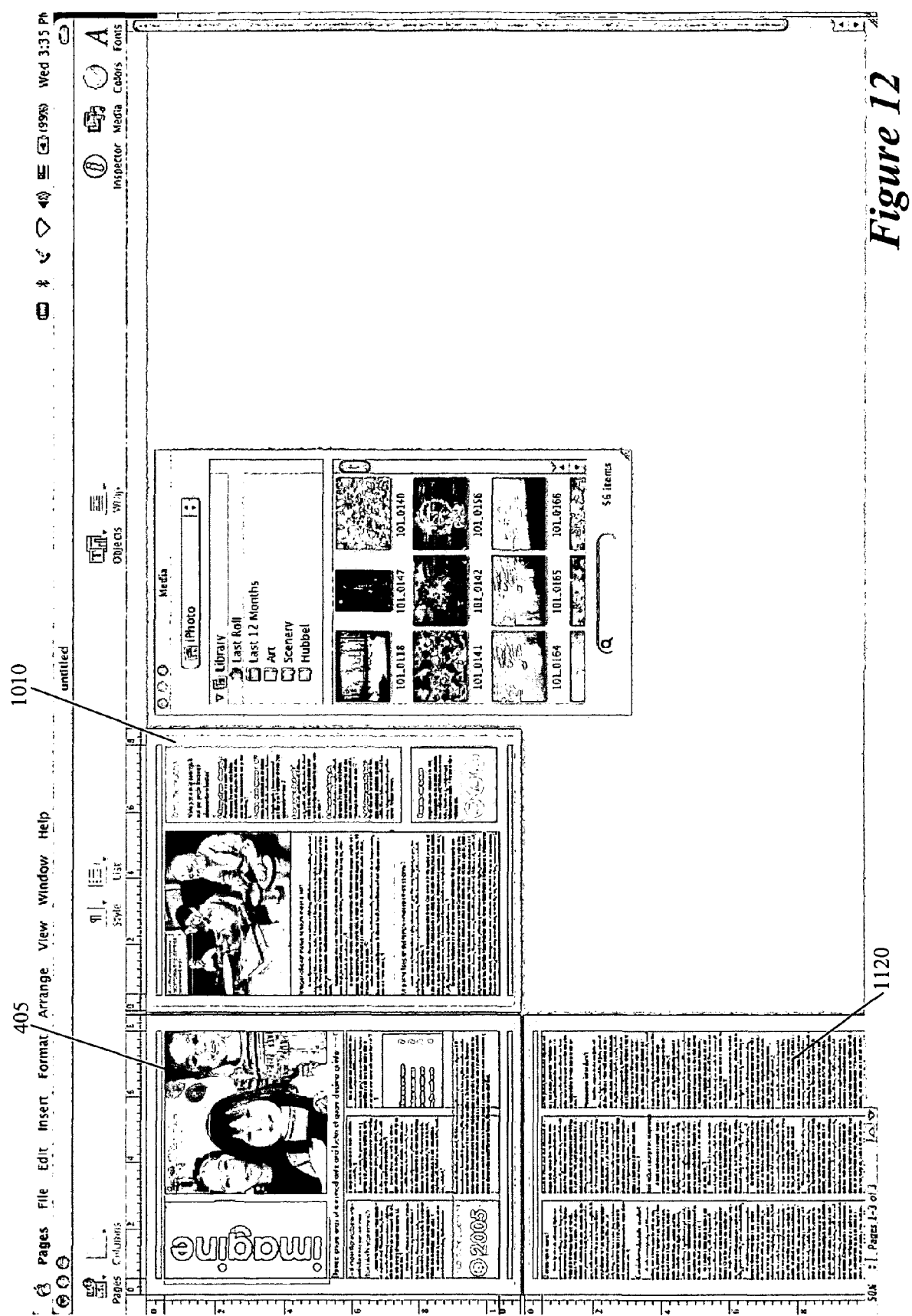
FIG. 12 illustrates the inserted page designs, the Cover, the Wide Column with Sidebar, and the Text Page, together in the same open document.

FIG. 10 shows the Text Page design 1020 selected for insertion after the Wide Column with Sidebar page design 1010. FIG. 11 then shows the newly added template page 1120, which is based on the Text Page design 1020, inserted after the previously added template page, which was based on the Wide Column with Sidebar page design. As shown in FIG. 12, the result is a three-page template document that includes three template pages with, respectively, a cover page 405, a wide-column-with-sidebar page 1010, and a text page 1120.

Figure 13:
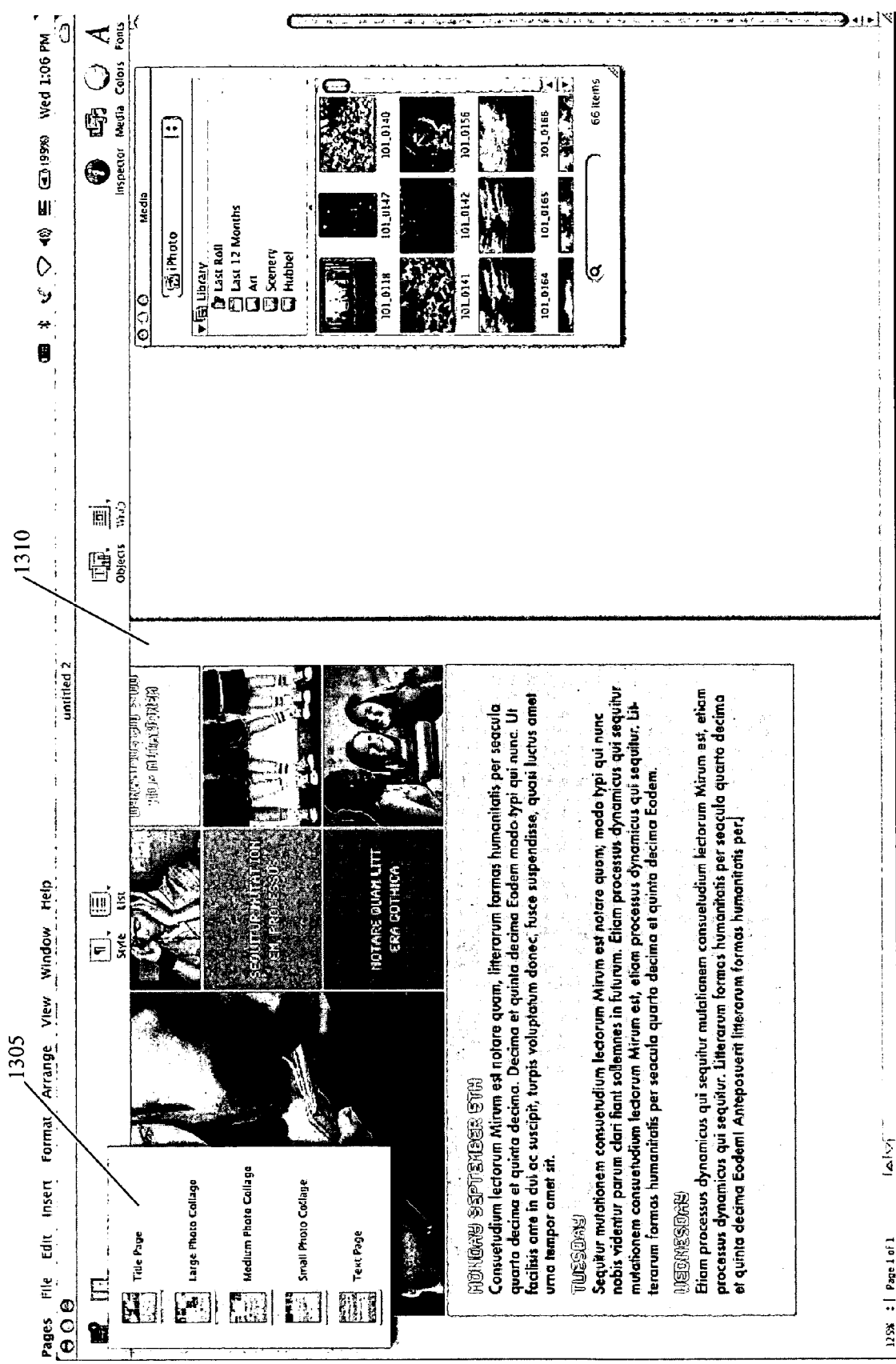
FIG. 13 illustrates a Title Page design of the Photo Journal template.
Figure 14:
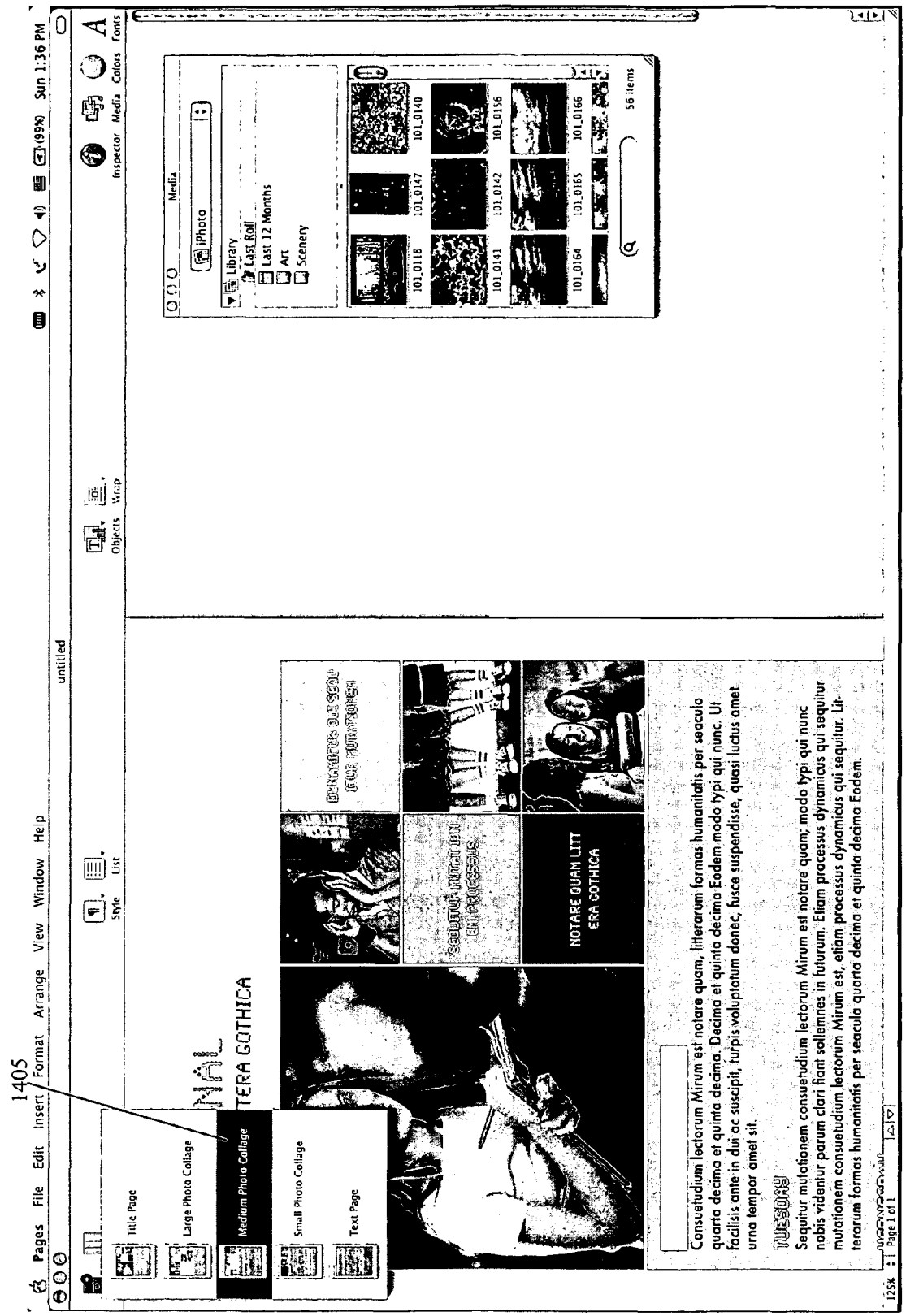
FIG. 14 illustrates a selection of a Medium Photo Collage page design of the Photo Journal template.
Figure 15:
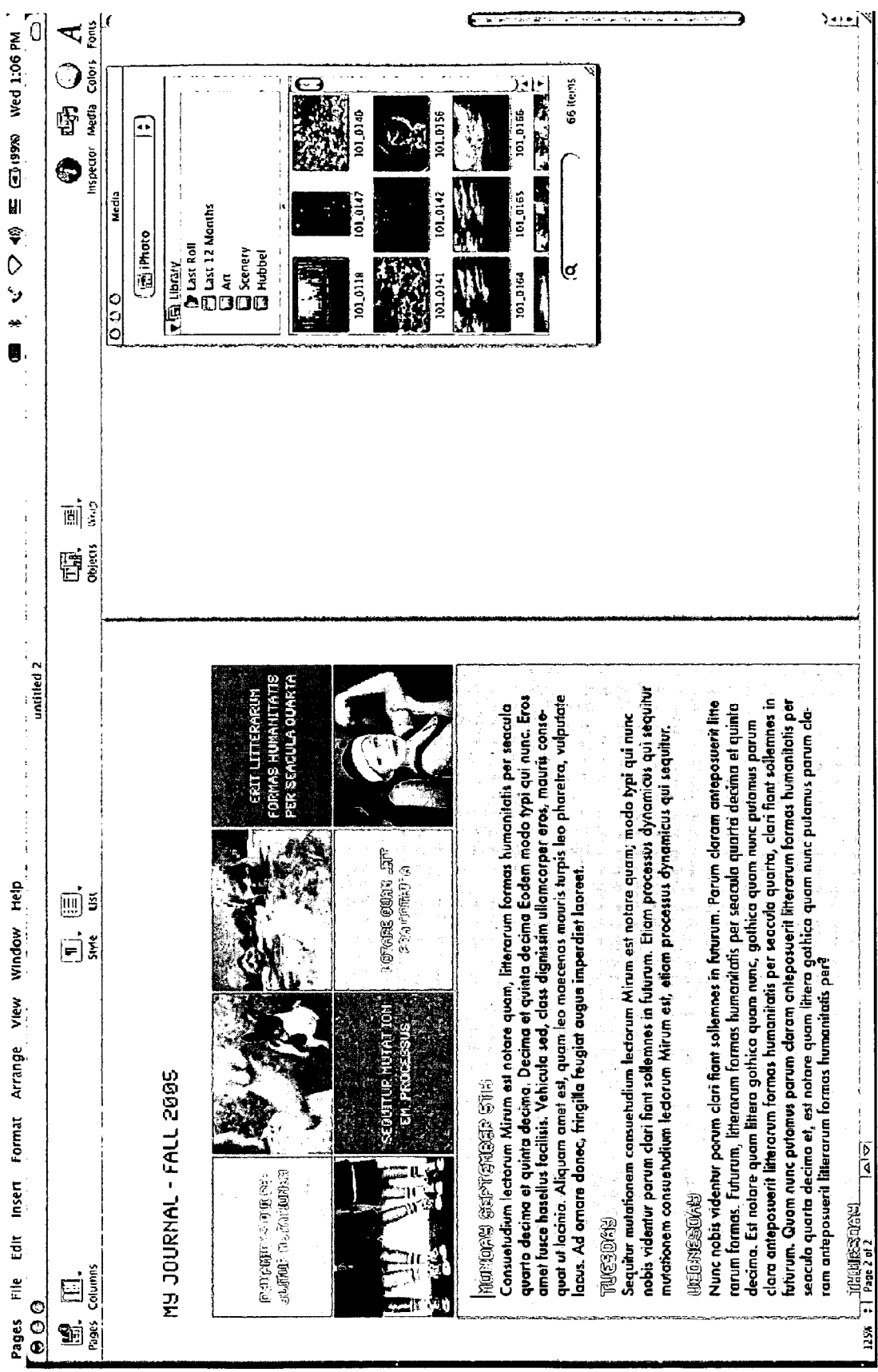
FIG. 15 illustrates a Medium Photo Collage page design added after the Title Page design in the Photo Journal template.

FIGS. 13, 14, and 15 provide another example of adding template pages to a template document. In the example shown in FIG. 2, the Journals templates 210 are chosen for display in the menu 205. When the Photo Journal template 220 is selected from the menu 205, the application creates a template document and specifies the first page of that document to have the first page design of the selected template 210, as shown in FIG. 13. As shown in the dropdown menu 1305 in FIG. 13, the first page design 1310 in the Photo Journal template is the Title Page design.

As mentioned above, each template has multiple different user selectable page designs that conveniently can replace or supplement the default page design(s) presented to the user in the default template document. For instance, the dropdown menu 1305 in FIG. 13 identifies the following page designs for the Photo Journal template: Title Page, Large Photo Collage, Medium Photo Collage, Small Photo Collage, and Text Page designs.

A user may assemble various permutations of these page designs in the presented template document to create a custom template document. For instance, FIG. 14 illustrates the selection of the Medium Photo Collage page design 1405. FIG. 15 illustrates the subsequent addition to the Photo Journal template document of a page 2 with the page design 1405. The newly added page 2 is inserted after the Title Page within the Photo Journal template document. Template pages may also be moved within a template document and removed from the template document in similar fashion.

In sum, the application allows a user to create a template document and add or delete one or more template pages that are based on one or more page designs, in order to create a desired template configuration. The page designs that are specified for a template are designed to match the theme of the template. In some embodiments, the selectable page designs are not only pre-designed, but may also have pre-specified formatting rules for automatic formatting of content. The pre-designed content and formatting aids a user who may have little knowledge of design principles or computer programming in quickly turning various content into aesthetically pleasing page designs.

Some embodiments allow the user to modify the preconfiguration of both existing and new templates and page designs in order to create custom user defined templates and page designs. These embodiments use a master page model that has three master pages (first, even, and odd master pages). A user can modify the page masters to create custom templates. The user in these embodiments may further create custom page design masters for the newly created custom templates.

II. ADDING AND REMOVING CONTENT

Once a template and page design(s) are selected to create a template document, the invention allows the user to easily modify the default content provided by the application, in order to quickly create a personalized user document. The user can modify the template document by adding new content, changing or deleting default content, importing or dragging existing content, etc. Content includes text, image, graphics, animation, video, audio, etc.

The invention's word processing application allows the user to select existing content and add this content to a page of the document through a variety of known manners in the art. For instance, the content can be selected from a menu within the application, from a file, from another application, etc., and it can be added to a page through a cut-and-paste operation, a drag-and-drop operation, etc.

Figure 16:
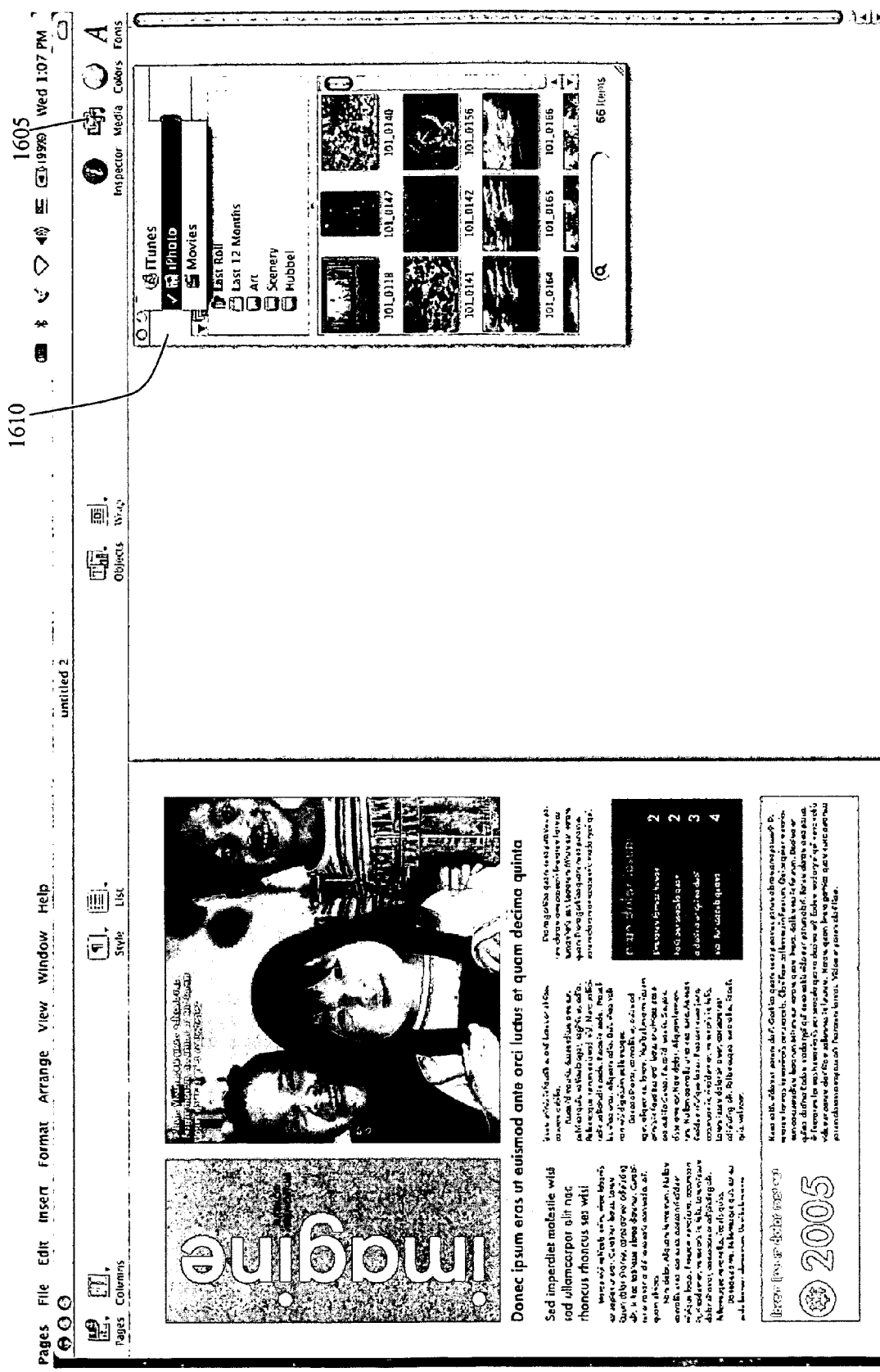
FIG. 16 illustrates a media button and media library for adding content next to a page design currently being viewed for editing.

The invention's application also provides unique ways for importing existing content into a document. Specifically, as illustrated in FIG. 16, the application includes a media button 1605 for accessing a library 1610 of media (i.e., content) on the computer. As shown in this figure, the media library 1610 allows a user to access content from a variety of files external to the page 405 of a document being edited. For instance, in some embodiments, these external files might include iTunes®, iPhoto®, and Movie (e.g. Quicktime®, etc.) files. More generally, the media button 1605 may be used to access a variety of content from a spectrum of media such as TIFF, GIF, JPEG, PDF, PSD, EPS, PICT, MOV, FLASH, MP3, MP4, AIFF, AAC, etc. Since content can be exchanged (i.e., moved to and from the media library 1610), some embodiments further allow easy building or augmentation of the media library 1610.

A. Replacing Placeholder Text with Text

Template pages are preconfigured with fields and placeholder content within the fields to suggest to a user a design format for the user to quickly add new content, which will supplement or replace existing content. The result is quick creation of attractive pages containing the user's own content.

1. Click Select Field

To facilitate the user's selection of a text field, some embodiments select the entire text field when the user selects any part of the field (e.g., clicks on a word in the text field). These embodiments select the placeholder text in its entirety to simplify the replacement of this text. Also, some of these embodiments highlight the entire field (e.g., in yellow) to reflect the selection of the field in its entirety.

Figure 17:
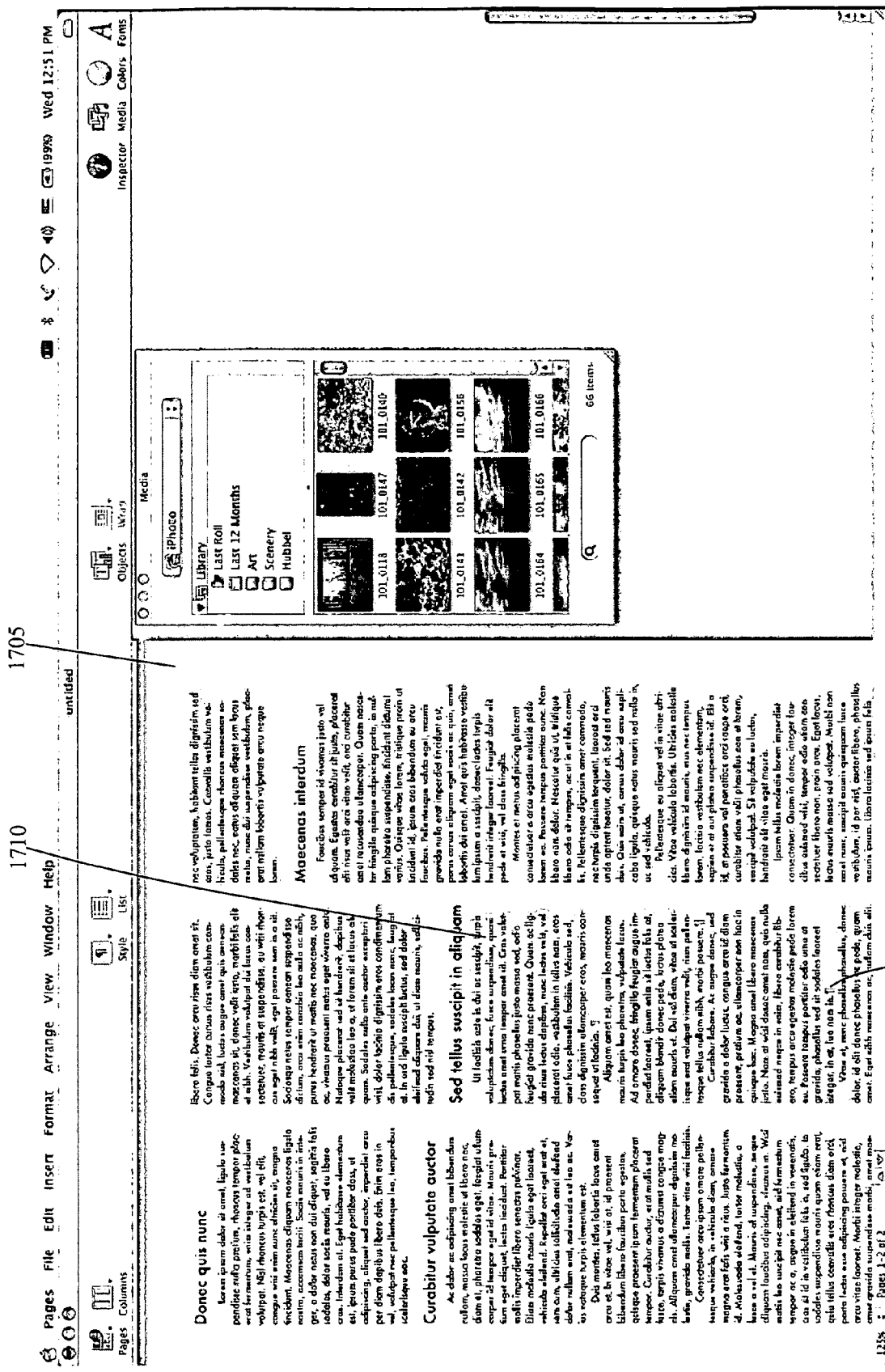
FIG. 17 illustrates the entire contents of a field containing placeholder text selected by a single click of the pointing device.
Figure 18:
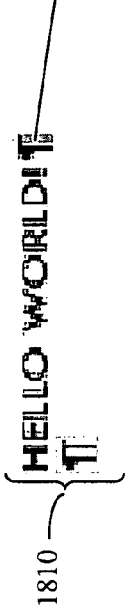
FIG. 18 illustrates a user replacing all the selected placeholder text by typing "HELLO WORLD!"

For instance, FIG. 17 illustrates a user selecting a field 1710 that contains default placeholder text in the text page 1705, which is based on a Text Page design of the Design Newsletter template previously described. As shown in this figure, the entire contents of the field 1710 (i.e., all the default placeholder text) are selected with a single click. Then, as shown in FIG. 18, the user has typed "HELLO WORLD!" to replace the default placeholder text that was selected in FIG. 17. In this example, the default placeholder text is replaced by the user typed text. However, one of ordinary skill in the art will recognize that the default placeholder text might be replaced through a variety of methods such as a drag-and-drop or a cut-and-paste operation.

2. Paragraph Character Revealed

In some embodiments, a drag or select operation in a field reveals the underlying formatting of the content within the field. This underlying formatting might include hidden characters such as a paragraph character (e.g., a paragraph character between in-line text). This feature is particularly useful for a user, while modifying the content of a field, to quickly understand the relationship between the in-line content in the field. For instance, paragraphs may need to be removed or added to enhance the view of content within the field.

FIG. 17 shows a page 1705 in a field 1710 currently selected for editing. In FIG. 17, the entire contents of the field 1710 are highlighted and the default placeholder text in the field 1710 reveals such formatting (e.g., hidden paragraph character 1725). FIG. 18 shows a paragraph character 1825 that is revealed after the selection of a portion of the text that the user added. In some embodiments, these hidden characters are displayed in blue to offset the yellow color used to highlight text in these embodiments.

B. Replacing Placeholder Text with Multimedia

Figure 19:
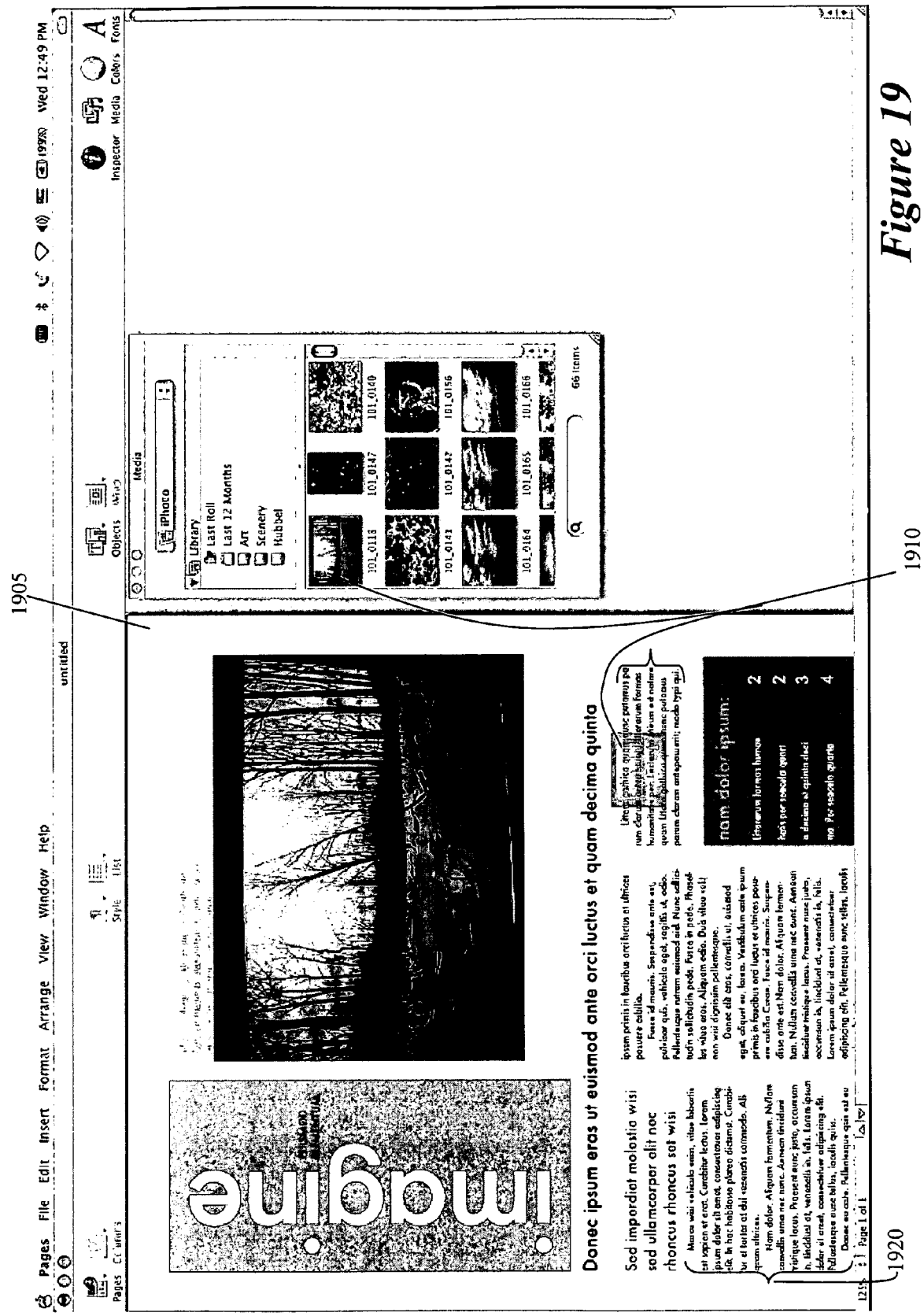
FIG. 19 illustrates a multimedia graphic selected in the media library to replace placeholder text in a field of the page design currently being viewed for editing.
Figure 20:
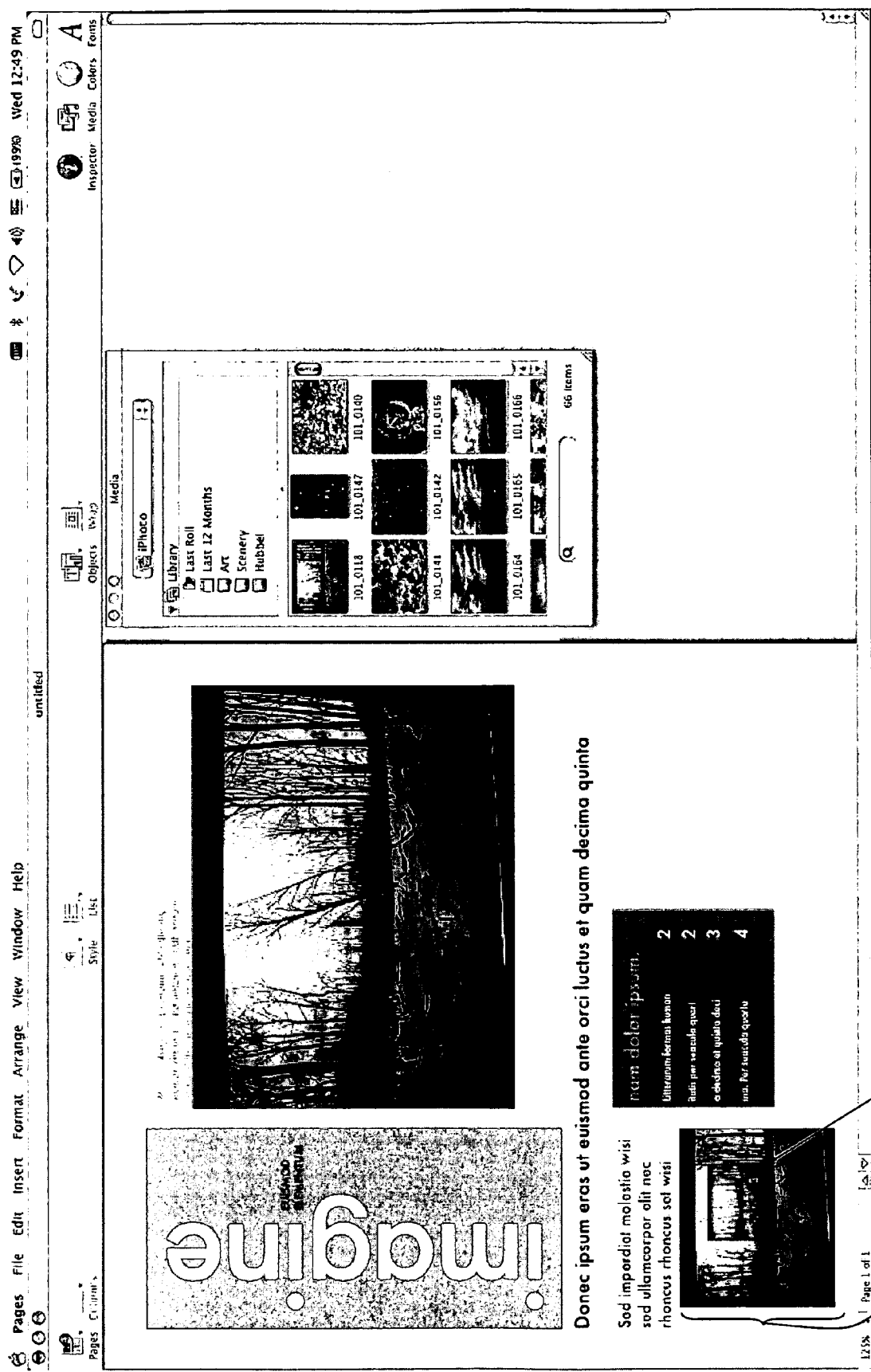
FIG. 20 illustrates the placeholder text contents of the field being replaced with content from the media library by using a single (drag-and-drop) operation.

Just as text can replace text, so can non-text content replace text content and vice versa. For instance, FIGS. 19-20 illustrate an example of an image replacing placeholder text in a field. In FIG. 19, an image 1910 is selected and dragged across the page 1905. This image 1910 is then dropped onto a field 1920, which contains a large amount of text. As shown in FIG. 20, this single (drag-and-drop) operation has replaced the entire volume of text in the field 1920 with the image 1910. As shown in this figure, the field 1920 has been automatically reformatted to account for the size and dimensional characteristics of the inserted image 1910. In other embodiments, the placed content is formatted and/or reformatted to adjust to the characteristics of the field instead.

C. Replacing Placeholder Image with Image

Figure 21:
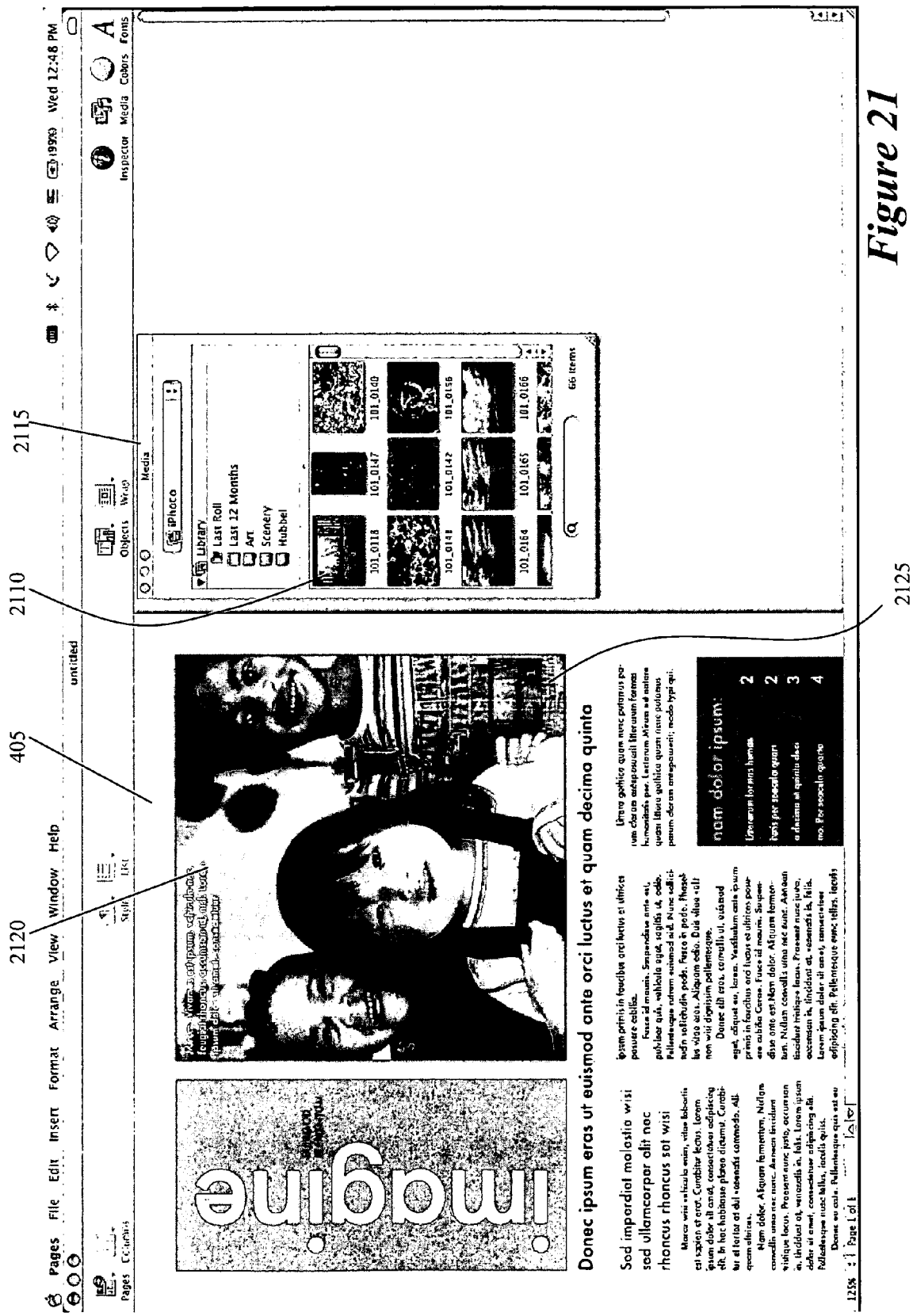
FIG. 21 illustrates a multimedia graphic selected in the media library to replace a placeholder image in a field of the page design currently being viewed for editing.
Figure 22:
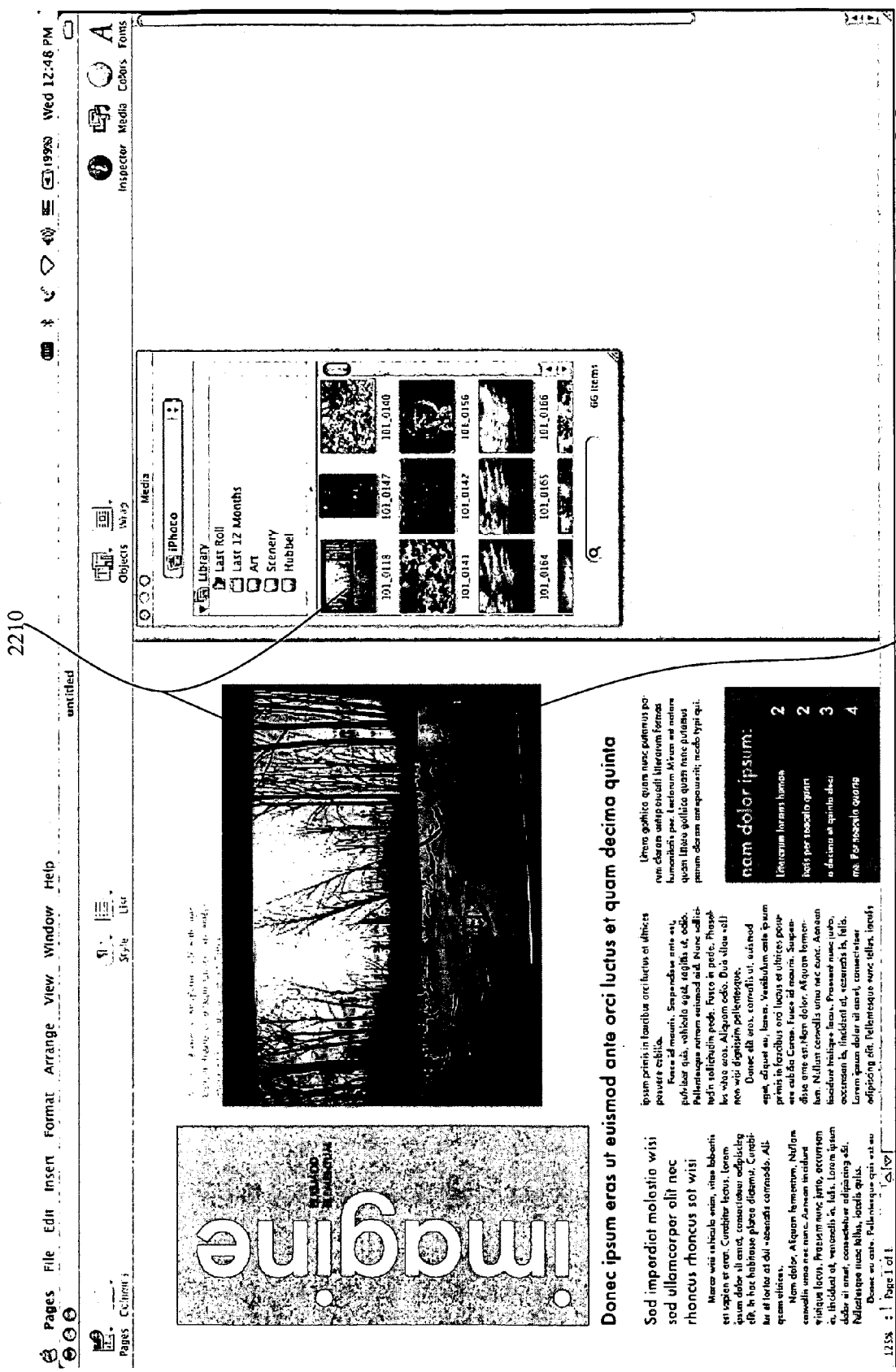
FIG. 22 illustrates the placeholder image contents of the field being replaced with content from the media library by using a single (drag-and-drop) operation.

FIGS. 21 and 22 illustrate easy drag and drop replacement of a suggested placeholder image with a user specified image from the media library. FIG. 21 illustrates the dragging of a thumbnail copy 2125 of an image 2110 in the media library 2115 to a field 2120 that displays a default image in a page. FIG. 22 then illustrates the content of the field 2220 replaced with the image 2210. Thus, some embodiments provide the ability to place and replace suggested content in a convenient one-step manner.

D. Existing Content on a Page Wrapping Around Newly Added Content: Floating Layer To allow a user to add content to a document without deleting existing content previously added or defined for the document, some embodiments allow the existing content to wrap around the newly added content. To explain this wrapping functionality, a brief description of how a document is defined is first provided below.

1. Body and Floating Layer

Some embodiments define a document by reference to body and floating layers. Content can be defined on both of these layers. Content in the body layer is placed "in-line" (i.e., two pieces of content cannot overlap in the body layer) in some embodiments. In contrast, content within the floating layer can overlap with other content within the floating layer. In other words, content in the floating layer may occlude other content in this layer. Consequently, in these embodiments, adding new content or dragging existing content within the floating layer may result in overlapped content.

Content in the floating layer is not affected by content in the body of the document. Content in either the floating or body layer can be replaced with new content without affecting content in the other layer. For instance, in FIG. 4, the image 415 of the children is part of the floating layer while the text field 410 and the box 420 are part of the body layer. As shown in FIGS. 19 and 20, the replacement of the default text content in the body layer with the new image only moves the box 420 and has no effect on the image 415 in the floating layer. Similarly, as shown in FIG. 21 and 22, the replacement of the default image 415 with the new image has no effect on the text field 410 and the box 420.

2. Content Wrapping in Real Time

Figure 23:
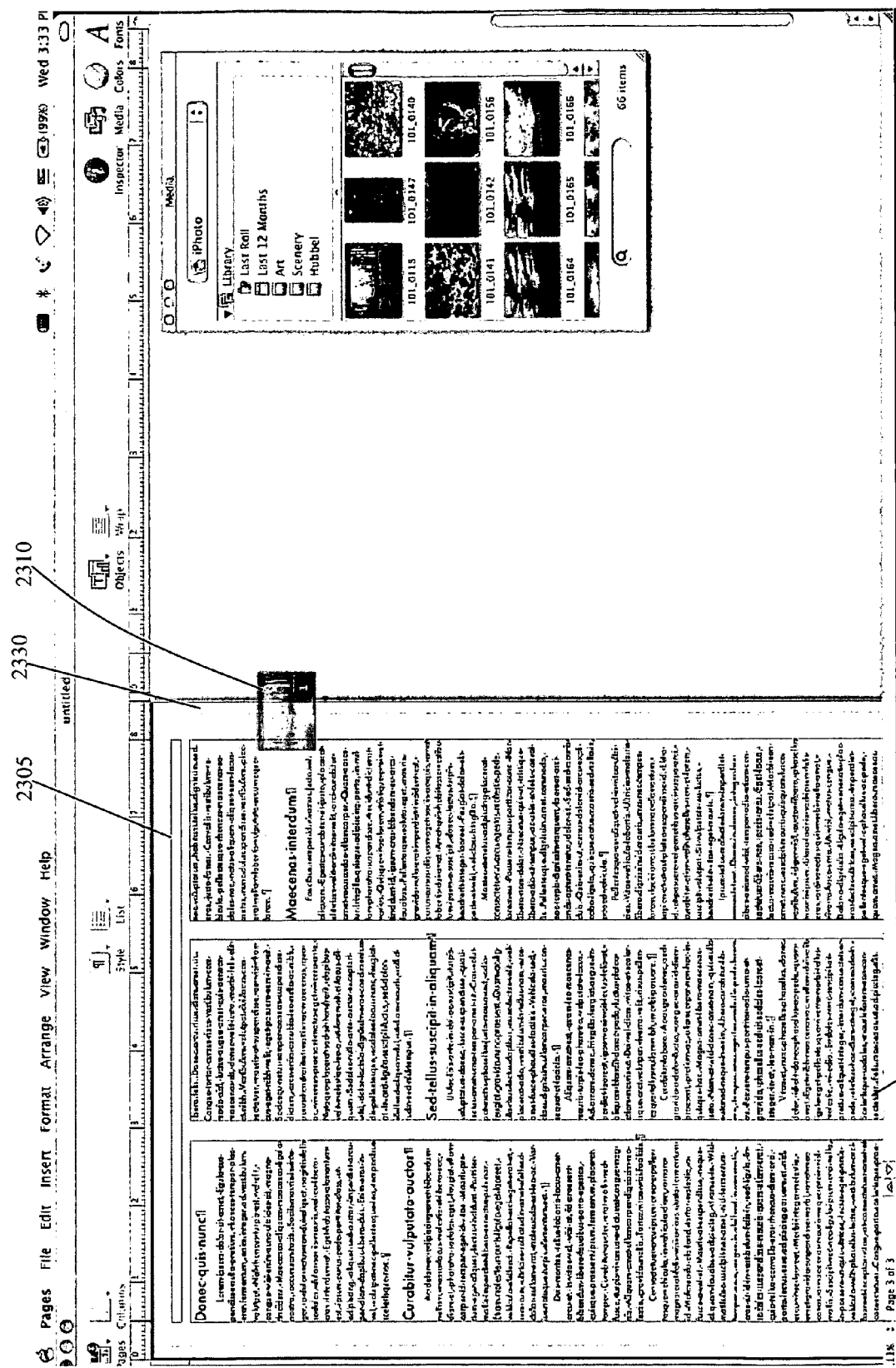
FIG. 23 illustrates an image being dragged from the media library and dropped into a floating layer of a Text Page design.

On the other hand, the body layer and contents within it might move around when content is added to the floating layer that does not replace other content in the floating layer, or existing content on the floating layer is moved around such that it now occupies locations previously assigned to the body layer. For instance, FIG. 23 illustrates an image 2310 being dropped into the floating layer of a page 2300 with a Text Page design 2305. As shown in this figure, some embodiments allow easy access to the floating layer 2330 of a document through a drag-and-drop operation on a border 2330 of the page 2300.

Figure 24:
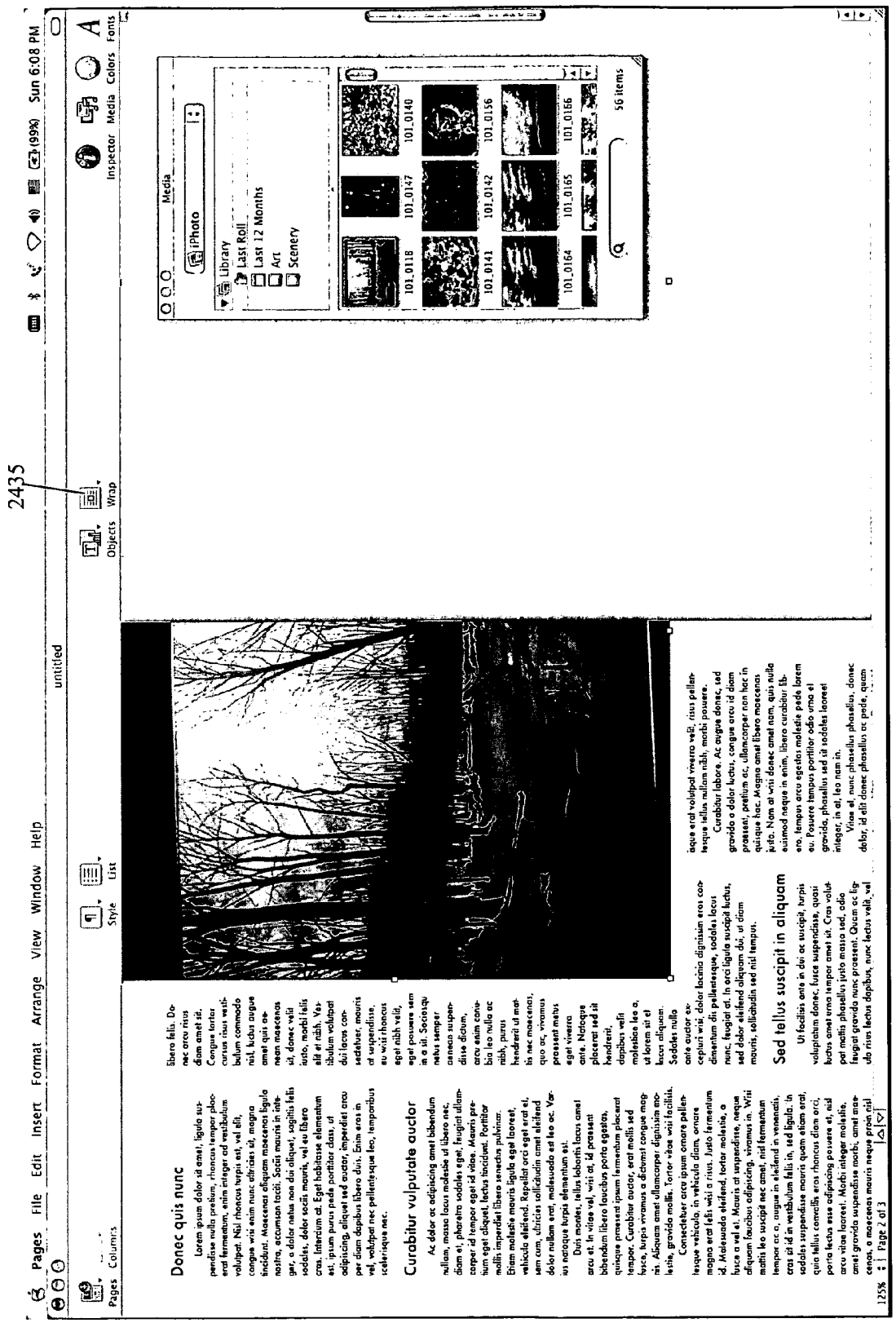
FIG. 24 illustrates the image being dragged to one region of the floating layer of the page design and the text in the body of the page design wrapping and shifting onto another Text Page design in order that the image not occlude the text.
Figure 25:
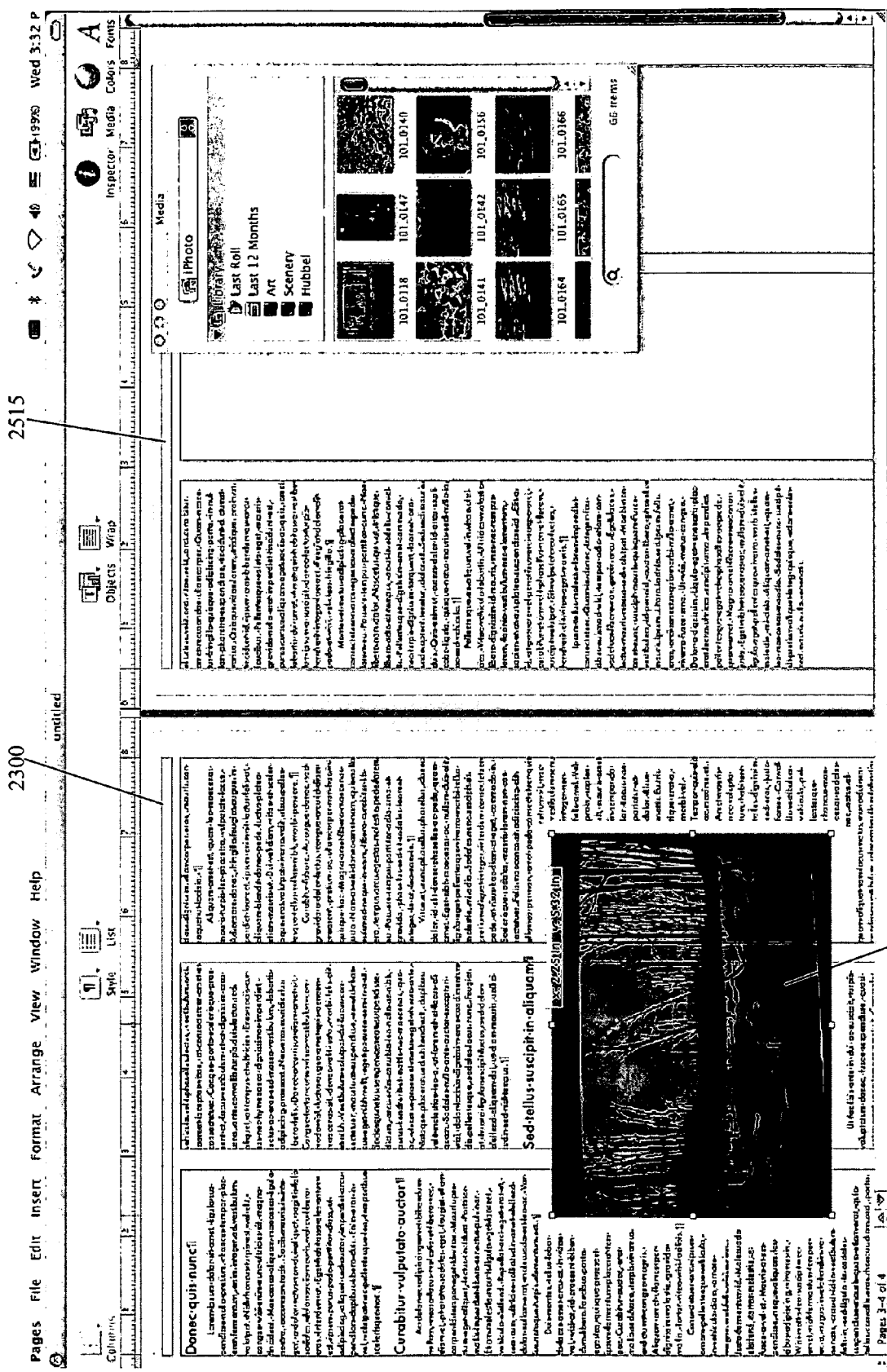
FIG. 25 illustrates the image being dragged to another region of the floating layer such that text in the body of the page design wraps and shifts in real time to compensate for the movement of the image.

FIG. 24 illustrates that when the image 2310 is dropped on the page 2300 close to its border 2330, the body layer text on this page 2300 wraps around it. FIG. 25 illustrates that the wrapping around of this text changes as the image 2310 is dragged around on the page. In some embodiments, wrapping is performed by adjusting the margins of the fields in the body when floating layer objects (i.e., content in the floating layer) are introduced into space previously assigned to these fields. In other embodiments, wrapping is performed by adjusting the margins of the body. Yet, other embodiments adjust the margins of the body and fields within the body.

Figure 26:
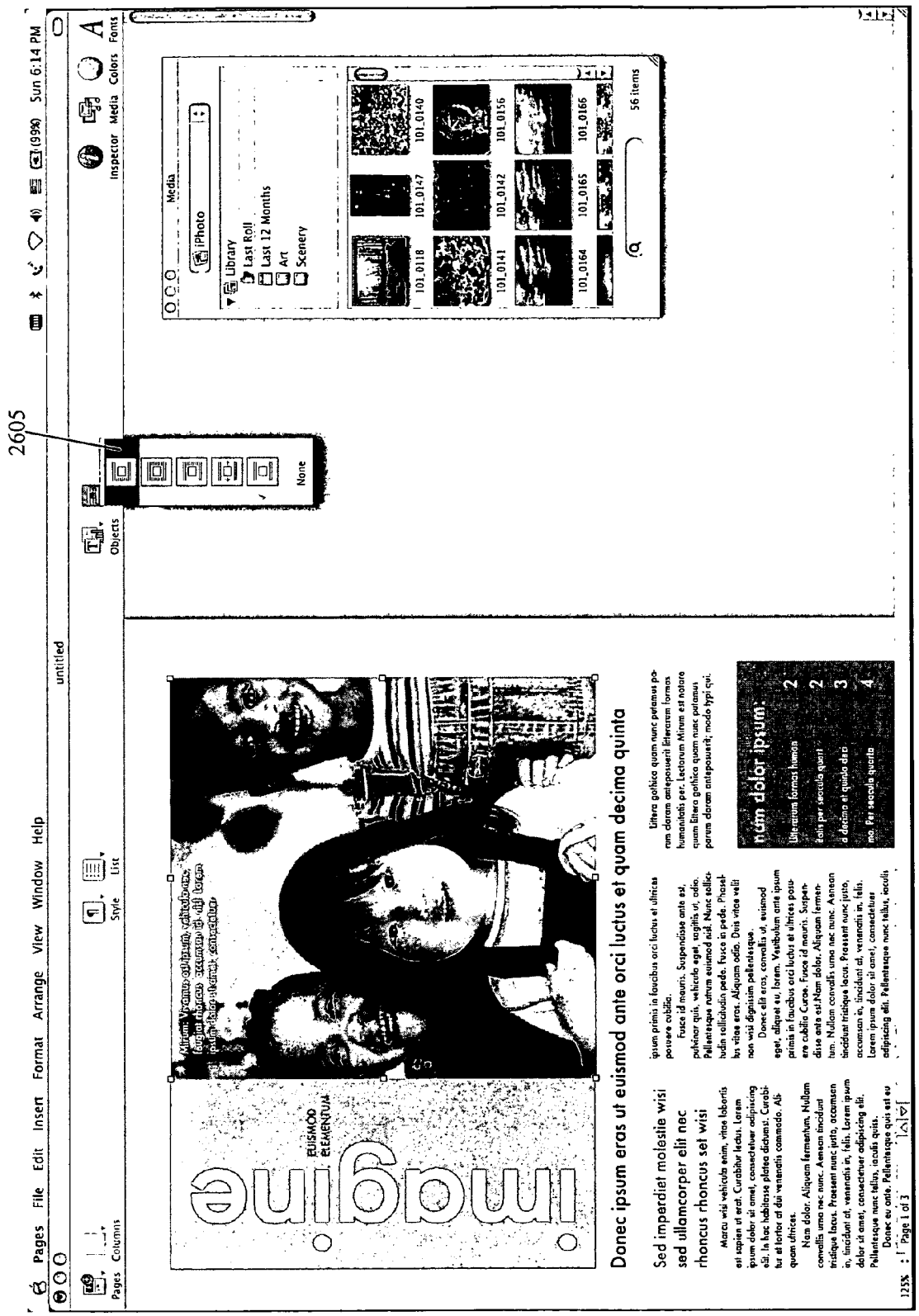
FIG. 26 illustrates a wrap menu through which a user can specify how the body should wrap around the floating layer objects.

Some embodiments further provide a user interface and tools for a user to configure the wrapping of content in a page design. In these embodiments, the tools for configuring the automated wrapping may be accessed by a wrap button 2435. When this button is selected, a dropdown menu 2605 opens up, as shown in FIG. 26. Through this menu 2605, the user can specify how the body should wrap around the floating layer objects. Specifically, as shown in FIG. 26, the menu 2605 illustrates a preview of several selections of possible wrapping styles. The preview of each wrapping style includes a representation of text and a representation of an image. The relationship between these two representations in each preview illustrates the wrapping style of the selection. For instance, the preview of the top selection in FIG. 26 illustrates text wrapping on the top, bottom, and left sides of the image, while the preview of the last selection in FIG. 26 illustrates text wrapping on only the top and bottom sides of the image.

As further shown in FIG. 25, the content in the previous example, and the wrapping in particular, are updated in real time in page design 2300 as the image 2310 is dragged around the page design 2505. Also shown in this figure, the content in the body of the page of the document may be automatically shifted to a new page 2515 in order to preserve the aesthetic view of the content. In some embodiments, the new page 2515 may carry over the formatting of the previous page 2300.

Some embodiments employ the wrapping functionality in order to maintain the readability of content in the body of a document as content is added and manipulated (e.g., moved, formatted, or removed). This feature is particularly useful for maintaining the view and aesthetics of in-line formatted content in the body of a document as content is added and manipulated in the floating layer. In some embodiments, wrapping is performed by adjusting the margins surrounding one object of content based on a border of another object.

3. Easy Access to the Floating Layer

The embodiments described above also provide an easy method of accessing the floating layer of a document. Users of other applications need to enter several menu choices and perform several clicks of the pointing device to access the floating layer of a document. Thus, manipulating content in the floating layer was a much more difficult proposition. The access and manipulation were so unintuitive that many users avoided accessing the floating layer of documents or were unaware of its existence and usability altogether. One way that the invention assists the user in identifying the floating layer is through highlighting, which will now be described.

D. Highlighting

Figure 29:
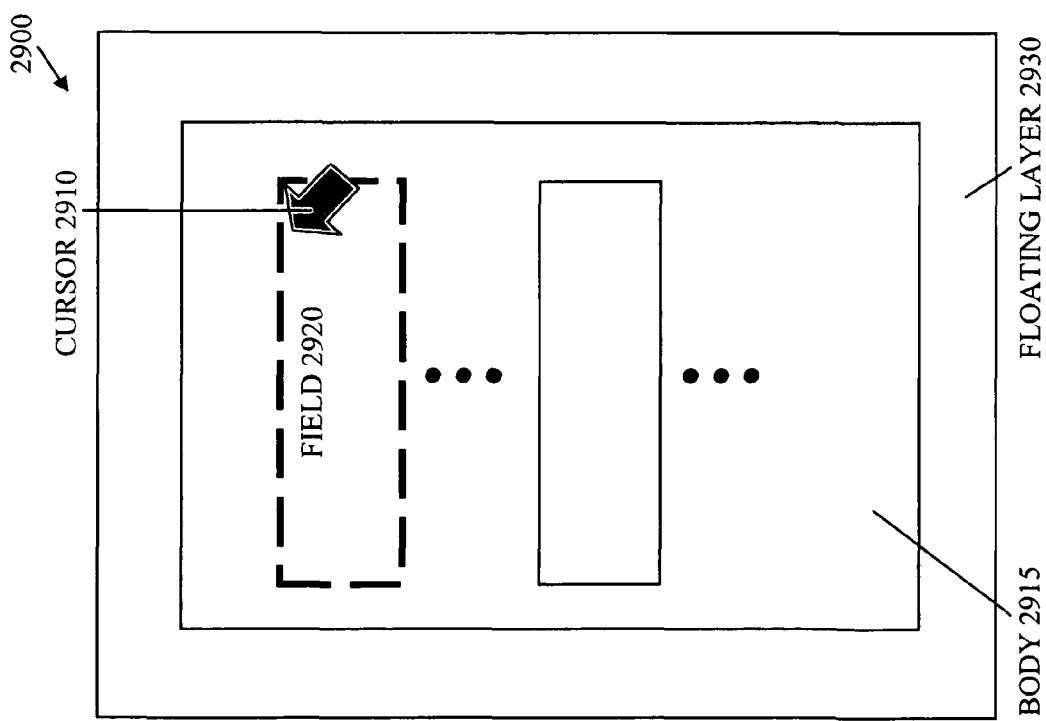
FIG. 29 illustrates highlighting the border of a field when a cursor is over a field of a document.

In order to aid a user in modifying content in the page, some embodiments provide visual cues in the form of highlighting the current element of the page being modified. This feature is particularly useful in aiding a user to distinguish the fields, body, and floating layer of the document being modified. For instance, FIGS. 27-29 show highlighting of the three elements of a document described above when each element is active for editing. These figures include a cursor, a document, a floating layer, a body, and a field in the document. Highlighting is illustrated in these figures by bold dashed lines.

Figure 30:
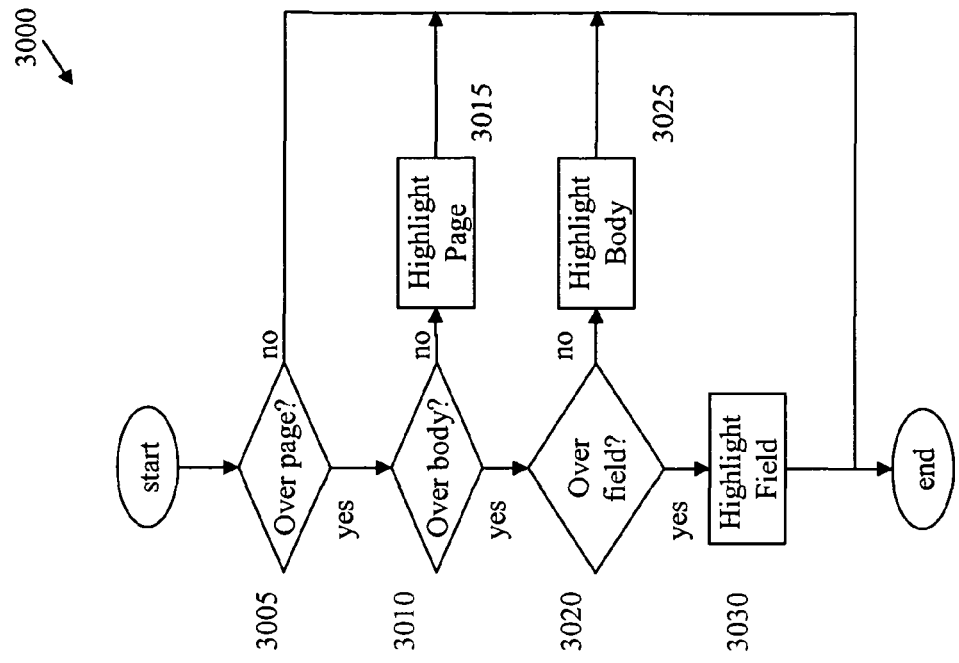
FIG. 30 is a process flow for highlighting according to some embodiments of the invention.

FIGS. 27-29 will be described by reference to a highlighting process 3000 shown in FIG. 30. The process 3000 begins by checking at 3005 whether a pointing device cursor (cursor) is over the page. In some embodiments, the checking is performed by a hit detect mechanism which polls the location coordinates under the cursor. Checking may occur only under certain conditions for some embodiments. For instance, checking may only occur when content is being dragged in some embodiments. In these embodiments, if checking occurs and if the cursor is not over a page of a document in the user interface then the process ends.

If the cursor is over a page, then the process checks at 3010 whether the cursor is over the body of the page. In some embodiments, a rectangular region within the page represents the body of the page. If the cursor is not over the body of the page, then the process highlights at step 3015 the border of the page to indicate that the floating layer is currently active or selected within the page, and then ends. In some embodiments, the process repeats so long as a condition is met such as a drag operation is being performed. FIG. 27 illustrates highlighting of a floating layer 2730 of a document 2700 when a cursor 2710 is over the floating layer 2730.

If the cursor is over the body, then the process checks at step 3020 whether the cursor is over a field. If the cursor is not over a field, then the process highlights the body at step 3025 to indicate the body is currently active within the page, and then ends. FIG. 28 illustrates highlighting of a body 2815 of a document 2800 when a cursor 2810 is over the body 2815.

If the cursor is over a field, the process highlights at step 3030 the field to indicate that the particular field is currently active within the page, and then ends. FIG. 29 illustrates highlighting of a field 2920 in a document 2900 when a cursor 2910 is over the field 2920. In some embodiments, the field highlight takes on a number of shapes that may represent an outline of the contents of the particular field.

III. SOFTWARE ARCHITECTURE

A. Object Diagram

Figure 31:
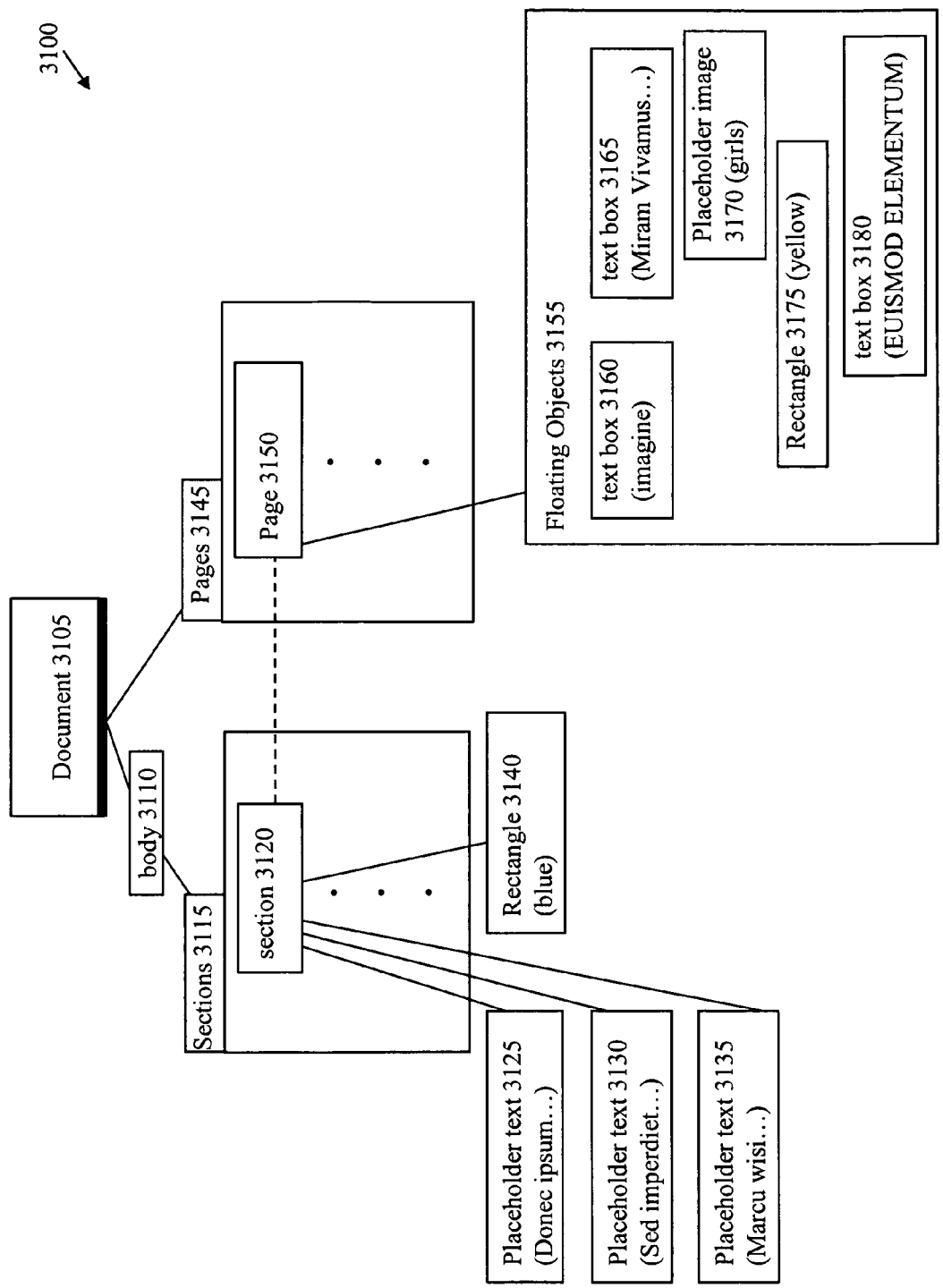
FIG. 31 is an object diagram that represents the document shown in FIG. 4.

Some embodiments implement the elements of a document described above as objects in an object-oriented software environment. FIG. 31 illustrates an object diagram 3100 for these embodiments. For instance, the object diagram 3100 represents the document shown in FIG. 4. The object diagram 3100 includes a document object 3105 that is associated with a body object 3110 and one or more pages objects 3145. Thus, content for the document 3105 may be associated with the body 3110 and/or the pages 3145.

Some embodiments define one page object for each page in a document. Thus, the pages 3145 include a page 3150, which corresponds to the single page 405 shown in FIG. 4. However, one of ordinary skill will recognize that the document 3105 might have any number of associated pages, in other embodiments.

Content in the body 3110 of some embodiments is divided into sections 3115. These sections 3115 can be used to associate content in the body to the pages 3145. For instance, the sections 3115 include a section 3120. In the embodiment shown in FIG. 31, the section 3120 is associated to the page 3150 in the document 3105. In some embodiments, the association between sections and pages can specify a one-to-one relationship. However, one of ordinary skill will recognize that in other embodiments the relationship between sections and pages could specify a ratio other than one-to-one. One of ordinary skill will also recognize that the body might have any number of associated sections in other embodiments.

Thus, content for the document 3105 may be associated, through the sections 3115, to the body 3110 and/or to the pages 3150. Some embodiments define an object for each field that can contain content in the body or the page. For instance, section 3120 has a variety of associated content objects that include placeholder objects 3125, 3130, and 3135, and a media object 3140. The placeholder objects 3125-40 are text objects, while the media object 3140 specifies an image of a blue rectangle, in the embodiment shown in FIG. 31.

The page 3150 also has a variety of associated content objects that include text objects 3160, 3165, 3180, a placeholder object 3170, and a media object 3175. In this embodiment, the text objects 3160, 3165, and 3180 specify text boxes, the placeholder object 3170 includes an image, and the media object 3175 specifies a yellow rectangle. However, in contrast to the objects associated to the body 3110, objects associated to the pages 3150 are floating objects 3155. As described in the previous section, the floating objects 3155 exist in the pages 3150 independent of objects in the body 3110 and independent of other objects in the pages 3150. In some embodiments, this feature of the floating objects 3155 is specified in a description of the floating objects 3155. In contrast, objects in the body 3110 typically have a relationship to other objects in the body 3110, such as a sequential or in-line relationship, in some embodiments. Thus, the content objects in FIG. 31 can be used to represent the content and fields described in relation to FIG. 4.

Figure 32:
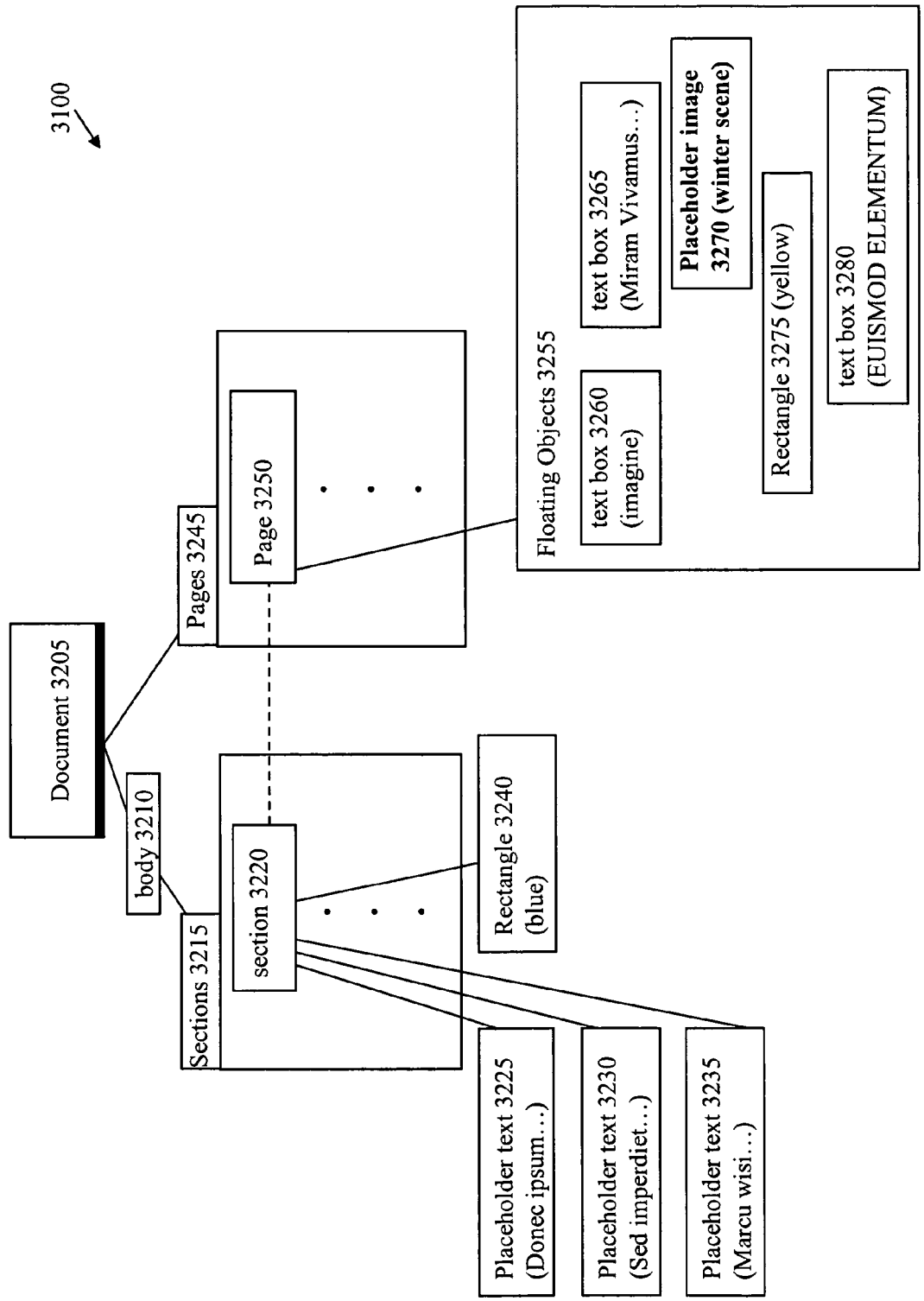
FIG. 32 is the object diagram with a placeholder object updated to reflect a new image (winter scene) that has replaced a previous image (girls).

As described in Section II, the document 3105 may be edited. For instance, FIGS. 21-22 illustrate the replacement of a placeholder image. The replacement of the placeholder image in FIGS. 21-22 will now be described by reference to FIGS. 31-32. As described above, the page 3150 has the placeholder object 3170 that includes an image (girls). FIG. 32 is the object diagram 3200 with the placeholder object 3270 updated to reflect a new image (winter scene) that has replaced the previous image (girls).

Figure 33:
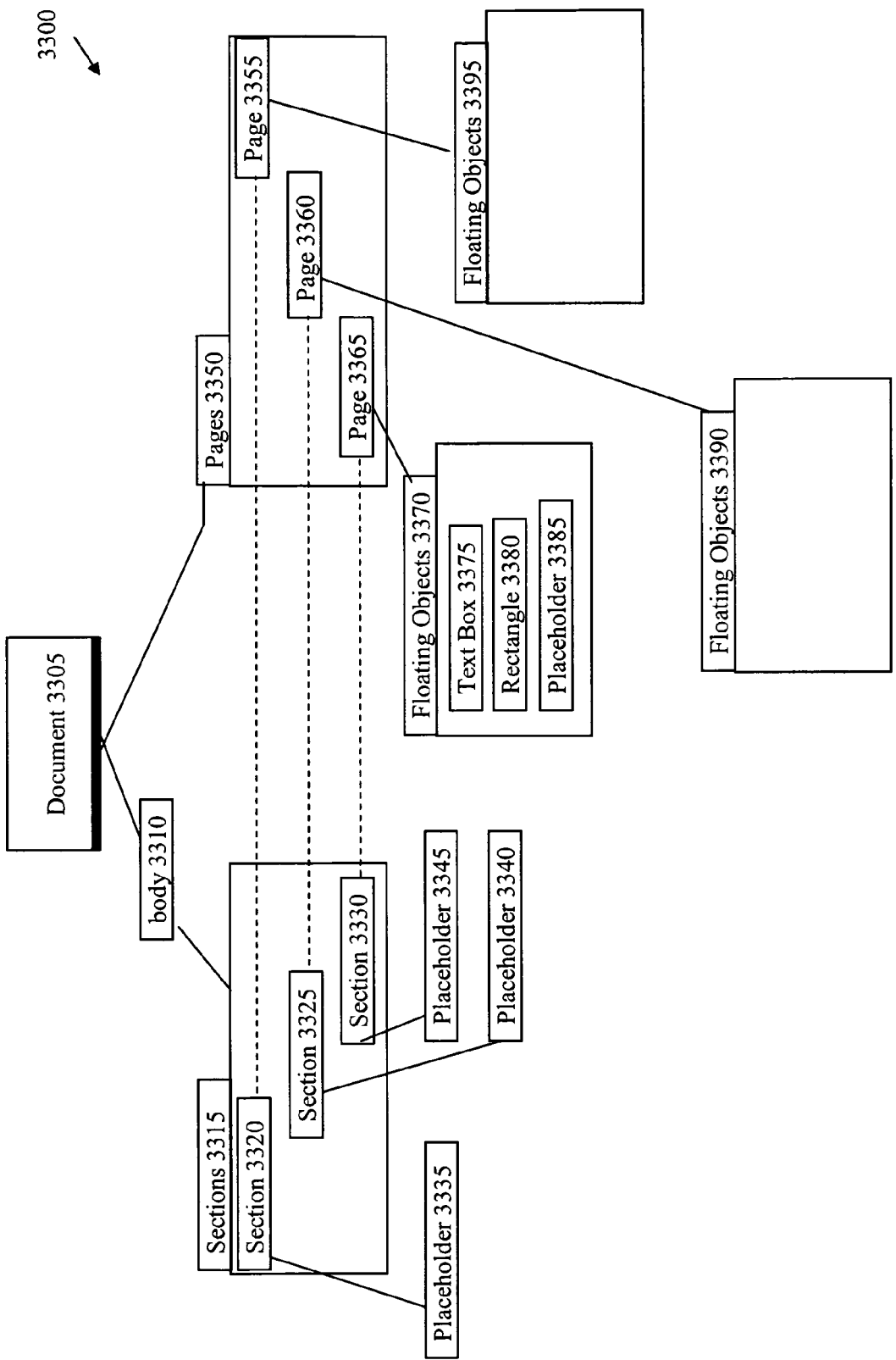
FIG. 33 is an object diagram for the three-page document illustrated in FIG. 12.

Also described in Section II, the document 3105 may be edited by the insertion of additional page designs. For instance, FIGS. 7-12 illustrate the insertion of two additional page designs after the Cover page design by using the Design Newsletter template to create a three-page template document. FIG. 33 is an object diagram 3300 for such a three-page document. The object diagram 3300 includes a document 3305 with associated pages 3355, 3360, 3365, and a body 3310. The body 3310 includes three sections 3335, 3340, 3345 that are associated to the three pages 3355, 3360, 3365, respectively. Each of these sections has various associated content objects (e.g., placeholder objects 3335, 3340, 3345).

The pages 3350 have various associated floating objects. For instance, a page 3365 has associated floating objects 3370. The floating objects 3370 include a text object 3375, a media object 3380, and a placeholder object 3385. In the embodiment shown in FIG. 33, the text object 3375 is a text box, the media object 3380 is a rectangle, and the placeholder object 3385 has an image. One of ordinary skill will recognize that these objects are merely representative. For instance, the text object 3375 may include content having various formats such as a table, or a chart. Similarly, the media object 3380 may contain various media such as an image, a sound, or a video. The placeholder object 3385 may also contain a variety of forms of content.

Thus, the FIG. 33 may be used to represent the content for the document having three page designs shown in FIG. 12. However, certain content objects related to the three-page document shown in FIG. 12 have been omitted in FIG. 33, for clarity in the description of FIG. 33.

B. File Formats

Some embodiments use description files to store a description of the objects discussed above. These embodiments may use any number of formats for description files such as the extensible markup language (XML) format. For instance, when a document is created, edited, or simply opened, some embodiments use an object representation (like the ones illustrated in FIGS. 31-33) for the document. On the other hand, when the document is closed, these embodiments convert the object representation to a description file (e.g., XML) representation.

Figure 34:
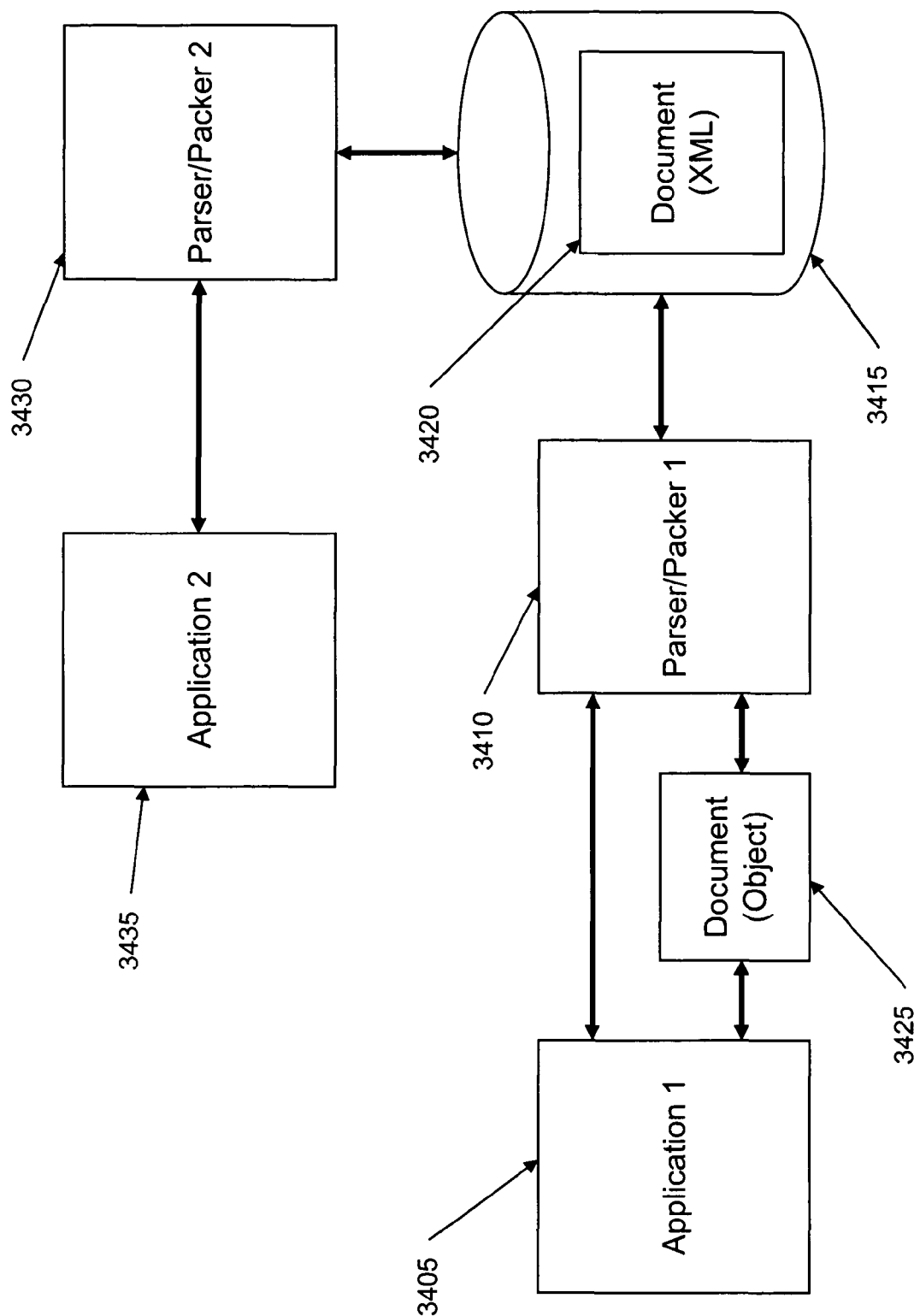
FIG. 34 illustrates an example of a word processing application having a parser/packer retrieve an XML description of a document that is stored on a disk.

FIG. 34 illustrates one example of such an approach. Specifically, this figure illustrates the word processing application 3405 having a parser/packer 3410 retrieve an XML description 3420 of a document that is stored on a disk 3415. As shown in this figure, the parser/packer provides the object representation 3425 of the document to the application 3405. When the application 3405 closes the document, the application 3405 directs the parser/packer 3410 to convert the object representation 3425 back to the XML representation.

One advantage of using description files, particularly in the XML format, is the ability to export a document that has been created by using the methods described above to other applications. These other applications might include, for example, word processing, presentation, or other document creation applications that are provided by Apple Computer, Inc., Microsoft, Inc., Adobe, Inc., etc. FIG. 34 illustrates this advantage. Specifically, this figure illustrates a second parser/packer 3430 that opens the XML representation 3420 of the document for a second application 3435.

In some embodiments, the layout of an XML document is defined by an XML schema. These schemas provide access to the contents of word-processing documents, including page layouts and other organizational structures. Knowing the file formats, the users can modify the content of the document in ways that supplement the capabilities of the word-processing applications.

The following sub-sections describe the schemas used by the word-processing application of some embodiments. A high-level discussion of the schemas is given in sub-section 1. This discussion is followed by the discussion in sub-section 2 of the document structure used by some embodiments. An architectural overview of the various elements and attributes that comprise the structure are described in this sub-section. Next, sub-section 3 discusses the structure of "shape" objects. Sub-section 4 then describes the structure of drawable objects. Finally, sub-section 5 discusses how text objects of some embodiments are stored and laid out in XML.

Each of these sub-sections presents deconstructed examples of how the XML is formed. Although Apple Mac OS® environment and Apple iWork® tools are used to create some of the examples, a person of ordinary skill in the art would realize that the invention may be practiced in other operating environments such as Microsoft Windows®, UNIX®, Linux®, etc., and without the use of these specific details. Also, the examples may show only portions of an XML listing. Also, the listings shown are intended as a symbolic representation of the document format rather than strictly valid XML. For instance, to make the XML examples simple to read, some listings may use shorthand notations without showing all matching open and close element tags.

1. The XML Schemas

Extensible Markup Language (XML) is a ubiquitous and flexible markup standard for processing and exchanging data. XML is found in a wide range of categories, including property lists and file formats for various applications. XML is used extensively to specify the format of various sources of information on the Internet, including web-based services.

A schema determines the layout of an XML document's elements, the attributes and sub-elements that each element can have, and the constraints that the attribute data and element data must adhere to. XML schemas are used to define the structure, content and semantics of XML documents.

An XML file includes a series of elements. Some elements may contain mixed content, while most include only attributes and/or child elements. Many elements have unique identifiers which allow them to be referenced by other elements. The XML schemas represent an XML document as an ordered, labeled tree in which each node has a unique identity and may have a value, attributes, and namespaces associated with it.

In some embodiments, the XML schemas operate on the abstract, logical structure of an XML document—the data model—rather than its surface syntax. The data model represents an XML document as a tree of nodes. The tree can have various kinds of nodes, each of which corresponds to a type of XML construct, such as element, attribute, text, and namespace. Each node in a tree typically has a unique identity. Most nodes have a name, and many have some string or other type of value associated with them.

To be usable in a particular context, an XML document must be "well formed". This means that a document must have open and close tags for all its elements (in the correct sequence) and contain one root element. In addition, XML documents must have at least one XML declaration: an element that provides XML parsers with essential information needed to process a document and ensure that it is "valid". A "valid" document is one that follows the structure specified by a schema file.

2. The Word-Processing Application XML Document Structure

Figure 35:
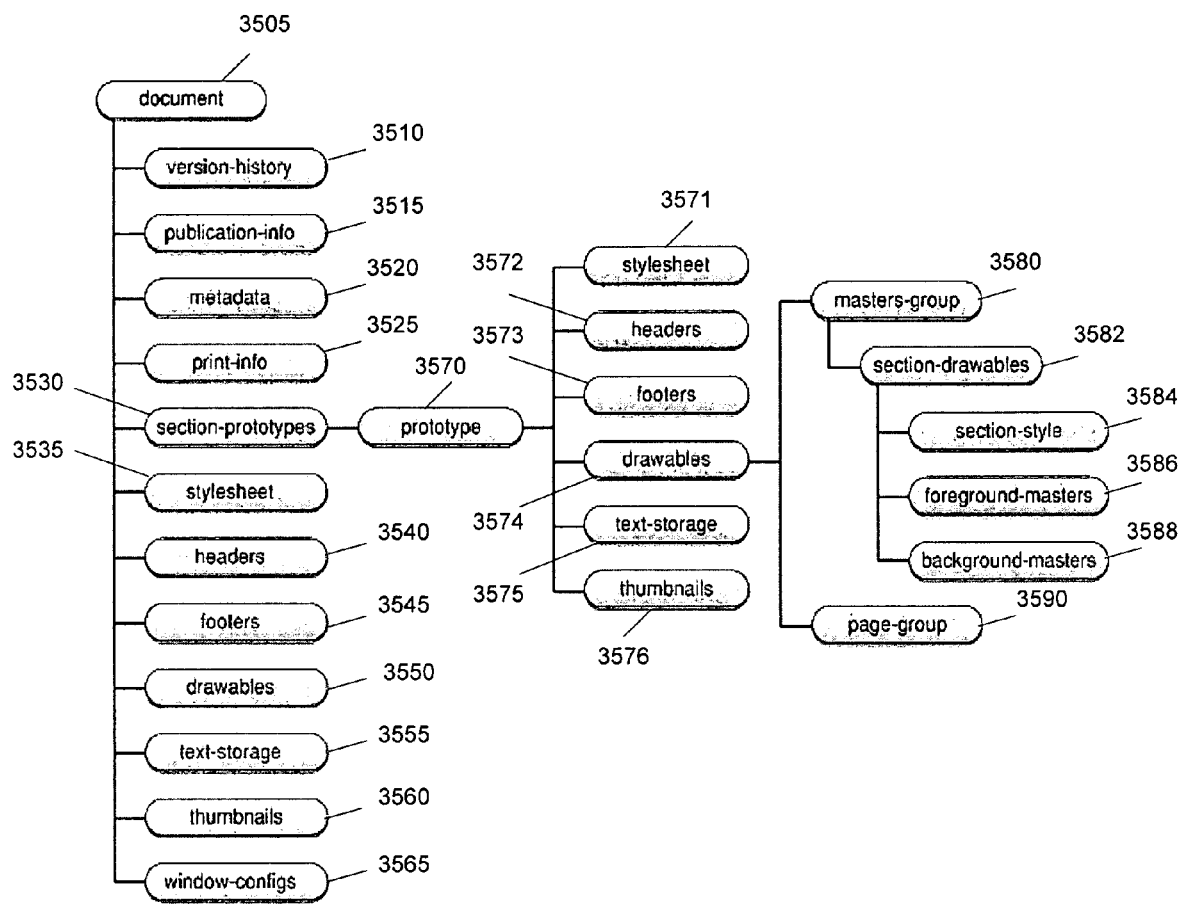
FIG. 35 illustrates the word-processing document hierarchy and structure of some embodiments with associated child elements.

FIG. 35 illustrates the hierarchy and structure of a document generated by the word-processing application of some embodiments. Listing 1 shows the corresponding high level XML listing:

---

Listing 1 - The XML hierarchy of a document generated by the word-processing application of some embodiments

```
<sl:document>
    <sl:version-history>...</sl:version-history>
    <sl:publication-info>...</sl:publication-info>
    <sl:metadata>...</sl:metadata>
    <sl:print-info>...</sl:print-info>
    <sl:section-prototypes>
        <sl:prototype>
            <sl:stylesheet>...</sl:stylesheet>
            <sl:headers>...</sl: headers>
            <sl:footers>...</sl:footers>
            <sl:drawables>...</sl:drawables>
            <sl:text-storage>...</sl:text-storage>
            <sl:thumbnails>...</sl:thumbnails>
        </sl:prototype>
    <sl:/section-prototypes>
    <sl:stylesheet>...<sl:stylesheet>
    <sl:headers>...</sl: headers>
    <sl:footers>...</sl:footers>
    <sl:drawables>...</sl:drawables>
    <sl:text-storage>...</sl:text-storage>
    <sl:thumbnails>...</sl:thumbnails>
    <sl:window-configs>...</sl:window-configs>
</sl:document>
```

---

As shown in FIG. 35 and in Listing 1, the XML format specifies that the <sl:document> element 3505 is at the top-level of a document. This element is the root element of the document. As shown in Listing 1, other elements of the document are contained within the <sl:document> element and its associated closing element, </sl:document>. The document has version-history 3510, publication-info 3515, metadata 3520, print-info 3525, section-prototypes 3530, stylesheet 3535, headers 3540, footers 3545, drawables 3550, text-storage 3555, thumbnails 3560, and window-configs 3565 elements. A person of ordinary skill in the art will realize that invention may be practiced without some of these specific elements. Some embodiments may have different child elements under the document element 3505. For instance, some embodiments may not have the print-info element or the version-history element while some embodiments may have additional child elements under the document element 3505. Also, the children of some elements may be different in some embodiments.

Although FIG. 35 and Listing 1 show only one prototype element 3570 within the section-prototypes element 3530, the section-prototypes element 3530 can have several prototype element 3570, each defining a different set of template pages (also referred to as a captured pages). The prototype elements 3570 follow the structure of the document proper, which follows the section-prototypes element 3530. Specifically, as shown, the prototype element 3570 has child elements for stylesheet 3571, headers 3572, footers 3573, drawables 3574, text-storage 3575, and thumbnails 3576. The usage of these elements and their attributes are described in detail in sub-section 5 below. The following paragraphs describe the relationship of the XML hierarchy shown in FIG. 35 with the document object shown in FIG. 31.

As described with reference to FIG. 31 described in Section III.A above, some embodiments represent a document as a set of objects. As shown in FIG. 34 above, this object representation is used when a document is e.g., created, edited, or simply opened. On the other hand, when the document is closed, these embodiments convert the object representation to a description file (such as XML) representation.

When a user selects a specific template (such as the newsletter template shown in FIG. 4), the word-processing application generates a document object. The user can also select one or more template pages associated with the newsletter template by clicking on the pages icon 425 and selecting from the drop down menu 705. For instance, in addition to the cover sheet, the user can select the wide column with sidebar template page as was discussed with reference to FIG. 7 above. The user can then edit the selected pages to replace the placeholder fields with text, image, or media content.

When the user subsequently saves the document, the XML representation of the document will have information about (1) the pages that the users had selected and (2) the template pages corresponding to the newsletter template. Specifically, the section-prototype element will contain one or more prototype elements. Each prototype element will correspond to one of the template pages in the newsletter template. For instance, if the newsletter template has eight template pages (as shown in the example of FIG. 7), there will be eight prototype elements, one for each template page in the newsletter template. As shown in FIG. 35, each prototype element 3570 will have stylesheet 3571, headers 3572, footers 3573, drawables 3574, text-storage 3575, and thumbnail 3576 elements that will store the information for one of the eight template pages of the newsletter template.

On the other hand, the information for the specific pages that the user had selected (such as the cover sheet and the wide column with sidebar in the above example) and any text, image, and media that the user had subsequently added or modified will be saved under the stylesheet 3535, headers 3540, footers 3545, drawables 3550, text-storage 3555, and thumbnail 3560 elements that are children of the document element 3505 (as opposed to children of each prototype element 3570). These pages (which are specifically selected by the user) are also referred to as the "main document" pages.

To make the diagram easier to visualize, the object diagram of FIG. 31 only shows the objects that correspond to the selected page of FIG. 4 (i.e., the cover sheet) and it does not show other template pages of the newsletter template. Referring to FIG. 31, when the user closes (i.e. saves) the document, the body object 3110 is saved in the text-storage element 3555 of the main document. The details of the text-storage element are described in sub-section 5 below. Also, when the document is saved, the pages element 3145 is saved in the drawables element 3550 of the main document. The drawables element is described in sub-section 4 below.

Although the object diagram of the template pages is not shown in FIG. 31, the template pages have a similar object representation. Also, when the user closes (i.e., saves) the document, each template page information is saved in its corresponding prototype element's child elements such as text-storage 3575, drawables 3574, etc. In some embodiments, the user can delete the template pages that the user do not intend to use and these deleted templates pages will not be saved in XML form when the user subsequently closes (saves) the document. Also, in some embodiments, the user can add more template pages to the document. In which case, when the user subsequently closes (saves) the document, the new template page information is saved in a corresponding new prototype element. The child elements of the document element 3505 and examples of their usage are summarized in Table 1.

TABLE 1

The document structure with associated child elements

| Elements | Description |
|---|---|
| <sl:version-history> | Lists the previous version of the document format. |
| <sl:publication-info> | Document-level globals, including user preferences. |
| <sl:metadata> | Data that is used to describe the document. |
| <sl:print-info> | Properties of an object which stores information that is used to generate output. |
| <sl:section-prototypes> | A list of <sl:prototype> elements which contain data for captured pages, including the style sheet, drawables, headers, footers, the main body text, and thumbnails images. |
| <sf:stylesheet> | The document's main style sheet. |
| <sl:drawables> | Objects not in the main text flow, such as shapes, text boxes, and so on. |
| <sf:headers> and <sf:footers> | Lists the headers and footers used in the document. |
| <sf:text-storage> | The main body text of the document. |
| <sl:thumbnails> | Thumbnail images of the document pages. |
| <sl:window-configs> | Specifies the window size, position, and scroll-position, and the selection when the document was saved. | a) Document Elements

The following paragraphs describe different elements used in a document generated by the word-processing application of some embodiments. The listings shown are intended as a symbolic representation of the document format rather than strictly valid XML. Most listings have specific examples. A person of ordinary skill in the art will realize that the invention may be practiced without some of the specific details and examples discussed.

(1) The Version-History Element

The <sl:version-history> element 3510 is purely informational and is not interpreted by the application.

(2) The Publication-Info Element

Listing 2 shows an example of the publication-info element 3515 of some embodiments:

Listing 2 - An example of the publication-info element

```
<sl:publication.info>
    <sl:kSFWPFootnoteFormatProperty>
        <sl:number sfa:number="0" sfa:type="i"/>
    </sl:kSFWPFootnoteFormatProperty>
    .
    .
    <sl:SLCreationDateProperty>
        <sl:date sfa:ID="NSCalendarDate-0"
        sl:val="2005-04-19T20:39:39 +0000"/>
    </sl:SLCreationDateProperty>
    .
    <sl:SLLastModifiedDateProperty>
        <sl:date sfa:ID="NSDate-0" sl:val="2005-04-19T22:16:41 +0000"/>
    </sl:SLLastModifiedDateProperty>
    .
    .
</sl:publication-info>
```

The <sl:publication-info> element specifies the document-level globals, including user preferences. These are properties that are consistent throughout the document. For instance, in the example shown in Listing 2, the document creation date and time is 8:39:39 p.m. on Apr. 4, 2005. The document is shown to be last modified at 22:16:41 p.m. on Apr. 19, 2005. Also, as shown in this example, a specific footnote format is selected for the document.

(3) The Metadata Element

Listing 3 shows an example of the metadata element 3520 of some embodiments:

Listing 3 - An example of the metadata element

```
<sf:metadata>
    <sf:comment>...</sf:comment>
    <sf:copyright>...</sf:copyright>
    <sf:keywords>...</sf:keywords>
    <sf:authors>...</sf:authors>
    <sf:title>...</sf:title>
</sf:metadata>
```

Metadata is data that is used to describe other data. Specifically, the metadata element is used to provide information about the document as a whole. For instance, in the example shown in Listing 3, the <sf:metadata> element is used to provide information such as copyright, keywords, authors, title, and a comment about the document.

(4) The Print-Info Element

Listing 4 is an example of a portion of the print-info element 3525 of some embodiments:

Listing 4 - An example of the print-info element

```
<sl:slprint-info sfa:ID="SLPrintInfo-0" sl:page-width="612"
sl:page-height="792" sl:page-scale="1">
    <sf:page-margins sfa:ID="SFWPMargins-0" sf:top="72" sf:left="72"
sf:bottom="72" sf:right="72" sf:header="36"
sf:footer="43.200000762939453"/>
    <sl:print-info>
        <sl:NSJobDisposition>
        <sl:NSPaperSize>
```

Listing 4 - An example of the print-info element

```
        <sl:NSMustCollate>
        <sl:NSVerticalPagination>
        <sl:NSVerticallyCentered>
        <sl:NSPrintAllPages>
        <sl:NSCopies>
        <sl:NSBottomMargin>
        <sl:NSLeftMargin>
        <sl:NSTopMargin>
        <sl:NSLastPage>
        <sl:NSFirstPage>
        <sl:NSSavePath>
        <sl:NSOrientation>
    </sl:print-info>
</sl:slprint-info>
```

As shown in listing 4, the print-info element specifies details needed for generating output. For instance, in the example above, the page height and width as well as different margins are specified.

(5) The Section-Prototype Element

Listing 5 shows an example of the section-prototypes 3530 element of some embodiments:

Listing 5 - An example of the section-prototypes element

```
<sl:section-prototypes>
    <sl:prototype sl:name="Text Page">
        <sf:stylesheet> ... </sf:stylesheet>
        <sl:headers>...</sl: headers>
        <sl:footers>...</sl:footers>
        <sl:drawables>...</sl:drawables>
        <sl:text-storage>...</sl:text-storage>
        <sl:thumbnails>...</sl:thumbnails>
    </sl:prototype>
<sl:/section-prototypes>
```

The section-prototypes element describes the template pages (i.e., the captured pages). The <sl:section-prototypes> contains a list of <sl:prototype> elements that mimic the structure of the main pages document, less those parts which pertain to the document as a whole.

As shown in Listing 5, the prototype element includes stylesheet, headers, footers, drawables, text-storage, and thumbnail elements. Each prototype element, therefore, has all of the core pieces of a document.

(6) The Stylesheet Element

As illustrated in FIG. 35, there is one stylesheet element 3535 for the main document and one 3571 for each template page (i.e., captured page). An example of a portion of a stylesheet element for a captured page is shown in Listing 6. The stylesheet element 3535 of the main document has a similar structure.

Listing 6 - An example of the stylesheet element

```
<sf:stylesheet sfa:ID="SFSStylesheet-0">
    <sf:styles>
        <sf:paragraphstyle sfa:ID="SFWPParagraphStyle-0"
        sf:name="Free Form" sf:ident="paragraph-style-default">
            <sf:property-map>
                <sf:listStyle>
                    <sf:null/>
                </sf:listStyle>
                <sf:hidden/>
                <sf:underline/>
```

Listing 6 - An example of the stylesheet element

```
                <sf:underlineColor/>
                <sf:word_strikethrough/>
                <sf:firstTopicNumber/>
            </sf:property-map>
        </sf:paragraphstyle>
    </sf:styles>
    <sf:anon-styles/>
</sf:stylesheet>
```

(7) The Drawables Element

The drawables element contains all the floating objects either for the main document or the template pages. As shown in FIG. 35, the main document has a drawables element 3550. Each prototype element 3570 (only one is shown in FIG. 35) also has a corresponding drawables element 3574. Referring to the object diagram of FIG. 31, when the user closes (or saves) the document, the information corresponding to the "Pages" object 3245 is saved in the drawables element 3550 of the main document. Similarly, the "Pages" object corresponding to each template page (template pages are not shown in FIG. 31) is saved in the drawables element 3574 of the corresponding prototype element 3570 under the sections-prototype element 3530.

In some embodiments, the drawables element have masters-group 3580 and a set of page-group 3590 child elements. Although FIG. 35 only shows the children of the drawables element 3574 of a prototype element, the drawables element 3550 of the main document has a similar structure. The masters-group is for drawables that are on the section masters, while the page-groups are the other drawables, grouped by the page on which they appear. Specifically, the objects on a section master are repeated on every page in the section. For instance, a master group object may be used to implement a watermark for all pages in the section. The objects in a page-group appear only on the individual page that corresponds to the particular page-group element.

In some embodiments, the masters-group element 3580 has a section-drawables element 3582 for each section in the page set and similarly in the main document (for simplicity, the details of the drawables element 3550 of the main document is not shown in FIG. 35). Each section-drawables element 3582 has a section-style 3584 child element. Each section-drawables element 3582 also has child elements in its foreground 3586 and background groups 3588. As shown, in some embodiments, the drawables element also has page-group 3590 child elements for each page with floating drawables.

Referring to object diagram of FIG. 31, the floating objects 3155 are saved under either the master-group or a page-group depending on whether the particular floating object appears on every page of the section or only on a specific page. In some embodiments, the floating objects that appear either on every page, on even pages, on odd pages, or the first page, are saved under the master-group. In some embodiments, there are child elements under foreground-master 3586, background-masters 3588, and page-group 3590 to save the floating objects 3155. These child elements contain the drawable shapes (or drawable images) that correspond to each floating object. The structure of drawable objects is described in subsection 4 below.

(8) The Headers and Footers Elements

The main document and each page set also have headers (3540 and 3572) and footers (3545 and 3573) elements that contain the headers and footers stored as arrays of text storages (9) The Text-Storage Element The text-storage element 3555 and 3575 is the main body text for the document or each set of template (captured) pages. Referring to FIG. 31, the placeholder text objects (such as 3125) and rectangle 3140 are saved (when the user closes or saves the document) under the text-storage element. In some embodiments, in-line text associated with a section object 3120 is saved in a "section" child element of the text-storage element. Also, in some embodiments, an object such as the blue rectangle 3140 which is an in-line shape is saved in an "attachment" child element of the text-storage element. In some embodiments, other multimedia objects (such as a video clip) can also be stored in an "attachment" child element of the text-storage element. The details of the text-storage element are described in sub-section 5 below.

(10) The Thumbnails Element

The main document and each page set also have thumbnails elements (3560 and 3576) that contain the page thumbnail images in an ordered list. As discussed with reference to Listing 5 above, each section-prototypes element has one or more prototype elements. Each prototype element has a thumbnails element which contains thumbnails of the drawables in that prototype. Inclusion of the thumbnails provides a visual representation of the content of the prototype to the user.

(11) The Window-Config Element

The window-configs element 3565 is used to specify the window size, location, and scroll position, and where the selection was when the document was saved.

b) Common Elements and Usage

Many elements in a document include a sfa:ID attribute, which assigns a unique name to the element by which it can be referred to elsewhere in the document, generally via a sfa:IDREF attribute. A common use is when the same object appears in multiple places in the document. The first time, the object is identified with an sfa:ID attribute. In subsequent appearances, the object appears in an element of the same name and a -ref suffix with an sfa:IDREF attribute. For example:

```
<sf:object sfa:ID="Object-0">...<sf:object/>
<sf:object-ref sfa:IDREF="Object-0"/>
``` c) Implementation Examples

Several specific examples of some embodiments are given below. Some examples are given using Mac OS® environment. A person of ordinary skill in the art, however, would realize that invention is not limited to these specific implementations and examples given below.

In some embodiments where the word-processing application operates under Mac OS® operating system, the documents are bundles. A bundle is a directory containing related resources and is treated as a single object (application, document, and so on) by Mac OS®. The term bundle refers both to the object and to the directory it represents.

In some embodiments, the document bundles contain a compressed XML file that describes the entire document, plus the media files that are used in the document, although certain media assets can be referenced externally. In some embodiments, the media files belonging to templates are referenced from the template bundles to help reduce the size of user documents. In some embodiments, a user can also choose whether to copy a video clip (e.g., a QuickTime® movie) into the document bundle.

In some embodiments, to view the contents of a file, the user can control-click it, and select Show Package Contents from the contextual menu that appears. In some embodiments, the document bundle contains an index.xml.gz file containing the compressed XML for the document, a Contents folder that contains only the bundle PkgInfo, and a Thumbs folder, which stores thumbnail images of the pages. Media assets are also saved here.

In some embodiments, the XML files use standard zlib compression, and may be decompressed by double-clicking the file, or with the gzip command-line tool. The applications can also recognize the files in their uncompressed form (without the .gz extension). In some embodiments, the compressed version is preferred if both exist in the document bundle.

3. Shapes Objects

This sub-section describes various shapes objects that are used in some embodiments. Several examples are given that deconstruct the XML used in various shapes objects. The users can create new shape objects or modify existing shape objects to use in their documents.

In some embodiments, the word-processing application allows a user to insert shape objects generated by different applications. In these embodiments, the word-processing application automatically transforms a shape that was generated by other applications into a format recognizable by the word-processing application. For instance, a user can cut, copy, or drag a shape from another document (generated by a different application), and past it into the word-processing clipboard. The word-processing application, then automatically transforms the definition of the shape into a recognizable format.

a) Variations in Shapes Objects

The different changeable parts of a shape comprise its graphic style. Some embodiments have several different shapes available to users, including circles, squares, arrows, and so on. Also, some embodiments provide different variations in these shapes. Examples of these variations are:

Basic
Shadow
Translucent
Color fill
Gradient fill
Tinted fill
Image fill
Thick-color stroke
Rotated default These variations are described in the following paragraphs.

b) Basic Shape

Figure 36:
FIG. 36 illustrates an example of a basic shape.

FIG. 36 illustrates a basic shape. Listing 7 shows an example of a basic shape defined in XML in some embodiments:

Listing 7 - An example of a basic shape defined in XML

```
<sf:shape sfa:ID="SFDShapeInfo-2">
 <sf:geometry sfa:ID="SFDAffineGeometry-93">
    <sf:naturalSize sfa:w="100" sfa:h="100"/>
    <sf:size sfa:w="100" sfa:h="100"/>
    <sf:position sfa:x="48" sfa:y="140"/>
 </sf:geometry>
 <sf:style>
  <sf:graphic-style-ref sfa:IDREF="SFDGraphicStyle-62"/>
 </sf:style>
 <sf:path>
  <sf:bezier-path sfa:ID="SFDBezierPathSource-2">
    <sf:bezier sfa:ID="NSBezierPath-2" sfa:path="M 0 0 L 100 0 L 100 100 L 0 100 Z M 0 0" sfa:version="524"/>
  </sf:bezier-path>
```

Listing 7 - An example of a basic shape defined in XML

```
</sf:path>
<sf:text sfa:ID="SFWPFrame-141">
    <sf:text-storage sfa:ID="SFWPStorage-477" sf:kind="textbox"
sf:exclude-shapes="true" sf:exclude-tables="true"
sf:exclude-attachments="true">
        <sf:stylesheet-ref sfa:IDREF="SFSStylesheet-27"/>
        <sf:text-body>
            <sf:layout sf:style="SFWPLayoutStyle-189">
                <sf:p sf:style="SFWPParagraphStyle-390">basic</sf:p>
            </sf:layout>
        </sf:text-body>
    </sf:text-storage>
</sf:text>
</sf:shape>
```

As shown in Listing 7, the style element has only one child element which references graphic-style. No other child elements are defined for the style element. An empty property map indicates that all style properties of this shape are inherited from the default graphic style for shapes. The <sf:geometry> element includes a natural size, a size, and a position. For shapes, natural size and size are the same, and determine how large the shape is on the canvas. The units of width and height are in pixels. The position is also in pixels, with (0,0) being the top left of the image.

Figure 37:
FIG. 37 illustrates an example of a simple shadow shape.

The <sf:path> element describes how the path is to be drawn. In this example, the sfa:version attribute is shown to have a value of "524". The <sf:text> element describes the text that appears in the shape. The text contents of a shape can be changed by changing what is specified in the <sf:p> element. The <sf:text-storage> element in the shape element is described in sub-section 5 below c) The Shadow Shape FIG. 37 illustrates a simple shadow shape which is a variation of the basic shape shown in FIG. 36. The elements for the shadow shape are defined, as follows in the example XML in Listing 8:

Listing 8 - An example of a shadow shape defined in XML

```
<sf:shape sfa:ID="SFDShapeInfo-3">
    <sf:geometry sfa:ID="SFDAffineGeometry-94">
        <sf:naturalSize sfa:w="100" sfa:h="100"/>
        <sf:size sfa:w="121" sfa:h="100"/>
        <sf:position sfa:x="207" sfa:y="140"/>
    </sf:geometry>
    <sf:style>
        <sf:graphic-style-ref sfa:IDREF="SFDGraphicStyle-59"/>
    </sf:style>
    <sf:path>
        <sf:bezier-path sfa:ID="SFDBezierPathSource-3">
            <sf:bezier sfa:ID="NSBezierPath-3" sfa:path="M 0 0 L 100 0
L 100 100 L 0 100 Z M 0 0" sfa:version="524"/>
        </sf:bezier-path>
    </sf:path>
    <sf:text sfa:ID="SFWPFrame-142">
        <sf:text-storage sfa:ID="SFWPStorage-478" sf:kind="textbox"
sf:exclude-shapes="true" sf:exclude-tables="true"
sf:exclude-attachments="true">
            <sf:stylesheet-ref sfa:IDREF="SFSStylesheet-27"/>
            <sf:text-body>
                <sf:layout sf:style="SFWPLayoutStyle-189">
                    <sf:p sf:style="SFWPParagraphStyle-390">shadow</sf:p>
                </sf:layout>
            </sf:text-body>
        </sf:text-storage>
    </sf:text>
</sf:shape>
```

The shadow shape shown in this example is similar to the basic shape, except for changes to its geometry, style reference, and text. All other elements are identical to the basic shape. The shadow shape, of course, is in a different position, with a shadow, as well as with different text. The shape's graphic style is defined as follows in the example XML in Listing 9:

Listing 9 - An example of a graphic style defined in XML

```
<sf:graphic-style sfa:ID="SFDGraphicStyle-59"
sf:parent-ident="shapeStyleID">
    <sf:property-map>
        <sf:shadow>
            <sf:shadow sfa:ID="SFRShadow-9" sf:angle="45" sf:offset="50"
sf:radius="10" sf:opacity="0.75">
                <sf:color xsi:type="sfa:calibrated-rgb-color-type"
sfa:r="0.52822577953338623" sfa:g="0" sfa:b="0"
sfa:a="1"/>
            </sf:shadow>
        </sf:shadow>
    </sf:property-map>
</sf:graphic-style>
```

The only attribute defined in Listing 9 is the sf:shadow; the other attributes are inherited from the default graphic style for shapes. The shadow property contains a <sf:shadow> element, which defines the angle, offset, radius and opacity of the shadow, as well as the color of the shadow. The sf:offset attribute corresponds to the offset value in the inspector; the radius corresponds to the blur value in the inspector; and the opacity corresponds to the opacity value in the inspector.

The <sf:color> child defines the color of the shadow. The xsi:type attribute of "sfa:calibrated-rgb-color-type" allows the application to "know" in what format the color is written. The other attributes are sfa:r, sfa:g, sfa:b, and sfa:a, which define the amount of red, blue and green in the color, and the opacity (alpha) of the color. These values can range from 0 to 1.

d) The Translucent Shape

Figure 38:
FIG. 38 illustrates an example of a translucent shape.

FIG. 38 illustrates an example of the translucent shape. This shape only differs in its geometry, style and text from the previously discussed shapes. Because this shape does not differ significantly from previous shape elements, only its style is shown in the following XML, as illustrated in Listing 10:

Listing 10 - An example of a translucent shape defined in XML

```
<sf:graphic-style sfa:ID="SFDGraphicStyle-57"
sf:parent-ident="shapeStyleID">
    <sf:property-map>
        <sf:opacity>
            <sf:number sfa:number="0.5150376" sfa:type="f"/>
        </sf:opacity>
    </sf:property-map>
</sf:graphic-style>
```

In this example, the style inherits most of its values from the master style. It overrides <sf:opacity>. In some embodiments, when the <sf:opacity> override occurs, it has an sfa:number element with an sfa:type attribute of sfa:f, and an sfa:number attribute that varies from 0 to 1, with 1 being completely opaque, and 0 being completely transparent.

e) The Color Fill Shape

Figure 39:
FIG. 39 illustrates an example of a color fill shape.

FIG. 39 illustrates the color fill shape. Here is the XML for the color fill shape as described in Listing 11:

Listing 11 - An example of a color fill defined in XML

```
<sf:shape sfa:ID="SFDShapeInfo-5">
    <sf:geometry sfa:ID="SFDAffineGeometry-96">
        <sf:naturalSize sfa:w="100" sfa:h="100"/>
        <sf:size sfa:w="100" sfa:h="100"/>
        <sf:position sfa:x="48" sfa:y="315"/>
    </sf:geometry>
    <sf:style>
        <sf:graphic-style-ref sfa:IDREF="SFDGraphicStyle-60"/>
    </sf:style>
    <sf:path>
        <sf:bezier-path sfa:ID="SFDBezierPathSource-5">
            <sf:bezier sfa:ID="NSBezierPath-5" sfa:path="M
            0 0 L 100 0 L 100 100 L 0 100 Z M 0 0" sfa:version="524"/>
        </sf:bezier-path>
    </sf:path>
    <sf:text sfa:ID="SFWPFrame-144">
        <sf:text-storage sfa:ID="SFWPStorage-480" sf:kind="textbox"
        sf:exclude-shapes="true" sf:exclude-tables="true"
sf:exclude-attachments="true">
            <sf:stylesheet-ref sfa:IDREF="SFSStylesheet-27"/>
            <sf:text-body>
                <sf:layout sf:style="SFWPLayoutStyle-189">
                    <sf:p sf:style="SFWPParagraphStyle-
                    390">color<sf:br/></sf:p>
                    <sf:p sf:style="SFWPParagraphStyle-390">fill</sf:p>
                </sf:layout>
            </sf:text-body>
        </sf:text-storage>
    </sf:text>
</sf:shape>
```

In this shape, both the geometry and the text are different from the previously discussed shapes. For text, instead of a single <sf:p> element in the <sf:layout> element, there are two, and one has an <sf:br/> element, which indicates a line break. As shown in Listing 12 example, the different fill is encoded in the style:

Listing 12 - An example of color fill defined in XML

```
<sf:graphic-style sfa:ID="SFDGraphicStyle-60"
sf:parent-ident="shapeStyleID">
    <sf:property-map>
        <sf:fill>
            <sf:color xsi:type="sfa:calibrated-rgb-color-type" sfa:r="0"
            sfa:g="0" sfa:b="1" sfa:a="1"/>
        </sf:fill>
    </sf:property-map>
</sf:graphic-style>
```

As with other shapes, the color fill shape inherits most of its properties from the master style. However, the fill property is overridden, and its value is an <sf:color>. The <sf:color> element here takes the same format as the <sf:color> element in the shadow example.

f) The Gradient Fill Shape

Figure 40:
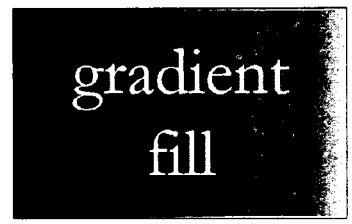
FIG. 40 illustrates an example of a gradient fill shape.

FIG. 40 illustrates a gradient fill shape. The only change in this shape is the style. An example of the XML for the gradient fill shape is as follows in Listing 13:

Listing 13 - An example of gradient fill shape defined in XML

```
<sf:graphic-style sfa:ID="SFDGraphicStyle-64"
sf:parent-ident="shapeStyleID">
    <sf:property-map>
        <sf:fill>
            <sf:angle-gradient sfa:ID="SFRAngleGradient-0" sf:opacity="1"
```

Listing 13 - An example of gradient fill shape defined in XML

```
            sf:type="linear" sf:angle="3.0717794895172119">
                <sf:stops sfa:ID="NSMutableArray-81">
                    <sf:gradient-stop sfa:ID="SFRGradientStop-0"
                    sf:fraction="0">
                        <sf:color xsi:type="sfa:calibrated-rgb-color-type" sfa:r="0"
                        sfa:g="0" sfa:b="1" sfa:a="1"/>
                    </sf:gradient-stop>
                    <sf:gradient-stop sfa:ID="SFRGradientStop-1"
                    sf:fraction="1">
                        <sf:color xsi:type="sfa:calibrated-rgb-color-type"
                        sfa:r="0.27450981736183167"
sfa:g="0.27450981736183167" sfa:b="0.34509804844856262"
sfa:a="1"/>
                    </sf:gradient-stop>
                </sf:stops>
            </sf:angle-gradient>
        </sf:fill>
    </sf:property-map>
</sf:graphic-style>
```

The sf:fill property is similar to the sf:fill property in the color fill example, except that instead of having a color, it has an <sf:angle-gradient>. The xsi:type attribute of the angle-gradient is set to "linear". The angle is the amount that the gradient differs from 180. Opacity refers to how opaque the gradient is.

The <sf:angle-gradient> element contains an <sf:stops> element, which must contain two or more stops. Each stop has a sf:fraction attribute, which describes how far along the gradient the stop occurs, with 0 being the beginning of the gradient and 1 being the end. The value of this attribute should always be larger for any stop than for the previous stop within the gradient. Each <sf:gradient-stop> contains a color, which is of the same format as the color for shadows or color fills.

g) The Image Fill Shape

Figure 41:
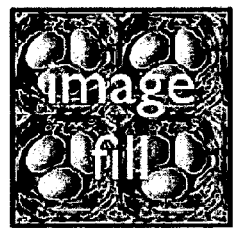
FIG. 41 illustrates an example of a image fill.

FIG. 41 illustrates an image fill. The difference of this shape from the previous shapes is its style. An example of the XML for the image fill shape is shown in Listing 14:

Listing 14 - An example of image fill defined in XML

```
<sf:graphic-style sfa:ID="SFDGraphicStyle-61"
sf:parent-ident="shapeStyleID">
    <sf:property-map>
        <sf:fill>
            <sf:textured-fill sfa:ID="SFDTexturedImageFill-28"
            sf:technique="tile" xsi:type="textured-fill">
                <sf:image sfa:ID="SFRImageBinary-38">
                    <sf:size sfa:w="48" sfa:h="48"/>
                    <sf:data sfa:ID="SFEData-39" sf:path="Nest.tif"
                    sf:displayname="Nest.tif" sf:size="22520" sf:hfs-type="0"
sf:checksum="4bf7bacf" sfa:version="1"/>
                </sf:image>
            </sf:textured-fill>
        </sf:fill>
    </sf:property-map>
</sf:graphic-style>
```

The <sf:fill> property, as shown in the above XML, has a "textured-image-fill" child. The sf:technique attribute describes how the image is drawn to fill the space. It can tile, scale to fit, scale to fill, stretch the image, or leave the image as its original size.

The "image-binary" child defines the actual image. The <sf:size> child of the image-binary child defines the dimensions, in pixels, of the unscaled image. In some embodiments, the sf:path is relative to the document bundle, and the sf:displayname is the name as it appears in the inspector. The sf:hfs-type attribute describes the type of the file as far as the file system is concerned, but may be omitted. The sf:size and sf:checksum attributes are used to determine if the image has changed, and may be omitted. In some embodiments, the sf:version attribute is always set to "1".

h) The Tinted Image Fill

Figure 42:
FIG. 42 illustrates an example of a tinted image fill.

FIG. 42 illustrates a tinted image fill, which is similar to the image fill in the above example. An example of the XML for the tinted image fill is Listing 15:

---

Listing 15 - An example of tinted image fill defined in XML

```
<sf:graphic-style sfa:ID="SFDGraphicStyle-63"
   sf:parent-ident="shapeStyleID">
  <sf:property-map>
    <sf:fill>
      <sf:textured-fill sfa:ID="SFDTexturedImageFill-29"
         sf:technique="tile" xsi:type="textured-fill">
        <sf:color xsi:type="sfa:calibrated-rgb-color-type" sfa:r="0"
           sfa:g="0" sfa:b="1" sfa:a="0.5"/>
        <sf:image-ref sfa:IDREF="SFRImageBinary-38"/>
      </sf:textured-fill>
    </sf:fill>
  </sf:property-map>
```

---

While the tinted image fill shape is similar in many respects to the image fill example, there are several notable differences:

The <sf:textured-fill> element has a sf:color attribute, similar to the sf:color attribute described in the fill and shadow examples.

The <sf:image>, instead of being a full-fledged image element, is an image-ref that refers to the same image used for the previous example. This allows the document to use the same image multiple times without having to write it over and over again, thus keeping the document simpler, smaller, and more consistent.

i) The Thick-colored Stroke

Figure 43:
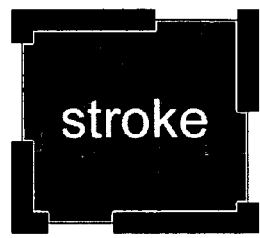
FIG. 43 illustrates an example of a thick-colored stroke.

FIG. 43 illustrates a thick-colored stroke. Its style is defined in the XML in Listing 16:

---

Listing 16 - An example of thick-colored stroke defined in XML

```
<sf:graphic-style sfa:ID="SFDGraphicStyle-58"
   sf:parent-ident="shapeStyleID">
  <sf:property-map>
    <sf:stroke>
      <sf:stroke sfa:ID="SFRStroke-123" sf:miter-limit="4"
         sf:width="8" sf:cap="butt" sf:join="miter">
        <sf:color xsi:type="sfa:calibrated-rgb-color-type" sfa:r="1"
           sfa:g="0" sfa:b="1" sfa:a="1"/>
        <sf:pattern sfa:ID="SFRStrokePattern-123" sf:phase="0"
           sf:type="pattern">
          <sf:pattern>
            <sf:element sf:val="6"/>
            <sf:element sf:val="6"/>
          </sf:pattern>
        </sf:pattern>
      </sf:stroke>
    </sf:stroke>
  </sf:property-map>
</sf:graphic-style>
```

---

As shown in Listing 16, the stroke property has a <sf:stroke> child, with a sf:width attribute that defines how many pixels wide the stroke is. The sf:miter-limit and sf:cap attributes define how the stroke joins to itself. The <sf:color> child defines the color of the stroke, and is of the same format as the previous color examples.

The <sf:pattern> element contains a pattern child which has two, four or six element children. The first element child of each pair describes the length of a piece of line that is drawn, and the next element describes the length of an empty space.

j) The Rotated Default Shape

Figure 44:
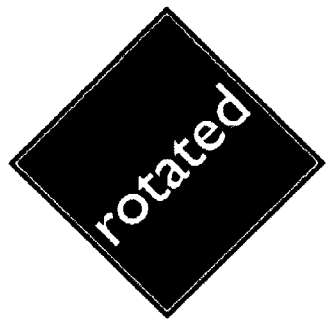
FIG. 44 illustrates an example of a default shape that has been rotated 45 degrees.

FIG. 44 illustrates a default shape that has been rotated 45 degrees. There is a change in the geometry, as shown in the following XML in Listing 17:

---

Listing 17 - An example of rotated default shape defined in XML

```
<sf:shape sfa:ID="SFDShapeInfo-10">
 <sf:geometry sfa:ID="SFDAffineGeometry-101" sf:angle="45">
   <sf:naturalSize sfa:w="100" sfa:h="100"/>
   <sf:size sfa:w="100" sfa:h="100"/>
   <sf:position sfa:x="385.289306640625" sfa:y="450.289306640625"/>
 </sf:geometry>
 <sf:style>
   <sf:graphic-style-ref sfa:IDREF="SFDGraphicStyle-56"/>
 </sf:style>
 <sf:path>
   <sf:bezier-path sfa:ID="SFDBezierPathSource-10">
     <sf:bezier sfa:ID="NSBezierPath-10" sfa:path="M
        0 0 L 100 0 L 100 100 L 0 100 Z M 0 0" sfa:version="524"/>
   </sf:bezier-path>
 </sf:path>
 <sf:text sfa:ID="SFWPFrame-149">
   <sf:text-storage sfa:ID="SFWPStorage-573"  sf:kind="textbox"
      sf:exclude-shapes="true"  sf:exclude-tables="true"
sf:exclude-attachments="true">
     <sf:stylesheet-ref sfa:IDREP="SFSStylesheet-27"/>
     <sf:text-body>
       <sf:layout sf:style="SFWPLayoutStyle-189">
         <sf:p sf:style="SFWPParagraphStyle-390">rotated</sf:p>
       </sf:layout>
     </sf:text-body>
   </sf:text-storage>
 </sf:text>
</sf:shape>
```

---

As shown in Listing 17, the sf:angle attribute on the <sf:geometry> element defines the amount of rotation.

4. Structure of Drawable Objects

In this sub-section, the structure of drawable objects of some embodiments is discussed. All shapes in the XML schemas share some of these structures.

a) Drawable Object Geometry

Listing 18 defines the basic geometry of a drawable object in XML, as contained by the <sf:geometry> element of some embodiments.

---

Listing 18 - An example of the basic geometry of a drawable object defined in XML

```
<sf:geometry sfa:ID="SFDAffineGeometry-0" sf:sizesLocked="true"
   sf:angle="315">
  <sf:naturalSize sfa:w="100.0" sfa:h="0.0"/>
  <sf:size sfa:w="100.0" sfa:h="0.0"/>
  <sf:position sfa:x="100.0" sfa:y="100.0"/>
</sf:geometry>
```

---

The sfa:ID attribute is a unique string. The sf:sizesLocked attribute specifies whether the drawable object is locked with the "true" identifier. The sf:angle attribute specifies the angle of rotation as a float with a range of 0-360. The child element in this example (<sf:naturalSize>) is the unscaled size of the object, and for all but images should be the same as <sf:size>. The <sf:size> is the scaled size of the object. The <sf:position> defines the position on the page.

b) Drawable Object Style

Listing 19 defines the basic style of a drawable object in XML, as contained by the <sf:size> element.

---
Listing 19 - An example of the basic style of a drawable object
---
```
<sf:style>
    <sf:graphic-style-ref sfa:IDREF="SFDGraphicStyle-33"/>
</sf:style>
```
---

As shown in Listing 19, the child element <sf:graphic-style-ref> references the graphic style.

c) Drawable Object Path

Listing 20 defines the shape of a path of a drawable object in XML, as contained by the ---
Listing 20 - An example of the basic path of a drawable object
---
```
<sf:path>
    <sf:bezier-path sfa:ID="SFDBezierPathSource-3">
        <sf:bezier sfa:ID="NSBezierPath-9" sfa:path="M 0
        50 L 50 100 L 100 50 L 50 0 Z M 0 50" sfa:version="524"/>
    </sf:bezier-path>
</sf:path>
```
---

As shown in Listing 20, the child element <sf:bezier-path> describes how the path is to be drawn. The sfa:version attribute in this example is shown to have a value of "524".

d) Drawable Object Binary

Listing 21 defines the binary of a drawable object for an image, such as a JPEG, TIFF, PDF, or EPS in XML, as contained by the <sf:binary> element.

---
Listing 21 - An example of the basic binary of a drawable object
---
```
<sf:binary sfa:ID="SFRImageBinary-2">
    <sf:size sfa:w="77" sfa:h="46"/>
    <sf:data sfa:ID="SFEData-2" sf:path="testA.tiff"
    sf:displayname="testA.tiff" sf:size="14362" sf:hfs-type="0"
    sf:checksum="707facb4" sfa:version="1"/>
</sf:binary>
```
---

The child element <sf:size> is the size of the original image, with the attributes sfa:w and sfa:h having float values that define the width and height. The <sf:data> element describes the image file with the following attributes:

sf:path, which defines the path, either as a bundle or absolute path name to the image file. (A bundle-relative path might be renamed to avoid collisions.)

sf:displayname, which displays the name of the image shown in the metrics inspector.

sf:size, which specifies the optional size of the file in bytes, and is used to determine if the file has changed.

sf:checksum, which is the checksum of the file data, and is used to determine if the file has changed.

sfa:version, which is shown in this example to have a value of "1".

e) Drawable Object Line Shape

Listing 22 defines the basic line shape of a drawable object in XML, as contained by the <sf:line> element.

---
Listing 22 - An example of the basic line of a drawable object
---
```
<sf:line sfa:ID="SFDLineInfo-0">
    <sf:geometry sfa:ID="SFDAffineGeometry-0" sf:sizesLocked="true"
    sf:angle="315">
        <sf:naturalSize sfa:w="100.0" sfa:h="0.0"/>
        <sf:size sfa:w="100.0" sfa:h="0.0"/>
        <sf:position sfa:x="100.0" sfa:y="100.0"/>
    </sf:geometry>
    <sf:style>
        <sf:graphic-style-ref sfa:IDREF="SFDGraphicStyle-0"/>
    </sf:style>
    <sf:head sfa:x="100.0" sfa:y="100.0"/>
    <sf:tail sfa:x="100.0" sfa:y="100.0"/>
</sf:line>
```
---

As shown in Listing 22, the child elements in this example are <sf:geometry>, <sf:style>, <sf:head>, and <sf:tail>. The <sf:head> defines the position of the head of the line, with attributes sfa:x and sfa:y having the floating point coordinates. The <sf:tail> defines the position of the tail of the line, with attributes sfa:x and sfa:y having the floating point coordinates.

f) Drawable Object Basic Shape

Listing 23 shows an example of the basic shape of a drawable object in XML, as contained by the <sf:drawable-shape> element.

---
Listing 23 - An example of the basic shape of a drawable object
---
```
<sf:drawable-shape sfa:ID="SLShapeInfo-2" sfa:sfclass="shape" sl:max-attachment-scale-x="0.70710676908493042" sl:max-
attachment-scale-y="0.70710676908493042">
    <sf:geometry sfa:ID="SFDAffineGeometry-11">
        <sf:naturalSize sfa:w="100" sfa:h="100"/>
        <sf:size sfa:w="100" sfa:h="100"/>
        <sf:position sfa:x="72" sfa:y="274"/>
    </sf:geometry>
    <sf:style>
        <sf:graphic-style-ref sfa:IDREF="SFDGraphicStyle-38"/>
    </sf:style>
    <sf:path>
        <sf:bezier-path sfa:ID="SFDBezierPathSource-2">
            <sf:bezier sfa:ID="NSBezierPath-8" sf:path="M 85.355339050292969 14.644660949707031 C 104.88155364990234
34.170875549316406    104.88155364990234    65.829124450683594    85.355339050292969    85.355339050292969    C
65.829124450683594     104.88155364990234    34.170875549316406    104.88155364990234    14.644660949707031
85.355339050292969   C   −4.8815536499023438   65.829124450683594   −4.8815536499023438       34.170875549316406
14.644660949707031    14.644660949707031    C    34.170875549316406    −4.8815536499023438    65.829124450683594 −
4.8815536499023438 85.355339050292969 14.644660949707031" sfa:version="524"/>
        </sf:bezier-path>
    </sf:path>
    <sf:text sfa:ID="SFWPFrame-14">
```

Listing 23 - An example of the basic shape of a drawable object

```
    <sf:text-storage sfa:ID="SFWPStorage-22" sf:kind="textbox" sf:exclude-tables="true">
      <sf:stylesheet-ref sfa:IDREF="SFSStylesheet-1"/>
      <sf:text-body>
        <sf:layout sf:style="graphic-shape-layout-style-default">
          <sf:p sf:style="paragraph-style-default"/>
        </sf:layout>
      </sf:text-body>
    </sf:text-storage>
  </sf:text>
</sf:drawable-shape>
```

As shown in Listing 23, the sfa:class attribute always has a value of "shape". The child elements in this example are <sf:geometry>, <sf:style>, <sf:path>, and <sf:text>. The <sf:text> element defines the text inside of the shape.

g) Drawable Object Images

Listing 24 defines the basic images of a drawable object in XML, as contained by the <sf:image> element.

Listing 24 - An example of the basic images of a drawable object

```
<sf:image sfa:ID="SFDImageInfo-1" sf:image-placeholder="true">
    <sf:geometry sfa:ID="SFDAffineGeometry-19"
sf:aspectRatioLocked="true">
        <sf:naturalSize sfa:w="77" sfa:h="46"/>
        <sf:size sfa:w="77" sfa:h="46"/>
        <sf:position sfa:x="72" sfa:y="72"/>
    </sf:geometry>
<sf:style>
    <sf:graphic-style-ref sfa:IDREF="SFDGraphicStyle-33"/>
</sf:style>
<sf:binary sfa:ID="SFRImageBinary-2">
    <sf:size sfa:w="77" sfa:h="46"/>
    <sf:data   sfa:ID="SFEData-2"   sf:path="testA.tiff"
sf:displayname="testA.tiff"   sf:size="14362"   sf:hfs-type="0"
sf:checksum="707facb4" sfa:version="1"/>
    </sf:binary>
</sf:image>
```

The child elements in this example are <sf:geometry>, <sf:style>, and <sf:binary>. The sf:image-placeholder attribute has a value of "true" if the image is a placeholder; otherwise, this attribute is omitted.

5. Working with Text Objects in Documents

This sub-section uses several examples to describe how text objects in each example are stored and laid out in XML. The examples show how text is stored and laid out in some embodiments. The following examples are given in this sub-section:

"Main Body Text Objects with Character Styles" examines a page layout comprised of main body text, along with a bolded character style in its second paragraph, and a tab.

"Lists Text Object" discusses the elements and attributes of a list of text items in a hierarchical outline view.

"Multiple Column Text Objects" discusses a page layout that is comprised of multiple columns.

"Text Objects with Date-Time Fields and Hyperlinks" discusses how a user can work with a page layout comprised of a date-time field, page numbers, bookmarks, and hypertext links.

"A Footnote Text Object" looks at a text object with two footnotes and their corresponding superscripts.

"A Text Object with an Image and a Drawable Attachment" explains how the user can work with a text object with an image and a drawable attachment.

a) Example of Main Body Text Objects with Character Styles

FIG. 45 illustrates the output for a text storage object. As shown, this object has a page layout comprised of a main body text and a bolded character style in a second paragraph, followed by a tab. Listing 25 describes the XML for this text storage object.

Listing 25 - An example of the XML for the main body text and a second paragraph with a bolded character style

```
<sf:text-storage sf:kind="body" sfa:ID="SFWPStorage-8">
    <sf:stylesheet-ref sfa:IDREF="SFSStylesheet-1"/>
    <sf:text-body>
        <sf:section sf:name="Chapter 1" sf:style="section-style-0">
            <sf:layout sf:style="layout-style-20">
                <sf:p sf:style="paragraph-style-32">Main body
                text.<sf:br/></sf:p>
                <sf:p sf:style="SFWPParagraphStyle-44">Second paragraph
                with a
<sf:span sf:style="SFWPCharacterStyle-5">character</sf:span> style and
a<sf:tab/>tab.<sf:br/></sf:p>
                <sf:p sf:style="paragraph-style-32">
                    <sf:br/>
                </sf:p>
            </sf:layout>
        </sf:section>
    </sf:text-body>
</sf:text-storage>
```

As shown in Listing 25, the <sf:text-storage> element has two attributes: the sfa:ID attribute and the sf:kind. The sf:kind attribute indicates the usage of the text. For instance, in some embodiments, the value may be "body", "header", "footnote", "textbox", "note", or "cell". The text storage sf:kind attribute has a value corresponding to its use in the document. For example, the text storage used for a header has a sf:kind="header" in order to avoid undefined or unpredictable types of behavior.

A <sf:text-storage> element has a <sf:stylesheet-ref> child element that refers to the document or prototype stylesheet and may have a child <sf:attachments> element. Body text storages can also have a <sf:footnotes> child element.

A <sf:text-storage> element has a <sf:text-body> child element. The next immediate child of the <sf:text-storage> element depends on the text storage kind. The child elements of a <sf:text-storage> with an sf:kind of "body" follow the hierarchy of <sf:section> elements, containing <sf:layout> elements that contain <sf:p> elements, which indicate the section, layout style, and paragraph style, respectively, of the contained mixed content.

The child elements of a <sf:text-storage> with an sf:kind of "textbox", "cell", or "note" follow the hierarchy of <sf:layout> elements containing <sf:p> elements, which indicate the layout style, and paragraph style, respectively, of the contained mixed content. The child elements of a <sf:text-storage> with an sf:kind of "header" or "footnote" elements contain <sf:p> elements, which indicate the paragraph style of the contained mixed content. In some embodiments, the <sf:p> element does not itself indicate the break character which ends the paragraph and must be included immediately prior to the close of the paragraph element (except on the last paragraph of the text storage).

Style runs at the sub-paragraph level are enclosed in <sf:span> elements, and reference character styles. The spans are used only for sub-paragraph style runs and define only the variations from the enclosing paragraph style. Any style that applies to all of the text in a paragraph should be defined by the paragraph style. The <sf:span> elements do not nest.

The standard paragraph break is indicated by a <sf:br/> element. Other paragraph breaking elements are <sf:pgbr/> for page breaks, <sf:sectbrbr/> for section breaks, <sf:layoutbr/> for layout breaks, <sf:contbr/> for container breaks, and <sf:footnotebr/> for footnote breaks.

In some embodiments, the styles in a document have several attributes that can be used to identify the style. Like many other elements, all style elements have an sfa:ID attribute with a unique string as a value. Many style elements also have an sf:ident attribute with a value that is unique for all style elements of that type. Some style elements also have an sf:name attribute with a user-visible string as the value.

Text styles are referred to elsewhere in the document by a sf:style attribute the value of which is either the style's sf:ident, or its sfa:ID. The <sf:section> element must have an <sf:name> attribute (which is not exposed to the user), and an sf:style attribute referencing a section style. The <sf:layout> and <sf:p> elements reference layout and paragraph styles, respectively.

b) Example of Lists Text Object

FIG. 46 illustrates the output for a text object of some embodiments. As shown, this object has a page layout comprised of a list of items in an outline view. Listing 26 describes the XML for text in outline form.

---

Listing 26 - An example of the XML for an item list in outline form

```
<sf:text-storage sf:kind="body" sfa:ID="SFWPStorage-8">
  <sf:stylesheet-ref sfa:IDREF="SFSStylesheet-1"/>
  <sf:text-body>
    <sf:section sf:name="Chapter 1" sf:style="section-style-0">
      <sf:layout sf:style="layout-style-20">
        <sf:p sf:style="paragraph-style-32">List of items:<sf:br/></sf:p>
        <sf:p sf:style="SFWPParagraphStyle-45"
        sf:restart-list="true">First<sf:br/></sf:p>
        <sf:p sf:style="SFWPParagraphStyle-45"
        sf:list-level="1">Sublevel 1<sf:br/></sf:p>
        <sf:p sf:style="SFWPParagraphStyle-45"
        sf:list-level="2">Sublevel 2<sf:br/></sf:p>
        <sf:p sf:style="SFWPParagraphStyle-46">Second<sf:br/></sf:p>
        <sf:p sf:style="SFWPParagraphStyle-43">Third<sf:br/></sf:p>
        <sf:p sf:style="paragraph-style-32">
          <sf:sectbr/>
        </sf:p>
      </sf:layout>
    </sf:section>
  </sf:text-body>
</sf:text-storage>
```

---

As shown, the fact that a paragraph is an element in a list is indicated by an sf:list-level attribute with an integer value in the range of, e.g., "1" to "9" on the <sf:p> element. An sf:restart-list attribute with a value of "true" indicates that the paragraph begins a new sequence at this level rather than continuing a previous one. The appearance of the list element—that is, bullets, indentation, and so on—is found in the paragraph style.

c) Example of Multiple Column Text Objects

FIG. 47 illustrates a text object with a page layout comprised of multiple columns. In this case, the text flows and wraps over all three columns. Listing 27 describes the XML for text in multiple columns.

---

Listing 27 - An example of the XML for a multiple column page layout

```
<sf:text-storage sf:kind="body" sfa:ID="SFWPStorage-8">
  <sf:stylesheet-ref sfa:IDREF="SFSStylesheet-1"/>
  <sf:text-body>
    <sf:section sf:name="Chapter 2" sf:style="section-style-22">
      <sf:layout sf:style="layout-style-35">
        <sf:p sf:style="paragraph-style-32">Text in the second
        section.<sf:layoutbr/></sf:p>
      </sf:layout>
      <sf:layout sf:style="SFWPLayoutStyle-13">
        <sf:p sf:style="paragraph-style-32">New layout with multiple
        columns. New layout with multiple columns. New layout with multiple
        columns. New layout with multiple columns. New layout with multiple
        columns. New layout with multiple columns. New layout with multiple
        columns. <sf:layoutbr/>
        </sf:p>
      </sf:layout>
      <sf:layout sf:style="layout-style-36">
        <sf:p sf:style="paragraph-style-32">
          <sf:br/>
        </sf:p>
      </sf:layout>
    </sf:section>
  </sf:text-body>
</sf:text-storage>
```

---

As shown in Listing 27, the <sf:layout> element indicates the layout style for the multiple column text view that is generated in FIG. 47. The column count is a property of the layout style. The sf:style attribute specifies the paragraph style, which includes the "New layout with multiple columns" text, followed by a sf:layoutbr break attribute. The last paragraph in a layout is terminated by an <sf:layoutbr> instead of a paragraph break.

d) Example of Text Objects with Date-Time Fields and Hyperlinks

FIG. 48 illustrates the output for a text object of some embodiments. The text object has a page layout comprised of a date-time field, along with page numbers, bookmarks, and hypertext links. Listing 28 describes the XML for this text-storage object.

---

Listing 28 - An example of the XML for date-time fields, page numbers, bookmarks, and hypertext links

```
<sf:text-storage sf:kind="body" sfa:ID="SFWPStorage-8">
  <sf:stylesheet-ref sfa:IDREF="SFSStylesheet-1"/>
  <sf:text-body>
```

Listing 28 - An example of the XML for date-time fields, page numbers, bookmarks, and hypertext links

```
<sf:section sf:name="Chapter 2" sf:style="section-style-22">
    <sf:layout sf:style="layout-style-36">
        <sf:p sf:style="paragraph-style-32">Some fields and attachments:
            <sf:date-time sf:format="MMMM d, yyyy h:mm a" sf:locale="en_US"
                sf:date-style="long" sf:time-style="short"
                sf:auto-update="true">April 19, 2005 11:46 PM</sf:date-time> page number:
            <sf:page-number sf:value="2"/> of:
            <sf:page-count sf:value="2"/>.
            <sf:br/>
        </sf:p>
        <sf:p sf:style="paragraph-style-32">
            <sf:br/>
        </sf:p>
        <sf:p sf:style="paragraph-style-32">Text in a
            <sf:bookmark sf:name="bookmark" sf:ranged="true" sf:page="2" sfa:ID="SFWPBookmarkField-0">
book<sf:br/></sf:bookmark>
        </sf:p>
        <sf:p sf:style="paragraph-style-32"><sf:bookmark-ref sfa:IDREF="SFWPBookmarkField-0">mark
        </sf:bookmark-ref>, and a <sf:link href="http://web.apple.com"><sf:span sf:style="SFWPCharacterStyle-6">
hyperlink</sf:span></sf:link>.<sf:br/></sf:p>
    </sf:layout>
</sf:section>
</sf:text-body>
</sf:text-storage>
```

The following paragraphs discuss the defining characteristics of the various fields of this text object, including bookmark, placeholder text, hyperlink, date-time, and page number and page count.

(1) Bookmark Fields

A bookmark field is defined by a <sf:bookmark> element. This element has one optional attribute, sfa:ID. This attribute identifies the particular bookmark field. This attribute is defined only if the bookmark crosses a paragraph boundary, in which case the continuation is indicated by a <sf:bookmark-ref> element with an sfa:IDREF attribute with a value corresponding to the value of the sfa:ID of the <sf:bookmark> element that is being continued.

(2) Placeholder Text Fields

A placeholder text field is defined by a <sf:ghost-text> element with one optional attribute, sfa:ID. This attribute identifies the particular placeholder test field. This attribute is defined only if the placeholder text crosses a paragraph boundary, in which case the continuation is indicated by a <sf:ghost-text-ref> element with an sfa:IDREF attribute with a value corresponding to the value of the sfa:ID of the <sf:ghost-text> element which is being continued. In some embodiments, a placeholder text field contains only textual content. In these embodiments, the word-processing application utilizes the placeholder text field to allow a user to copy (e.g., drag and drop or cut and past) text into the location identified by the placeholder text. The copied text replaces the placeholder content.

(3) Hyperlink Fields

A hyperlink field is defined by a <sf:link> element with a single attribute. A hyperlink field does not cross a paragraph boundary, and cannot contain graphical attachments, date-time fields, placeholder text, or other hyperlink fields. It may contain <sf:span> elements. The href attribute defines either a standard web (http:) or mail (mailto:) URL, or a bookmark name prefix by '#'.

(4) Date-Time Fields

A date-time field is defined by a <sf:date-time> element with several possible attributes, and no child elements. The content of the field is text only, and is the resulting formatted text seen in the document. The sf:format attribute defines the format of the date or time text. In some embodiments, the syntax of this string is defined in a library file accessible through the Internet. The sf:locale attribute specifies the locale used to format the date time string.

In some embodiments, the optional sf:date-style and sf:time-style attributes define the style indicated by the format in the sf:format attribute. Some possible values are "short", "medium", "long", and "full". These attributes are defined only if together they result in the format specifed by the value of the sf:format attribute; otherwise, they are omitted. If the sf:auto-update attribute has a value of "true", then the field is auto-updating.

(5) Page Number and Page Count Fields

A page number field is defined by a <sf:page-number> element with a single attribute and no content. A page count field is defined by a <sf:page-count> element with a single attribute and no content. The value of the sf:value attribute of page number and page count fields is an integer corresponding to the most recent value represented by the field, and is recomputed whenever the text containing the field is laid out.

e) A Footnote Text Object

FIG. 49 illustrates the output for a text object with two footnotes and their footnote references (the superscripted numbers in the body text). Listing 29 describes the XML for this text-storage object.

Listing 29 - An example of the XML for a footnotes text object

```
<sf:text-storage sf:kind="body" sfa:ID="SFWPStorage-8">
<sf:stylesheet-ref sfa:IDREF="SFSStylesheet-1"/>
<sf:footnotes>
    <sf:text-storage sfa:ID="SFWPStorage-7" sf:kind="footnote">
```

Listing 29 - An example of the XML for a footnotes text object

```
    <sf:stylesheet-ref sfa:IDREF="SFSStylesheet-1"/>
    <sf:attachments/>
    <sf:text-body>
      <sf:p sf:style="kSFWPFootnoteTextStyleIdentifier"><sf:span sf:style="SFWPCharacterStyle-4">
<sf:footnote-mark sf:mark="1"/></sf:span> First footnote<sf:footnotebr/></sf:p>
      <sf:p sf:style="kSFWPFootnoteTextStyleIdentifier"><sf:span sf:style="SFWPCharacterStyle-4">
<sf:footnote-mark sf:mark="2"/></sf:span> This is the footnote text.<sf:footnotebr/></sf:p>
        <sf:p sf:style="paragraph-style-default"/>
      </sf:text-body>
    </sf:text-storage>
</sf:footnotes>
<sf:text-body>
    <sf:section sf:name="Chapter 2" sf:style="section-style-22">
      <sf:layout sf:style="layout-style-36">
        <sf:p sf:style="paragraph-style-32">Footnotes<sf:span sf:style="SFWPCharacterStyle-4">
   <sf:footnote sf:index="0" sf:autonumber="1"/></sf:span>, too<sf:span sf:style="SFWPCharacterStyle-4">
<sf:footnote sf:index="0" sf:autonumber="2"/></sf:span><sf:br/></sf:p>
        <sf:p sf:style="paragraph-style-32">
          <sf:br/>
        </sf:p>
      </sf:layout>
    </sf:section>
</sf:text-body>
</sf:text-storage>
```

(1) Footnotes

The <sf:footnotes> element defines a single <sf:text-storage> element that must have a sf:kind value of "footnote". Within the footnote storage, individual footnotes are separated by <sf:footnotebr> elements. The footnote numbers are indicated by optional <sf:footnote-mark> elements with a single attribute. The value of the sf:mark attribute defines the number given to the footnote.

(2) Footnote References

The footnote references are defined in the body text as <sf:footnote/> elements with two attributes and no content. The value of the sf:index attribute defines a valid index into the text of the <sf:footnotes> element (zero for the first footnote and so on). In some embodiments, if the value of the sf:autonumber attribute is "YES", then the sf:mark attribute on the corresponding <sf:footnote-mark> is renumbered as footnotes are added and removed.

f) A Text Object with an Image and a Drawable Attachment

Figure 50:
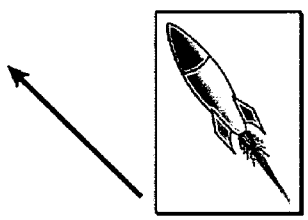
FIG. 50 illustrates an example output for a text object with an image and a drawable attachment.

FIG. 50 illustrates a text object of some embodiments. The text object has an image attachment and a drawable attachment. Listing 30 describes the XML for this text-storage object.

Listing 30 - An example of the XML for a text storage object with an image and a drawable attachment

```
<sf:text-storage sf:kind="body" sfa:ID="SFWPStorage-8">
    <sf:stylesheet-ref sfa:IDREF="SFSStylesheet-1"/>
    <sf:attachments>
        <sf:attachment sfa:ID="SLDrawableAttachment-0" sfa:sfclass=""
        sf:kind="drawable-attachment">
            <sf:line sfa:ID="SFDLineInfo-0">
            </sf:line>
        </sf:attachment>
        <sf:attachment sfa:ID="SLDrawableAttachment-1" sfa:sfclass=""
        sf:kind="drawable-attachment">
            <sf:image sfa:ID="SFDImageInfo-0">
            </sf:image>
        </sf:attachment>
    </sf:attachments>
    <sf:text-body>
      <sf:section sf:name="Chapter 2" sf:style="section-style-22">
        <sf:layout sf:style="layout-style-36">
```

Listing 30 - An example of the XML for a text storage object with an image and a drawable attachment

```
          <sf:p sf:style="paragraph-style-32">
            <sf:attachment-ref sfa:IDREF="SLDrawableAttachment-0"
            sf:kind="drawable-attachment"/>
            <sf:attachment-ref sfa:IDREF="SLDrawableAttachment-1"
            sf:kind="drawable-attachment">
          </sf:p>
        </sf:layout>
      </sf:section>
    </sf:text-body>
</sf:text-storage>
```

(1) Attachments

The <sf:attachments> element defines a sequence of <sf:attachment> elements, each of which defines a single attachment appearing in the following <sf:text-body> element. In addition to an sfa:ID attribute, the <sf:attachment> element has two other attributes and a child element. The child element is either a <sf:line>, <sf:drawable-shape>, or <sf:image>. The attributes are sfa:ID, sfa:class, and sf:kind. In the example above, the sfa:class attribute has a value of " ". The sf:kind attribute has a value of "drawable-attachment" if the child element is an <sf:line>, <sf-drawable-shape>, or <sf:image>.

(2) Attachment References

Within the text body, attachment points are defined by <sf attachment-ref> elements with one attribute, in addition to the sfa:IDREF attribute that references the attachment in the <sf:attachments> element. The sf:kind attribute must have the same value as the sf:kind attribute on the referenced attachment.

IV. COMPUTER SYSTEM

Figure 51:
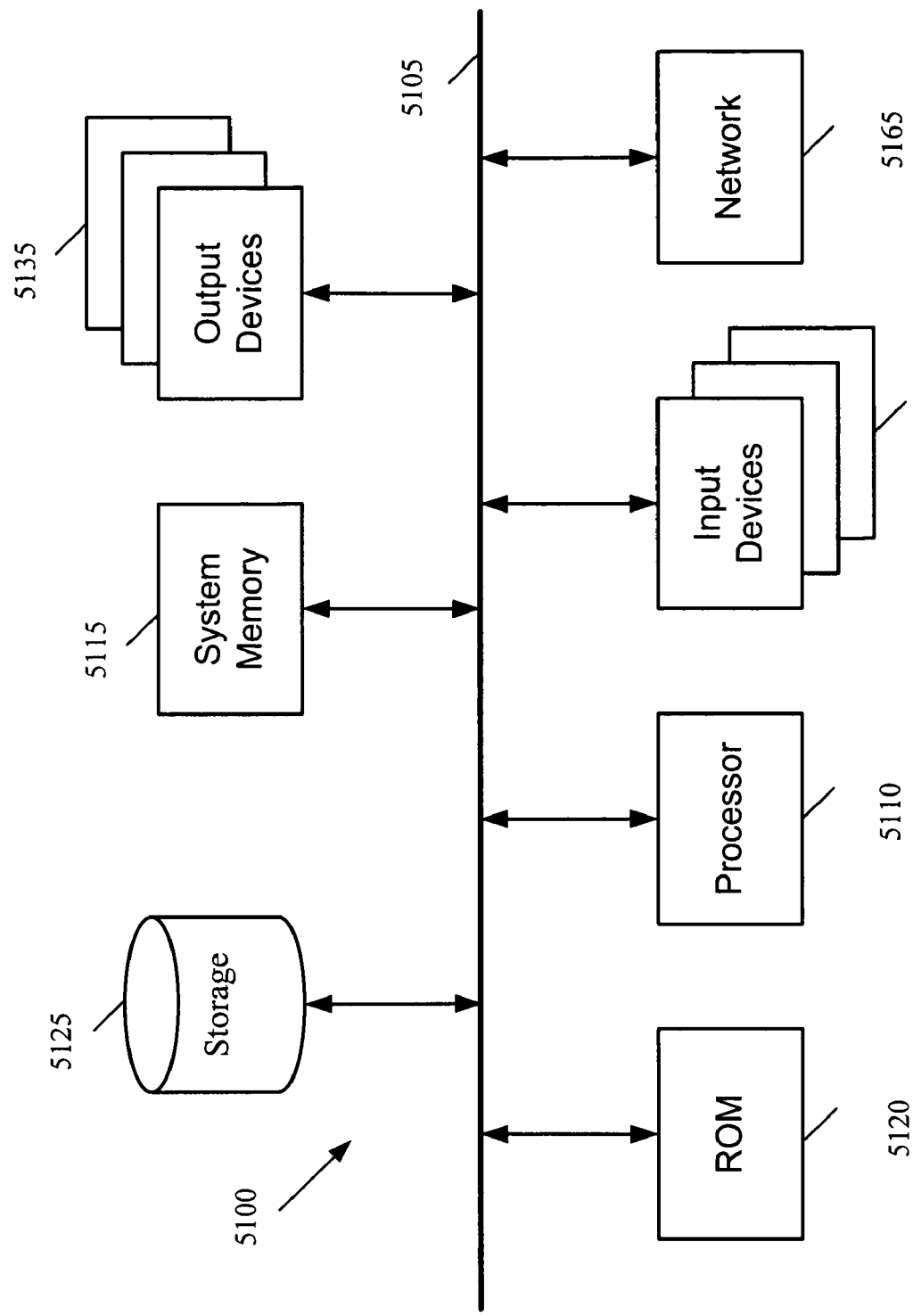
FIG. 51 presents a computer system with which some embodiments of the invention are implemented.

FIG. 51 illustrates a computer system with which some embodiments of the invention are implemented. Computer system 5100 includes a bus 5105, a processor 5110, a system memory 5115, a read-only memory 5120, a permanent storage device 5125, input devices 5130, and output devices 5135.

The bus 5105 collectively represents all system, peripheral, and chipset buses that communicatively connect the numerous internal devices of the computer system 5100. For instance, the bus 5105 communicatively connects the processor 5110 with the read-only memory 5120, the system memory 5115, and the permanent storage device 5125.

From these various memory units, the processor 5110 retrieves instructions to execute and data to process in order to execute the processes of the invention. The read-only-memory (ROM) 5120 stores static data and instructions that are needed by the processor 5110 and other modules of the computer system.

The permanent storage device 5125, on the other hand, is a read-and-write memory device. This device is a non-volatile memory unit that stores instructions and data even when the computer system 5100 is off. Some embodiments of the invention use a mass-storage device (such as a magnetic or optical disk and its corresponding disk drive) as the permanent storage device 5125.

Other embodiments use a removable storage device (such as a floppy disk or ZIP® disk, and its corresponding disk drive) as the permanent storage device. Like the permanent storage device 5125, the system memory 5115 is a read-and-write memory device. However, unlike storage device 5125, the system memory is a volatile read-and-write memory, such a random access memory. The system memory stores some of the instructions and data that the processor needs at runtime. In some embodiments, the invention's processes are stored in the system memory 5115, the permanent storage device 5125, and/or the read-only memory 5120.

The bus 5105 also connects to the input and output devices 5130 and 5135. The input devices enable the user to communicate information and select commands to the computer system. The input devices 5130 include alphanumeric keyboards and pointing devices. The output devices 5135 display images generated by the computer system. For instance, these devices display a graphical user interface. The output devices include printers and display devices, such as cathode ray tubes (CRT) or liquid crystal displays (LCD).

Finally, as shown in FIG. 51, bus 5105 also couples computer 5100 to a network 5165 through a network adapter (not shown). In this manner, the computer can be a part of a network of computers (such as a local area network ("LAN"), a wide area network ("WAN"), or an Intranet, or a network of networks, such as the internet. For example, the computer 5100 may be coupled to a web server (network 5165) so that a web browser executing on the computer 5100 can interact with the web server as a user interacts with a graphical user interface that operates in the web browser.

Any or all components of computer system 5100 may be used in conjunction with the invention. However, one of ordinary skill in the art would appreciate that any other system configuration may also be used in conjunction with the present invention.

The invention provides users with the ability to quickly create complex documents by providing them with numerous templates that can be custom configured to suit the users' particular needs. In addition, the invention provides an intuitive set of tools to allow the user to custom configure the templates. Moreover, the invention provides numerous visual cues that simplify the process of editing a template.

While the invention has been described with reference to numerous specific details, one of ordinary skill in the art will recognize that the invention can be embodied in other specific forms without departing from the spirit of the invention. For instance, many sub-sections present deconstructed examples of how the XML is formed. Although Apple Mac OS® environment and Apple iWork® tools are used to create some of these examples, a person of ordinary skill in the art would realize that the invention may be practiced in other operating environments such as Microsoft Windows®, UNIX®, Linux®, etc., and without the use of these specific details. Also, some of the examples may show only portions of an XML listing. Also, some of the listings shown are intended as a symbolic representation of the document format rather than strictly valid XML. For instance, to make the XML examples simple to read, some listings may use shorthand notations without showing all matching open and close element tags. Thus, one of ordinary skill in the art would understand that the invention is not to be limited by the foregoing illustrative details, but rather is to be defined by the appended claims.

What is claimed is:

1. A non-transitory computer readable medium storing a computer program for execution by at least one processor, the computer program comprising sets of instructions for:
    using a set of template pages to create an object representation of a document, wherein a plurality of elements of the document are implemented as a plurality of objects in an object-oriented software environment in the object representation of the document;
    modifying the document's object representation in response to a set of modifications to the set of template pages that modifies the document to include a set of user-defined content;
    using a packing module to convert the object representation to a storage representation that is stored in a single data file comprising (i) a plurality of prototype sections, each prototype section for storing information describing a different template page in the set of template pages and (ii) a section, separate from the plurality of prototype sections, for storing the set of user-defined content for the document, wherein the prototype sections are not affected by the set of modifications to the set of template pages and do not store any user-defined content and the section separate from the prototype sections does not store any information describing the template pages; and
    parsing the single data file to convert the storage representation to the object representation when the document is opened, wherein each different template page stored in a different prototype section is converted into a different object upon opening of the document.

2. The non-transitory computer readable medium of claim 1, wherein the computer program is a word-processing application.

3. The non-transitory computer readable medium of claim 1, wherein a particular prototype section storing information describing a particular template page comprises a text sub-section for storing in-line content used in the particular template page, a thumbnail sub-section for storing a page thumbnail of the particular template page, a drawables sub-section for storing information about floating content used in the particular template page, a stylesheet sub-section for storing stylesheet information for the particular template page, a headers sub-section for storing headers information for the particular template page, and a footers sub-sections for storing footers information for the particular template page.

4. The non-transitory computer readable medium of claim 3, wherein the drawables sub-section comprises (i) a first sub-section for storing information describing each floating object that appears on the particular template page and appears in its entirety on each of at least one other template page and (ii) a second sub-section for storing information describing floating objects that appear on only the particular template page.

5. The non-transitory computer readable medium of claim 3, wherein the computer program further comprises a set of instructions for utilizing said stored page thumbnails to generate a visual representation of the particular template page to assist a user in creating the document.

6. The non-transitory computer readable medium of claim 3, wherein the section separate from the prototype sections comprises a text sub-section for storing in-line content added to the document by a user, a thumbnail sub-section for storing page thumbnails of the user-defined document, a drawables sub-section for storing information about floating content added to the document by the user, a stylesheet sub-section for storing user-defined stylesheet information, a headers sub-section for storing user-defined headers information, and a footers content for storing user-defined footers information.

7. The non-transitory computer readable medium of claim 6, wherein the drawables sub-section comprises a first sub-section for storing information describing each floating object that appears in its entirety on each of at least two pages and a second sub-section for storing information describing floating objects that appear on only one page in the document.

8. A method of storing a document, the method comprising:
creating an object representation of a document using a set of template pages;
storing the document by converting the document's object representation to a storage representation that is stored in a single data storage structure comprising a first section for storing information describing the set of template pages, the first section comprising a sub-section for each template page in the set, each of said sub-sections for storing information about its particular template page, wherein said information comprises a thumbnail used to generate a visual representation of the template page; and
parsing the single data storage structure to convert the storage representation to the object representation when the document is opened, each particular template page corresponding to a different object that contains additional objects corresponding to the information for the particular template page.

9. The method of claim 8, wherein the data storage structure includes:
a first set of markers, wherein each marker in the first set denotes a start of one of said first section and said sub-section; and
a second set of markers, wherein each marker in the second set denotes an end of one of said first section and said sub-section.

10. The method of claim 8, wherein the single data storage structure is defined at least partially in Extensible Markup Language (XML).

11. A non-transitory computer readable medium storing a computer program for execution by at least one processor, the computer program comprising sets of instructions for:
defining a data file that defines a structure for a document that comprises (i) a set of non-occludable in-line objects and (ii) a set of occludable floating objects;
in the data file, creating a first set of sections for storing information describing the in-line objects;
in the data file, creating a second set of sections for storing information describing the floating objects;
within a particular section in the second set of sections, creating a first sub-section for storing information describing floating objects that appear on more than one page, wherein at least one floating object that appears on more than one page appears in its entirety on each page; and within the particular section in the second set of sections, creating a second sub-section for storing information describing floating objects that appear on only one page in the document.

12. The non-transitory computer readable medium of claim 11, wherein the first sub-section also stores information describing floating objects that have a constraint to appear only on a first page of a particular section of the document.

13. The non-transitory computer readable medium of claim 1, wherein the information of a particular prototype section describing a particular template page comprises text information, thumbnail information, and image information, wherein said set of user-defined content for the document also comprises text information, image information, and thumbnail information.

14. The non-transitory computer readable medium of claim 1, wherein the set of template pages comprises a particular template page that is not used to create the object representation of the document, wherein the information of a particular prototype section describes the particular template page that is not used.

15. The non-transitory computer readable medium of claim 14, wherein the particular template page is deletable by a user, wherein when a user (i) deletes the particular template page and (ii) saves the document, information describing the particular template page is removed from the particular section.

16. The method of claim 8 further comprising creating a second section in the single data storage structure for storing a set of user-defined content for the document.

17. The method of claim 16 further comprising creating a sub-section of the second section for each page in the document, each of said sub-sections of the second section for storing information describing a set of thumbnails for the document page.

18. The method of claim 8 further comprising displaying the set of thumbnails based on the information stored in the sub-section of the single data storage structure.

19. The non-transitory computer readable medium of claim 11, wherein said second set of sections includes a set of placeholder text sections that are utilized by a word-processing application to allow text to be copied into a location in the document identified by a placeholder text.

20. The non-transitory computer readable medium of claim 19, wherein said copied text replaces contents of the placeholder text section that identified said text location when the document is saved by a user.

21. A method for storing a document that is created using a set of template pages, the method comprising:
defining a single data storage structure for storing a storage representation of the document, said data storage structure for parsing to convert the storage representation to an object representation of the document when the document is opened;
for each particular template page in the set of template pages, defining a first set of sections of the single data storage structure, said first set of sections having a particular hierarchical structure for storing a set of document content elements of the particular template page; and
defining a second set of sections of the single data storage structure, said second set of sections having the same particular hierarchical structure for storing user-defined content corresponding to the set of document content elements of the first set of sections, wherein each section in the second set of sections is for storing user-defined content that is the same type of content as the document content element of the corresponding section in the first set of sections in the hierarchical structure.

22. The method of claim 21, wherein at least one section of the first set of sections plurality comprises placeholder content of the particular template page for which the first set of sections is defined.

23. The method of claim 22, wherein the user-defined content is for use by a word-processing application to replace the placeholder content in user-defined pages of the document.

24. The method of claim 21, wherein the sections in the first set that correspond to the sections in the second set comprise sections for storing information describing a set of thumbnail images and sections for storing information describing a set of drawables elements.

25. The non-transitory computer medium of claim 1, wherein the packing module is also a parsing module that is used to parse the single data file to convert the storage representation to the object representation.

26. The method of claim 8, wherein the single data storage structure comprises a second section for storing a set of user-defined content, the method further comprising:
- receiving a set of modifications to a set of pages of the document that modifies the set of user-defined content;
- modifying the document's object representation in response to receiving the set of modifications; and
- saving the document by converting the modified object representation to the document's storage representation and storing the storage representation in the single data storage structure.

27. The non-transitory computer readable medium of claim 11, wherein the data file is defined at least partially in Extensible Markup Language (XML).

\* \* \* \* \*

UNITED STATES PATENT AND TRADEMARK OFFICE
CERTIFICATE OF CORRECTION

| | | |
|---|---|---|
| PATENT NO. | : 8,375,293 B2 | Page 1 of 1 |
| APPLICATION NO. | : 11/329365 | |
| DATED | : February 12, 2013 | |
| INVENTOR(S) | : Roger Rosner et al. | |

It is certified that error appears in the above-identified patent and that said Letters Patent is hereby corrected as shown below:

In the Claims

In Column 43, claim 22, line 4, remove the word "plurality."

Signed and Sealed this
Seventeenth Day of June, 2014

Michelle K. Lee
*Deputy Director of the United States Patent and Trademark Office*